United States Patent [19]
Kudoh et al.

[11] Patent Number: 6,154,458
[45] Date of Patent: Nov. 28, 2000

[54] NETWORK SYSTEM

[75] Inventors: Yukiko Kudoh; Yasushi Sasagawa, both of Kanagawa, Japan

[73] Assignee: Fujitsu Limited, Kawasaki, Japan

[21] Appl. No.: 08/854,743

[22] Filed: May 12, 1997

[30]     Foreign Application Priority Data

Dec. 9, 1996 [JP] Japan .................................. 8-328949

[51] Int. Cl.⁷ .............................. H04L 12/28; H04J 3/16
[52] U.S. Cl. ......................... 370/395; 370/396; 370/466
[58] Field of Search .................................. 370/395, 396, 370/400, 401, 410, 411, 465, 466, 467, 522

[56]           References Cited

U.S. PATENT DOCUMENTS

| | | | |
|---|---|---|---|
| 5,490,141 | 2/1996 | Lai et al. ................................. | 370/60.1 |
| 5,640,446 | 6/1997 | Everett et al. .......................... | 370/467 |
| 5,703,880 | 12/1997 | Miura ...................................... | 370/465 |
| 5,826,017 | 10/1998 | Holzmann ............................... | 398/200 |
| 5,894,478 | 4/1999 | Barzegar et al. ....................... | 370/466 |

*Primary Examiner*—Hassan Kizou
*Assistant Examiner*—Hanh Nguyen
*Attorney, Agent, or Firm*—Helfgott & Karas, PC.

[57]           ABSTRACT

According to a network system of the present invention, a protocol information requesting unit of call-out terminal requests, when setting a call between terminal devices having different signaling protocols, an ATM switch to supply signaling protocol information used by a call-in terminal. A protocol information supplying unit of the ATM switch reads protocol information corresponding to the protocol information of the call-in terminal from a first protocol information storage unit, and supplies the call-out terminal with this piece of protocol information. A protocol changing unit in the call-out terminal changes the signaling protocol used by the call-out terminal to the signaling protocol used by the call-in terminal. There comes a status wherein the two signaling protocols become coincident.

27 Claims, 36 Drawing Sheets

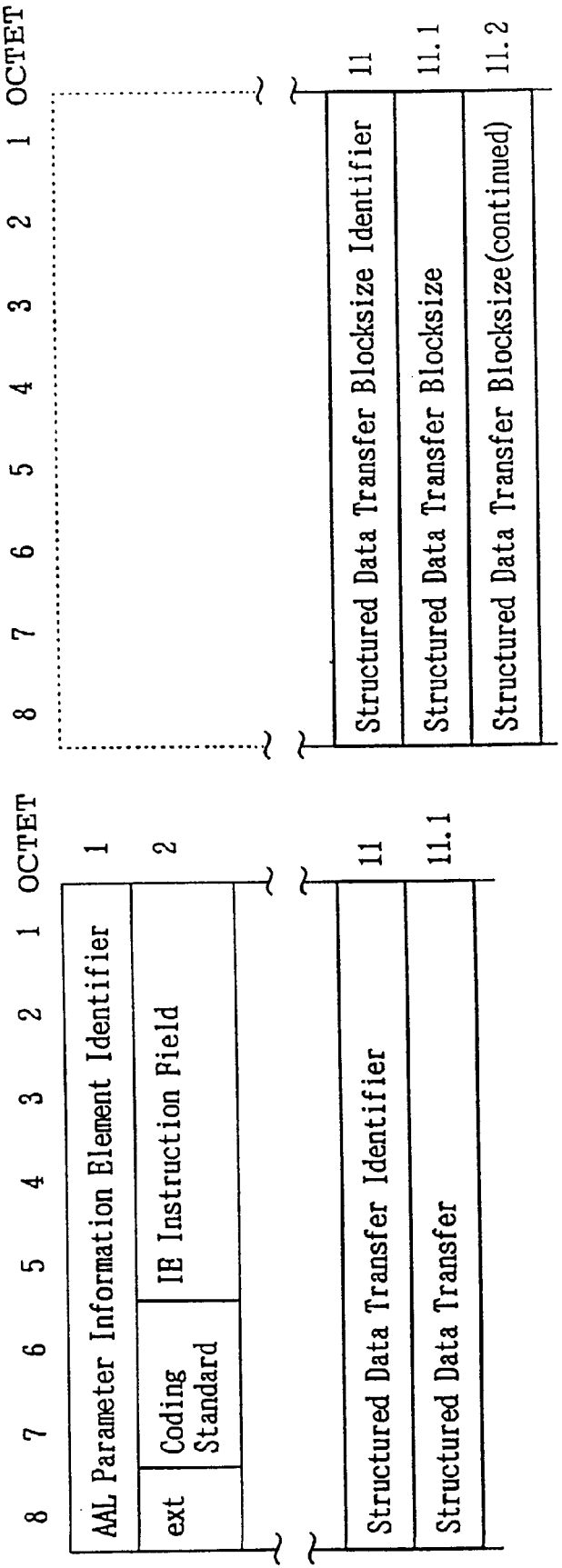

FIG. 36A PRIOR ART

```
7 6 5   4 3 2 1
0 0 0   0 0 0 0
0 0 0   0 0 0 1
0 0 0   0 0 1 0  High layer profile
0 0 0   0 0 1 1
```

FIG. 36B PRIOR ART

```
7 6 5   4 3 2 1
0 0 0   0 0 0 0
0 0 0   0 0 0 1
      (DELETE)
0 0 0   0 0 1 1
```

```
7 6 5   4 3 2 1
0 0 0   0 0 0 0
0 0 0   0 0 0 1
0 0 0   0 0 1 0
0 0 0   0 0 1 1
0 0 0   0 1 0 0
0 0 0   0 1 1 1
1 1 1   1 1 1 1  ITU-T
```

NETWORK SYSTEM

BACKGROUND OF THE INVENTION

The present invention relates to a network system in which a plurality of terminal devices are connected via channels to an ATM switching equipment, and to a method of setting a call between the terminal devices in this network system.

SVC (Switched Virtual Connection) service has been introduced into the field of ATM (Asynchronous Transfer Mode) communications in recent years. The "SVC service" is offered to enhance a flexibility of the service by connecting the terminal devices constituting the network system to other arbitrary terminal devices at arbitrary timings at arbitrary speeds. The SVC service is actualized by performing a protocol prescribed in an ATM forum as well as in ITU (International Telecommunication Union).

There arises, however, the following problem inherent in the ATM network system when setting an SVC connection (based on the SVC service) in accordance with the protocol prescribed at the present. FIG. 33 is a diagram showing an example of a construction of the ATM network system. Referring to FIG. 33, the ATM network system is constructed of an ATM switch (ATM-SW) 1, and ATM terminal devices (terminals) 2, 3. The ATM switch 1 and the terminals 2, 3 respectively include UNIs (User Network Interfaces) 4 for mutually connecting the ATM switch 1 to the terminal 2 or 3, signaling processing units 5a14 5c for actualizing the above-described SVC service, and ILMI (Interim Local Management Interface) units 6a–6c for controlling a management function over the ATM switch 1 and the terminals 2, 3. Then, each signaling processing unit 5a executes a signaling protocol pursuant to the ATM forum or the ITU.

By the way, in the prior art ATM network systems, the signaling protocols are not unified in some cases in the system as a whole. For example, in the constructive example illustrated in FIG. 33, the signaling processing unit 5a of the terminal 2 is set to perform a signaling procedure (which is a message exchange for carrying out the call setting) on the basis of the signaling protocol pursuant to the ATM forum, while the signaling processing unit 5b of the ATM switch 1 and the signaling processing unit 5c of the terminal 3, are set to effect the signaling procedure on the basis of a signaling protocol (ITU-T recommendation Q.2931). If there are differences in terms of the signaling protocols pursuant thereto between the ATM switch 1, terminal 2 and the terminal 3, however, the call can not be set between the terminal 2 and the terminal 3 in some cases due to the difference in the standards. Referring to FIG. 34, there will be given an explanation of the way the call is unable to set.

FIG. 34 is a sequence diagram showing a signaling procedure when setting the call between the terminals 2 and 3 in the ATM network system illustrated in FIG. 33. Referring again to FIG. 34, when the terminal 2 sets the call with respect to the terminal 3, a signaling processing unit 5a of the terminal 2 transmits "SETUP" defined as a message for setting the call to an ATM switch 1. When the ATM switch 1 receives "SETUP", a signaling processing unit 5b of the ATM switch 1 transmits "SETUP" to the terminal 3. Subsequently, the signaling processing unit 5b of the ATM switch 1 transmits "CALL-PROC" defined as a message for accepting the call setting message "SETUP" to the terminal 2. The terminal 2, upon receiving this message "CALL-FPROC", makes a T310 timer start counting based on the signaling protocol pursuant to the ATM forum, and there must be a wait-for-receipt status of "CONN" defined as a response message to "SETUP". On the other hand, when the terminal 3 receives "SETUP" from the ATM switch, 1, a signaling processing unit 5c of the terminal 3 transmits "ALERT" defined as a call-out message based on the signaling protocol pursuant to the ITU to the ATM switch 1, and subsequently transmits "CONN" to the ATM switch 1. Herein, the signaling protocol pursuant to the ATM forum is prescribed so that the terminal receiving "SETUP" transmits "CONN" without transmitting "ALERT". Therefore, a counting time of the T310 timer in the terminal 2 is set assuming a time till "CONN" transmitted from the call-in terminal (the terminal 3) is received since the call-out terminal (the terminal 2) transmitting "SETUP" has received "CALL-PROC".

As explained above, however, the terminal 3, upon receiving "SETUP" transmits "CONN" after transmitting "ALERT". Hence, it follows that the terminal 2 receives "CONN" in delay of a time till the terminal 3 transmits "CONN" since it has transmitted "ALERT". As a result, the T310 timer is timed out before the terminal 2 receives "CONN" from the ATM switch 1 in some cases. Furthermore, if the T310 timer is timed out, the terminal 2 executes the processing on the assumption that the call can not be set with respect to the terminal 3 even when receiving "CONN" thereafter.

Further, the signaling protocol based on UNI specifications of an ATM forum is classified in-to a version 3.0 (hereinafter abbreviated to "V3.0"), a version 3.1 (hereinafter abbreviated to "V.1") and a version 4.0 (hereinafter abbreviated to "4.0"), which all have different contents. FIGS. 35 and 36 are diagrams showing a difference between the signaling protocols V3.0 and V3.1. FIG. 35(a) is a diagram showing parameter elements of an AAL (ATM Adaptation Layer) of "SETUP" in V3.0. FIG. 35(b) is a diagram showing AAL parameter elements of "SETUP" in V3.1. Further, FIG. 36(a) is a diagram showing information elements of broadband high-order layer information (B-HLI) of "SETUP" in V3.0. FIG. 36(b) is a diagram showing information elements of the broadband high-order layer information of "SETUP" in V.3.1. Moreover, FIG. 36(c) is a diagram showing QOS (Quality of Service) parameter elements of "SETUP" in V.3.0. FIG. 36(d) is a diagram showing QOS parameter elements of "SETUP" in V.3.1. As shown in FIGS. 35(a) and 35(b), the AAL parameter elements of "SETUP" have one more octet in V3.1 than in V3.0. More specifically, they have an octet 11.2 defined in V3.1, which does not exist in V3.0. Note that the AAL is defined as a protocol for treating functions depending on the SVC service. Further, a content of the information element of the octet 11 in V3.0 is different from that in V3.1. Note that "Structured Data Transfer" in FIG. 35(a) literally indicates a structured data transfer, while "Structured Data Transfer Blocksize" literally shows a block size of a structured data transfer CBR (fixed speed) service. Moreover, as shown in FIGS. 36(a) and 36(b), with respect to the information elements of the broadband high-order layer information (B-HLI) of "SETUP", "High layer profile" existing in the definition of "High layer information type (octet 5)" in V3.0 is deleted in V3.1. Further, as shown in FIGS. 36(c) and 36(d), with respect to the QOS parameter elements of "SETUP", ITU-T which is not seen in V3.0 is added to the definition of "QOS Class Forward (octet 5)" and "QOS Class Backward (octet 6)" in V3.1. Note that a concrete parameter of ITU-T is written posterior to an octet 7.

As described above, the content of the signaling protocol (e.g., "SETUP") pursuant to the ATM forum differs depending on the versions, and hence, for example, even if the respective processing units 5a–5c of the ATM switch 1 and the terminals 2, 3 illustrated in FIG. 33 are based on the signaling protocols pursuant to the ATM forum, the call could not be set in some cases between the terminal 2 and the terminal 3 in the case of the versions being different.

SUMMARY OF THE INVENTION

It is a primary object of the present invention, which was contrived in view of the above-describe problems, to provide a network system capable of properly setting a call between terminal devices irrespective of a difference in signaling protocol between the terminal devices or between an ATM switch and the terminal device.

To accomplish the above object, according to a first aspect of the present invention, a network system comprises an ATM switch, and a plurality of terminal devices connected via channels to the ATM switch. Each terminal device comprises a requesting unit for transmitting, when setting a call between the terminal device serving as a call-out terminal and the other terminal device serving as a call-in terminal, a request for supplying information about a signaling protocol used by the other terminal device, to the ATM switch, and a first changing unit for changing, when receiving the signaling protocol information from the ATM switch, a signaling protocol used by the call-out terminal itself on the basis of this piece of information to the signaling protocol used by the other terminal device. The ATM switch comprises a first storing unit for storing each piece of information about the signaling protocol used by each terminal device, and a supplying unit for transmitting, when receiving the supply request from one of the plurality of terminal devices, the signaling protocol information of the other terminal device that is stored in the first storing unit, to the terminal device to which the supply request has been transmitted.

In the network system according to the first aspect of the invention, when setting the cal between the two terminal devices having the different signaling protocols, the requesting unit of the call-out terminal requests the ATM switch to supply the information about the signaling protocol used by the call-in terminal. Then, the supplying unit of the ATM switch reads the signaling protocol information of the call-in terminal from the first storing unit, and supplies the call-out terminal with this piece of information. Thereupon, the first changing unit of the call-out terminal changes the signaling protocol used by the call-out terminal itself to the signaling protocol used by the call-in terminal. With this process, there comes to such a status that the signaling protocols of the call-out and call-in terminals coincide with each other. Thereafter, a signaling procedure for setting the call between the call-out terminal and the call-in terminal, is properly conducted.

Herein, the signaling protocol information may be exemplified by, e.g., information about sorts of the protocols and versions of the protocols.

In the network system according to the first aspect of the invention, the ATM switch may further comprise a second storing unit for storing information about a signaling protocol used by the ATM switch itself, and a second changing unit for comparing, when the supplying unit reads the signaling protocol information from the first storing unit, this piece of information with the information stored in the second storing unit, and changing, if two pieces of information are different, the signaling protocol of the ATM switch itself to a signaling protocol based on the information read from the first storing unit.

In the network system according to the first aspect of the invention, each terminal device may further comprise a third storing unit for storing information about a signaling protocol used by each terminal device itself, and a transmitting unit for transmitting the information stored in the third storing unit to the ATM switch. The ATM switch may further comprise a writing unit for writing, when receiving the signaling protocol information from each terminal device, this piece of information to the first storing unit. At this time, the transmitting unit of each terminal device may be so set as to be actuated when a power supply of each terminal device is switched ON.

According to a second aspect of the present invention, a network system comprises an ATM switch, and a plurality of terminal devices connected via channels to the ATM switch. Each terminal device comprises a requesting unit for transmitting, when setting a call between the terminal device serving as a call-out terminal and the other terminal device serving as a call-in terminal, a request for supplying information about a signaling protocol used by the other terminal device, to the ATM switch. The terminal device also comprises a first changing unit for changing, when receiving the signaling protocol information from the ATM switch, a signaling protocol used by the call-out terminal itself on the basis of this piece of information to the signaling protocol used by the other terminal device, and a first storing unit for storing information about a signaling protocol used by each terminal device itself. The terminal device further comprises a responding unit for transmitting, when receiving the supply request from the ATM switch, the information stored in the first storing unit as a piece of information about the signaling protocol of the call-in terminal, to the ATM switch. The ATM switch comprises a transferring unit for transferring, when receiving the supply request from one of the plurality of terminal devices, this supply request to the other terminal device and transferring, when receiving signaling protocol information of the call-in terminal from the other terminal device, this piece of information to the terminal device that has transmitted the supply request.

According to a third aspect of the present invention, a network system comprises an ATM switch, and a plurality of terminal devices connected via channels to the ATM switch. Each terminal device comprises a requesting unit for transmitting, when setting a call between the terminal device serving as a call-out terminal and other terminal device serving as a call-in terminal, information of a signaling protocol of the call-out terminal itself and a change request for changing a signaling protocol of the other terminal device to the signaling protocol of the call-out terminal device, to the ATM switch. The terminal device also comprises a first changing unit for changing, when receiving the signaling protocol information from the call-out terminal device and the change request, the signaling protocol used by the call-out terminal itself to a signaling protocol based on the signaling protocol information received. The ATM switch comprises a transferring unit for transferring, when the signaling protocol information of the call-out terminal and the change request, this piece of information and the change request to the other terminal device.

In the network system according to the third aspect of the invention, each terminal device may further comprise a responding unit for transmitting, when the first changing means changes the signaling protocol, a result of this change to the ATM switch. The transferring means of the ATM switch may transfer, when receiving the result of the change, the result of the change to the terminal device that has transmitted the change request.

According to a fourth aspect of the present invention, a network system comprises a LAN emulation server, a plurality of ATM switches connected via channels to the LAN emulation server, and a plurality of terminal devices connected via channels to the plurality of ATM switches. Each terminal device comprises a requesting unit for transmitting, when setting a call between the terminal device serving as a call-out terminal and the other terminal device serving as a call-in terminal, a request for supplying information about a signaling protocol used by the other terminal device, to one of the plurality of ATM switches;. The terminal device also comprises a first changing unit for changing, when receiving the signaling protocol information from one of the ATM switches, a signaling protocol used by the terminal itself on the basis of this piece of information to the signaling protocol used by the other terminal device. Each ATM switch comprises a transferring unit for transferring, when receiving the supply request from each terminal device, this supply request to the LAN emulation server and transferring, when receiving information about a signaling protocol used by the other terminal device from the LAN emulation server, this piece of information to the terminal device that has transmitted the supply request. The LAN emulation server comprises a first storing unit for storing each piece of information about the signaling protocol used by each terminal device, and a supplying unit for transmitting, when receiving the supply request from one of the ATM switch, the signaling protocol information of the other terminal device that is stored in the first storing unit, to the ATM switch.

According to the network system of the present invention, the call can be properly set between the terminals regardless of the difference between the signaling protocols to which the terminal devices and the ATM switches should be pursuant.

Other features and advantages of the present invention will become readily apparent from the following description taken in conjunction with the accompanying drawings.

BRIEF DESCRIPTION OF THE DRAWINGS

FIG. 35 is an explanatory diagram showing a difference between signaling protocols; AND FIG. 36 is an explanatory diagram showing a difference between the signaling protocols.

DETAILED DESCRIPTION OF THE EMBODIMENTS

Embodiments of the present invention will be described in detail with reference to the accompanying drawings.

[Embodiment 1]

<Construction of Network System>

Figure 1:
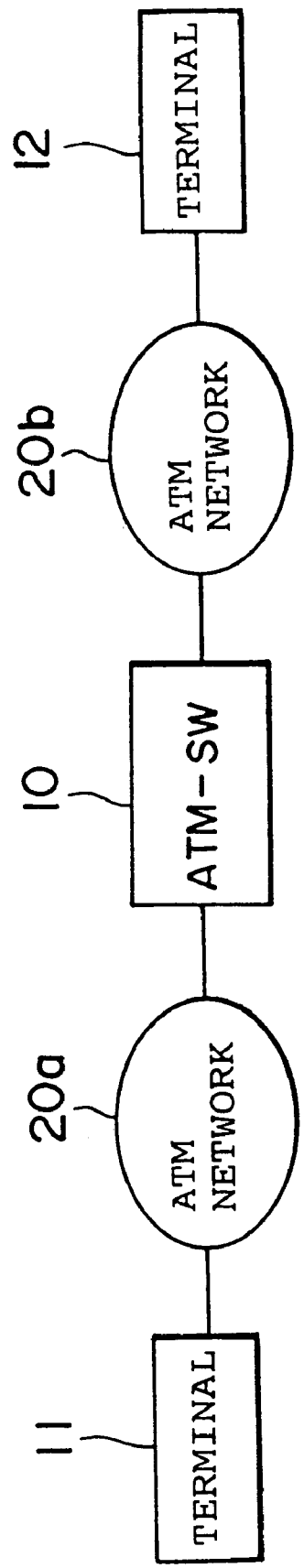
FIG. 1 is a diagram illustrating a construction of a network system in an embodiment 1.

To start with, a construction of a network system in an embodiment 1 will hereinafter be explained. FIG. 1 is a diagram illustrating a whole construction of the network system in the embodiment 1. In the network system shown in FIG. 1, ATM networks 20a, 20b are connected via communication lines (channels) and unillustrated UNIs (User Network Interfaces) to an ATM switch (ATM-SW) 10.

Further, a plurality of ATM terminal devices (hereinafter simply referred to as "terminals") (only terminals 11, 12 are illustrated in FIG. 1) are connected via the communication lines and the unillustrated UNIs to the respective ATM networks 20a, 20b.

Figure 2:
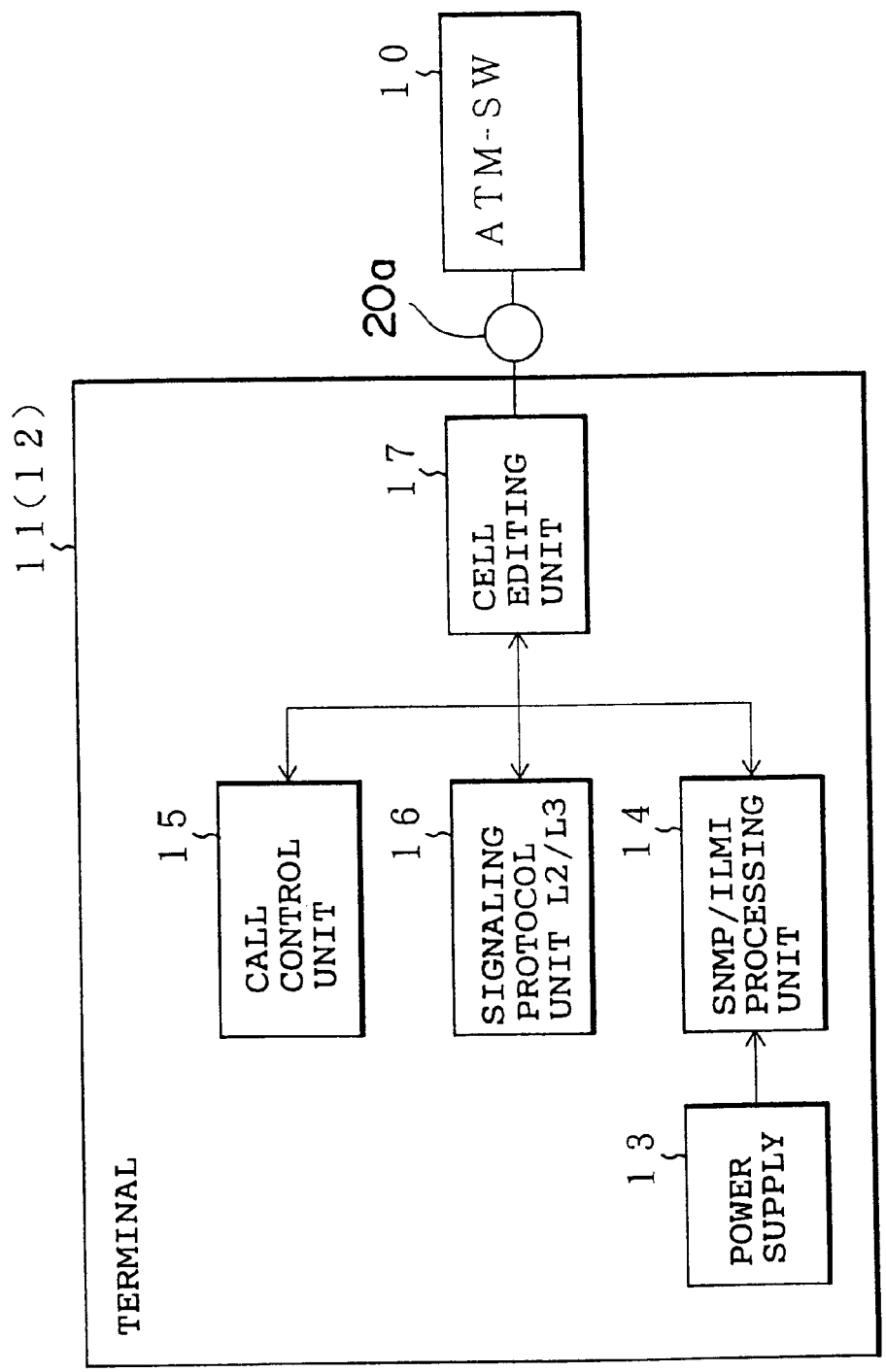
FIG. 2 is a diagram illustrating a construction of terminal device shown in FIG. 1.

FIG. 2 is a functional block diagram of the terminal 11 illustrated in FIG. 1. The terminals 11, 12 have substantially the same construction, and hence the terminal 11 is herein exemplified. Referring to FIG. 2, the terminal 11 comprises an SNMP/ILMI processing unit (hereinafter simply termed an "S/I unit") 14, a call control unit 15 connected to this S/I unit 14, and a signaling protocol unit (hereinbelow abbreviated to an "SP unit") 16 connected to the S/I unit 14 and to the call control unit 15. The terminal 11 further comprises a cell editing unit 17 connected to the S/I unit 14, the call control unit 15 and the SP unit 16 as well, and a power supply 13 for supplying the above respective units with operating electric power.

Figure 3:
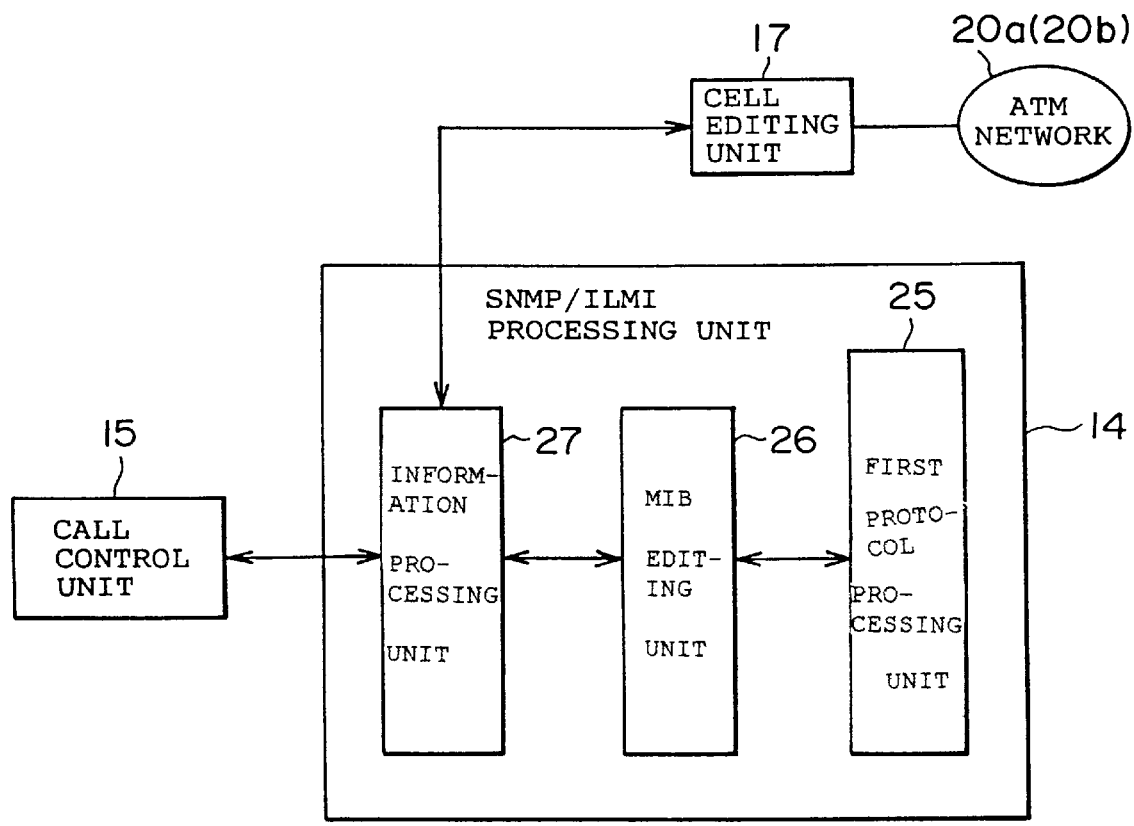
FIG. 3 is a diagram showing a construction of an SNMP/ILMI processing unit shown in FIG. 2.

The S/I unit 14 controls an SNMP (Simple Network Management Protocol) and the ILMI (interim Locel Management Interface). Herein, the SNMP protocol is defined as one of the network management protocols for the TPC/IP internet. Also, the S/I unit 14 transmits and receives various information between an unillustrated SNMP manager (a terminal device (not shown) for an exclusive use of an SNMP protocol management) and an adjacent node (a terminal device, e.g., the terminal 12 connected via the ATM switch 10). FIG. 3 shows a functional block diagram of this S/I unit 14. Referring to FIG. 3, the S/I unit 14 comprises a first protocol processing unit 25, an MIB editing unit 26 and an information processing unit 27.

Herein, MIB editing unit 26 edits (creates) messages that are to be transmitted to the ATM switch 10 and other terminals by use of MIB data (about objects requiring the management based on the SNMP network management protocol) stored in an MIB (Management Information Base: See FIG. 4) within the call control unit 15. Further, the MIB editing unit 26 analyzes a content of the MIB data contained in the message received by the terminal 11. Also, the first protocol processing unit 25, upon receiving the data from the MIB editing unit 26, transfers an instruction based on a content of that item of data to the MIB editing unit 26 or the information processing unit 27. Furthermore, the information processing unit 27 controls the transmission and receipt of the data between the S/I unit 14 and the call control unit 15.

Figure 4:
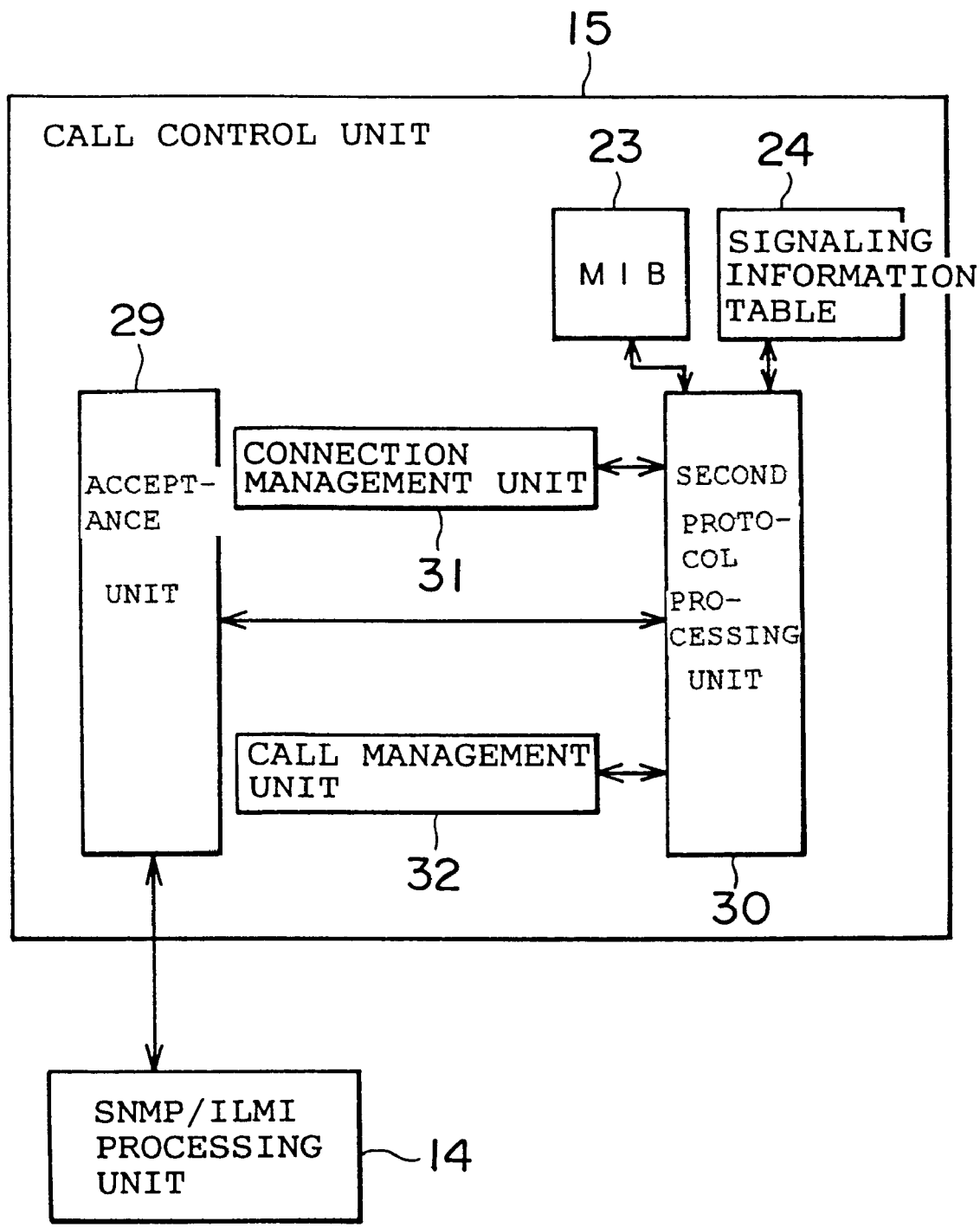
FIG. 4 is a diagram illustrating a construction of a call control unit shown in FIG. 2.

The call control unit 15 depicted in FIG. 2 executes a call-out/call-in process of the SVC (Switched Virtual Connection) call, and a cut-off process thereof. Moreover, the call control unit 15 executes a mapping process with respect to a VCC (Virtual Channel Connection) connected (set) to the terminal 11 and an unillustrated host application. FIG. 4 shows a functional block of this call control unit 15. In FIG. 4, the call control unit 15 has an MIB 23, a signaling information table 24, an acceptance unit 29, a second protocol processing unit 30, a connection management unit 31, and a call management unit.

Herein, the acceptance unit 29 controls an interface with the unillustrated host application, and provides the unillustrated host application with call-out/call-in and cut-off services for the call. Further, the acceptance unit 29, upon receiving the data from the S/I unit 14, transfers the data to the second protocol processing unit 30. The MIB 23 is, as explained above, defined as a virtual database stored with information (MIB information) about the objects of which the management based on the SNMP network management protocol is required. The MIB 23 is additionally stored with two pieces of signaling information (ILMI-MIB), which follow, as one item of MIB information:

[1] atmfAtmSignalType
[2] atmfAtmSignalVersion

[1] atmfatmSignalType is a piece of information about which of the ATM forum and the ITU the signaling protocol used by the terminal 11 is pursuant to. Further, [2] atmfAtmSignalVersion is a piece of information about which of V3.0, V3.1 and V4.0 the version concerned is defined as if the signaling protocol used by the terminal 11 comes under UNI specifications of the ATM forum.

The signaling information table 24 is stored with the signaling information received by the terminal 11 from other terminals. The second protocol processing unit 30 controls an interface with a signaling-layer-3 protocol, and edits/analyzes a signaling-layer-3 message (such as, e.g., "SETUP" used for call setting). Moreover, the second protocol processing unit 30 reads the above signaling information from the MIB 23 as the necessity arises. Further, the second protocol processing unit 30, when the terminal 11 receives the signaling information of other terminals, stores the signaling information table 24 with the signaling information of other terminals. The connection management unit 31, in linkage with the second protocol processing unit 30, performs a management as to whether or not a VP (Virtual Path) and a VC (Virtual Channel) that are set in a communication line connected to the terminal 11 are usable. The connection management unit 31 also manages using statuses of the VP and the VC. The call setting management unit 31, in linkage with the second protocol processing unit 30, manages a call status and a call reference.

The SP unit 16 shown in FIG. 2 manages layer-2 and layer-3 signaling protocols, and, if the terminal 11 and other terminal perform an operation relative to the call setting, the terminal 11 adds information based on the signaling protocol to the message to be transmitted to other terminal.

The cell editing unit 17 edits (creates) cells by extracting/inserting the cells. Also, the cell editing unit 17 transmits the cells to other terminals and to the ATM switch 10, or alternatively receives the cells transmitted by other terminals and the ATM switch 10.

Note that each of the terminals 11, 12 comprises, though not illustrated, a ROM (medium) for storing a control program for controlling the respective constructive units of the terminals 11, 12 themselves and the data for executing this control program, a CPU for executing the control program stored in the ROM, a RAM used as a work area, etc. of this CPU, and an I/O. The above S/I unit 14, the call control unit 15 and the SP unit 16 may be defined as functions actualized by the control program stored in the unillustrated ROM being down-loaded into the unillustrated RAM and being executed by the unillustrated CPU. Further, the terminals 11, 12 are operable based on the plurality of signaling protocols and are capable of adequately selecting the signaling protocols to which these terminals are pursuant, depending on the circumstances.

Figure 5:
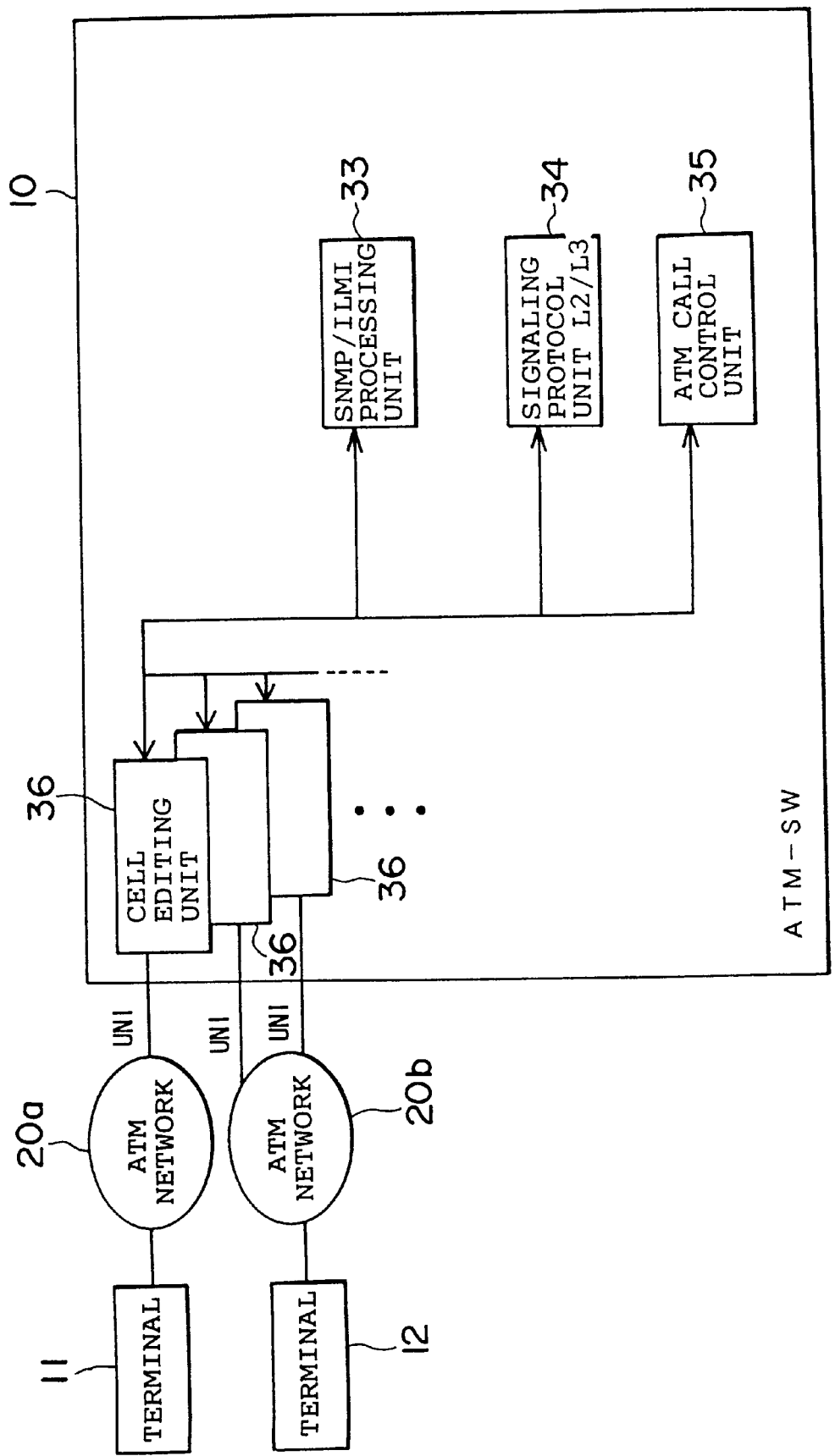
FIG. 5 is a diagram illustrating a construction of an ATM switch shown in FIG. 1.
Figure 6:
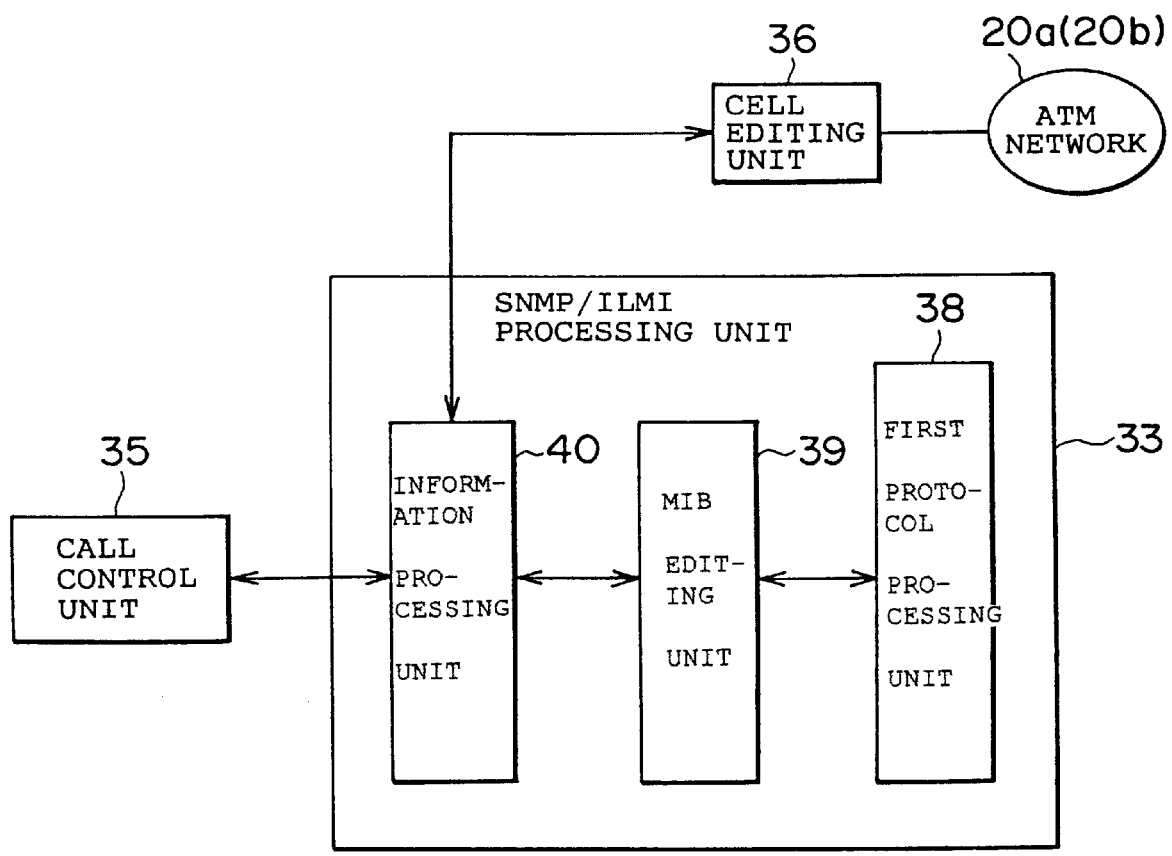
FIG. 6 is a diagram illustrating the SNMP/ILMI processing unit shown in FIG. 5.
Figure 7:
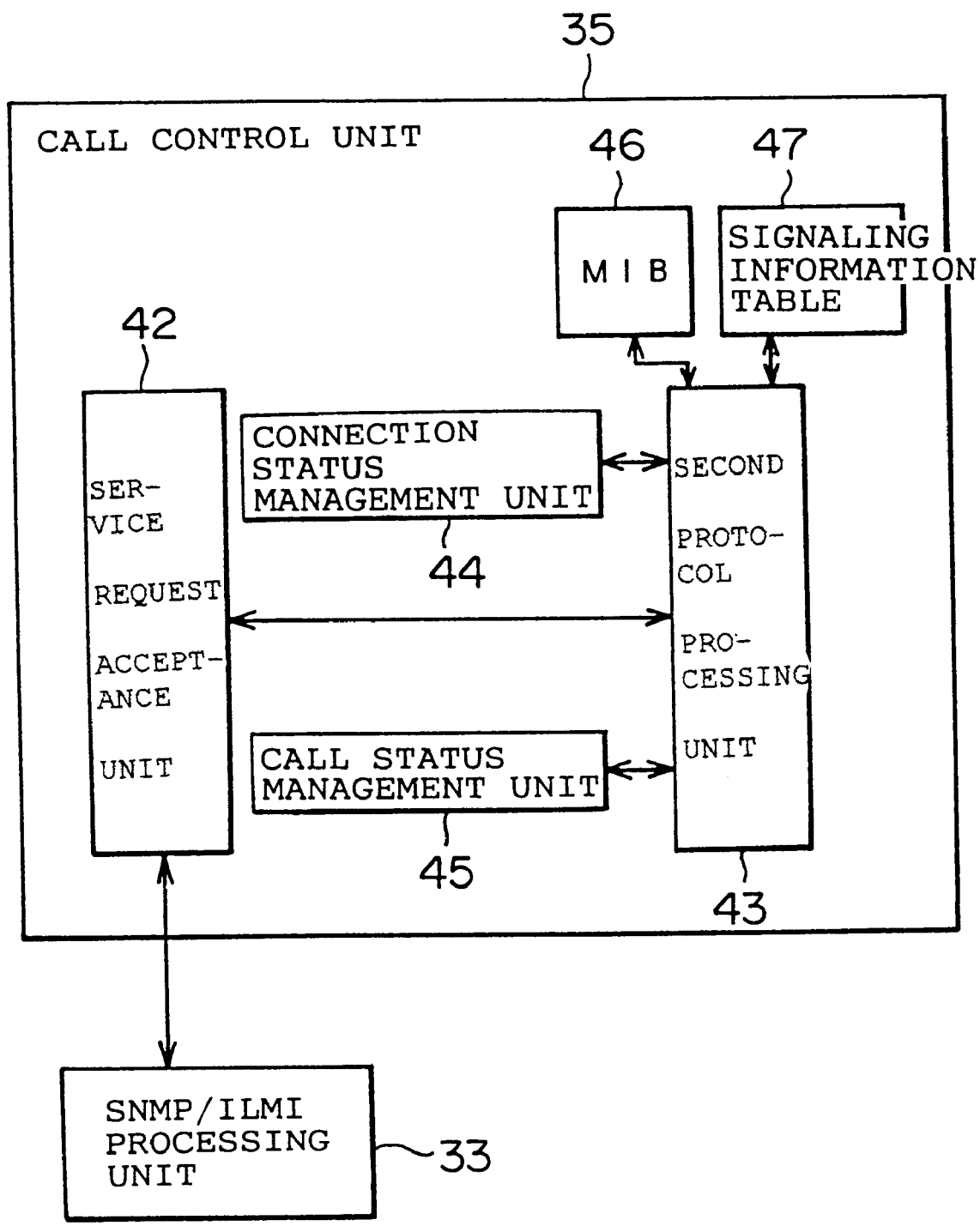
FIG. 7 is a diagram illustrating the call control unit shown in FIG. 5.

FIG. 5 is a functional block diagram of the ATM switch 10 illustrated in FIG. 1. Further, FIG. 6 is a functional block diagram of an S/I unit 33 shown in FIG. 5. FIG. 7 is a functional block diagram of a call control unit 35 shown in FIG. 5. Referring to FIG. 5, the ATM switch 10 comprises the S/I unit 33, an SP unit 34, the call control unit 35 and a cell editing unit 36. These units excluding the call control unit 35 shown in FIG. 7 have substantially the same configurations of the S/I unit 14, the call control unit 15, the SP unit 16 and the cell editing unit 17 that are shown in FIG. 2, and therefore their explanations are omitted herein.

Moreover, the respective constructive elements shown in FIG. 6 are the same as those illustrated in FIG. 3, and hence the explanations thereof are omitted herein.

Referring to FIG. 7, the call control unit 35 comprises an acceptance unit 42, a second protocol processing unit 43, a connection management unit 44, a call management unit 45, an MIB 46, and a signaling information table 47. These constructive elements other than the second protocol processing unit 43 and the signaling information table 47, are substantially the same as the MIB 23, the acceptance unit 29, the second protocol processing unit 30, the connection management unit 31 and the call management unit 32, and therefore their explanations are omitted.

Herein, the signaling information table 47 is designed to store the signaling information of the terminals 11, 12, etc. The second protocol processing unit 43, when the ATM switch 10 receives the signaling information transmitted from the terminals 11, 12, etc., accepts the same signaling information and stores the signaling table 47 with these respective items of information. With respect to operations other than this point of operation, the second protocol processing unit 43 is common to the second protocol processing unit 30 shown in FIG. 4.

<Processing in Network System>

In the case of transmitting and receiving the data between the terminals in the above-described network system, a call-out terminal (a terminal transmitting the data), a call-in terminal (a terminal receiving the data) and the ATM switch 10 are in such a status as to operate under the same signaling protocol. Thereafter, the messages for setting the call are exchanged (which is referred to as a signaling procedure) between the call-out terminal and the call-in terminal through the ATM switch 10, and, after setting the call, the data are transmitted and received.

The following is an explanation of how the terminal 11, the terminal 12, some other terminals (not *shown) and the ATM switch 10 execute the processing.

Figure 8:
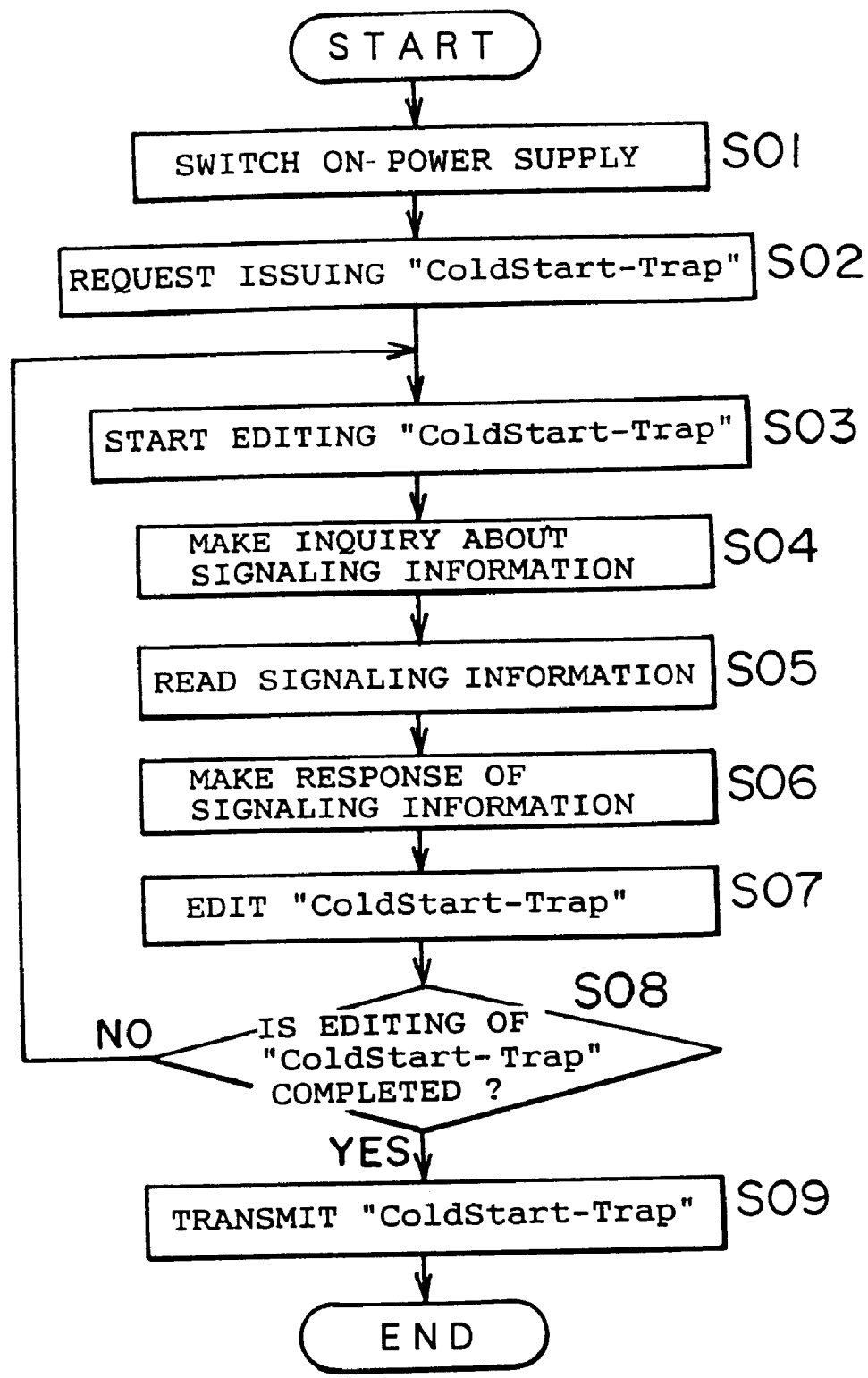
FIG. 8 is a flowchart showing a signaling information transmitting process.

In a state where the power supply of the ATM switch 10 illustrated in FIG. 1 is switched ON, when the power supply 13 of each terminal is switched ON, a signaling information transmitting process is carried out in each terminal. FIG. 8 is a flowchart showing this signaling information transmitting process. Exemplified herein is a case where the terminal 11 executes the signaling information transmitting process.

In step S01, upon switching ON the power supply 13 of the terminal 11, the S/I unit 14 shown in FIG. 3 is started up.

In step S02, the first protocol processing unit 25 of the S/I unit 14 notifies the MIB editing unit 26 of a request for issuing an SNMP message (hereinafter termed "ColdStart-Trap") containing the signaling information used by the terminal 11.

In step S03, the MIB editing unit 25 receiving the request for issuing "ColdStart-Trap", starts editing "ColdStart-Trap". At this time, the MIB editing unit 26 notifies the information processing unit 27 of a request for reading the signaling information.

In step S04, the information processing unit 27 receiving the request for reading the signaling information, notifies the call control unit 15 of a request for inquiry about the signaling information. In the call control unit 15, the second protocol processing unit 20 shown in FIG. 4 receives this signaling information inquiry request via the acceptance unit 29.

In step S05, the second protocol processing unit 30 receiving this signaling information inquiry request, reads the signaling information of the signaling protocol presently used by the terminal 11, from the MIB 23.

In step S06, the second protocol processing unit 30 notifies the acceptance unit 29 of the signaling information read by the second protocol processing unit 30 in step S05. This piece of signaling information is transferred to the MIB editing unit 26 via the acceptance unit 29 and the information processing unit 27 of the S/I unit 14.

In step S07, the MIB editing unit 26 receiving the signaling information edits "ColdStart-Trap".

In step S08, the MIB editing unit 26 judges whether or not the editing of "ColdStart-Trap" is completed. At this time, if the editing of "ColdStart-Trap" is not yet completed, the processing returns to step S03, wherein a loop process of steps S03–S08 is repeated till the editing of "ColdStart-Trap" is completed. Whereas if the editing of "ColdStart-Trap" is completed, the MIB editing unit 26 transferred "ColdStart-Trap" edited to the cell editing unit 17 illustrated in FIG. 2.

In step S09, the cell editing unit 17 receiving "ColdStart-Trap" transmits "ColdStart-Trap" to the ATM network 20a. Upon finishing the process in this step S09, the signaling information transmitting process comes to an end.

Incidentally, "ColdStart-Trap" is transmitted while being embedded in a user data unit in a UDP (User Datagram Protocol) data format. This message "ColdStart-Trap" is received by the ATM switch 10 via the ATM network 20a. The above-mentioned signaling information transmitting process is executed in the same way respectively in the terminal 12 and the plurality of unillustrated terminals as well as in the terminal 11.

Figure 9:
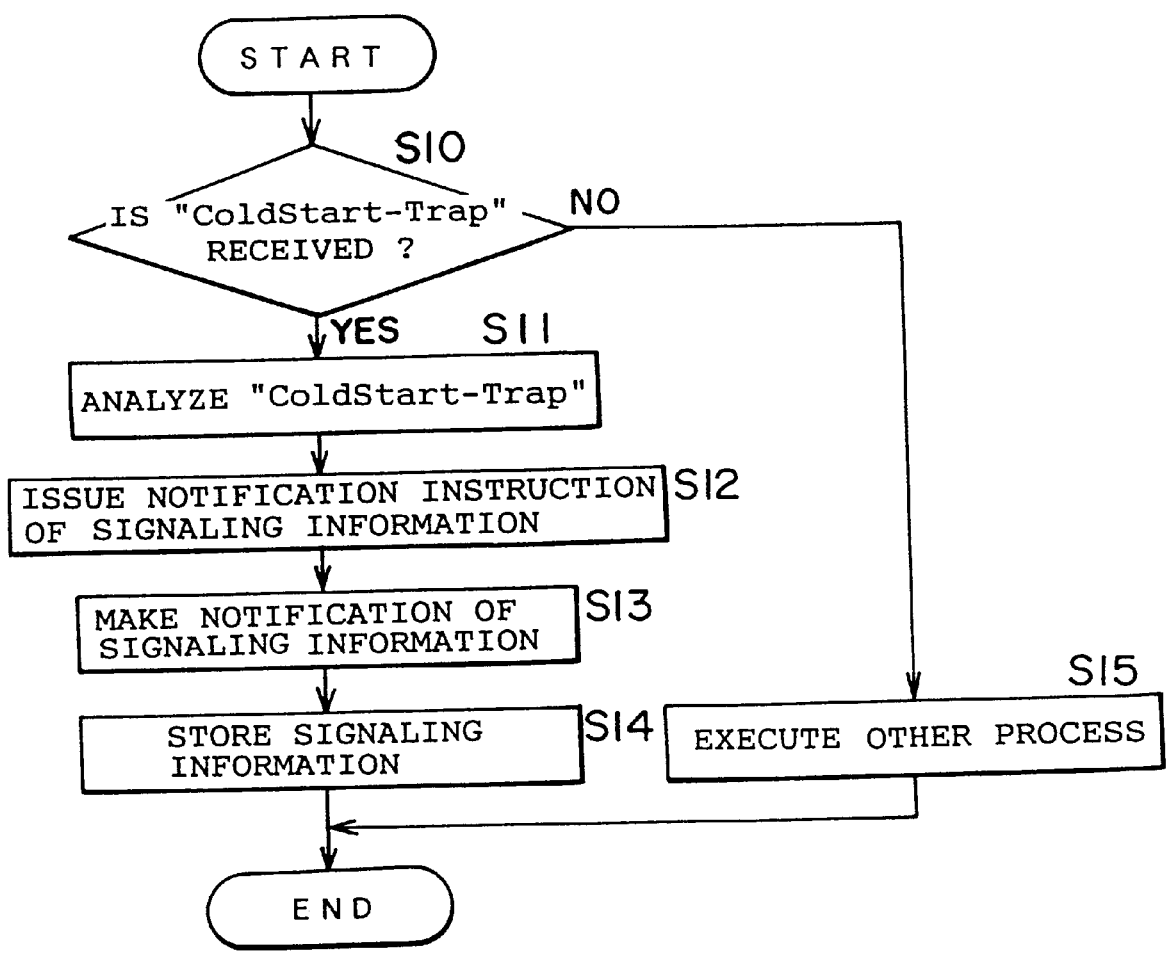
FIG. 9 is a flowchart showing a signaling information receiving process.

The ATM switch 10, on receiving "ColdStart-Trap", performs a signaling information receiving process. FIG. 9 is a flowchart showing the signaling information receiving process.

As shown in FIG. 9, whether or not the UDP data received by the ATM switch 10 contains "ColdStart-Trap", is judged in step S10. At this time, when judging that the UDP data contains "ColdStart-Trap", the cell editing unit 36 extracts "ColdStart-trap" out of this item of UDP data and supplied the S/I unit 33 with "ColdStart-Trap". Then, the processing proceeds to step S11. While on the other hand, when judging that the UDP data does not contain "ColdStart-Trap", the processing proceeds to step S15, wherein another process of the ATM switch 10 is executed.

In step S11, the MIB editing unit 39 of the S/I unit 33 shown in FIG. 6 receives "ColdStart-Trap" via an information processing unit 40. Thereupon, the MIB editing unit 39 analyzes "ColdStart-Trap" and thereby extracts the signaling information out of "ColdStart-Trap". Upon an end of this extraction, the MIE editing unit 39 notifies the first protocol processing unit 38 of this purport.

In step S12, the first protocol processing unit 38 gives the information processing unit 40 a notifying instruction to notify the call control unit 35 (see FIG. 5), of the ATM switch 10, of the signaling information obtained in step S11. This notifying instruction is issued via the MIB editing unit 39 to the information processing unit 40. At this time, the MIB editing unit 39 supplies the information processing unit 40 with the signaling information obtained in step S11 together with the notifying instruction.

In step S13, the information processing unit 40 receiving the notifying instruction and the signaling information as well, notifies the call control unit 35 of the signaling information.

In step S14, the second protocol processing unit 43 (see FIG. 7) of the call control unit 35 receives the signaling information via the acceptance unit 42. Then, the second protocol processing unit 43 stores the signaling information table 47 with this piece of signaling information in such a form as to correspond to the information of the terminal that has transmitted the same signaling information. When the process in this step S14 is finished, the signaling information receiving process cones to an end. This signaling information receiving process corresponds to writing means of the present invention.

Note that the ATM switch 10 receives the signaling information each from the terminal 11, the terminal 12 and the plurality of unillustrated terminals, and stores the signaling information table 47 with respective pieces of signaling information.

Figure 10:
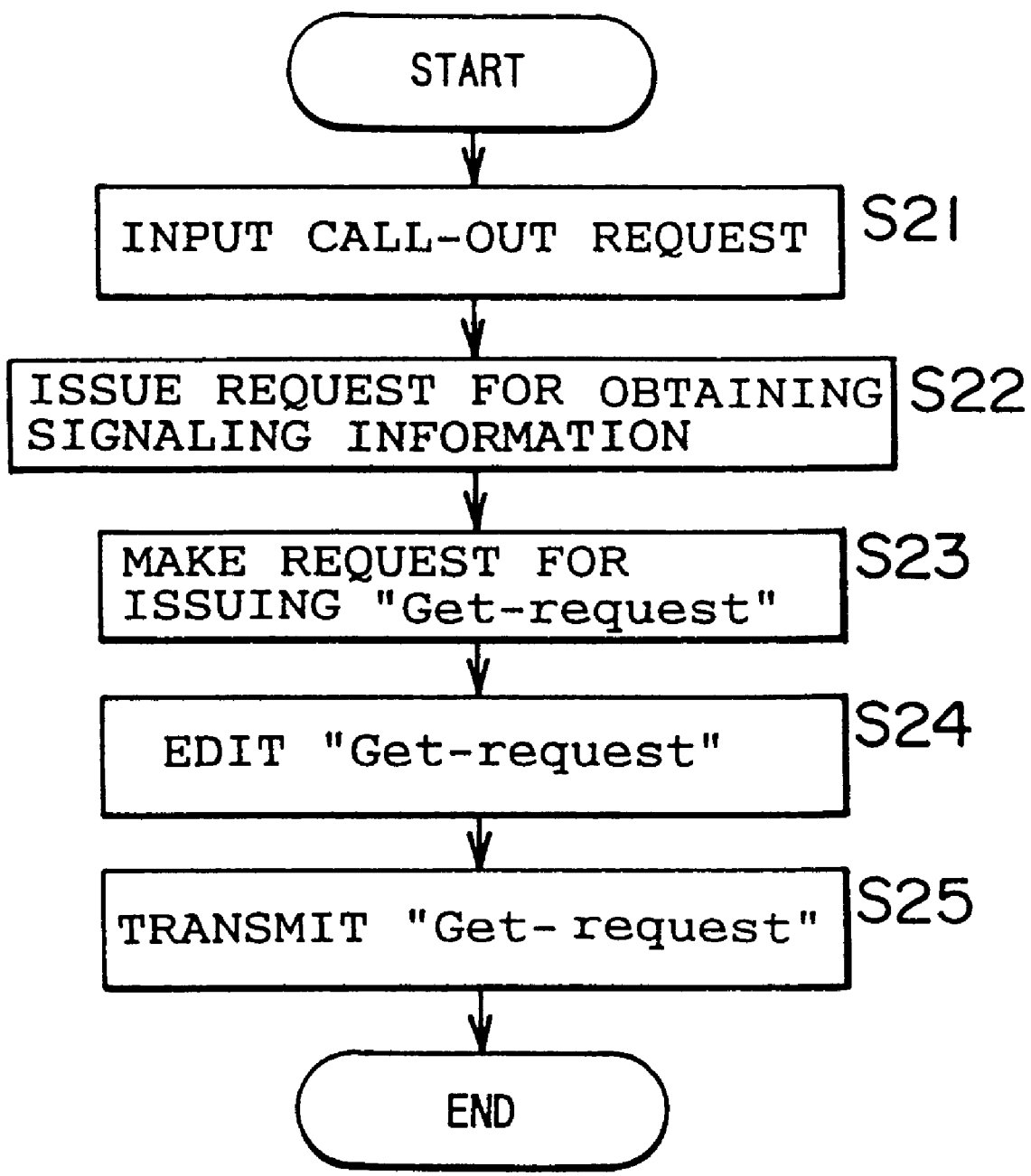
FIG. 10 is a flowchart showing a signaling information requesting process.

Thereafter, a certain terminal among the plurality of terminals including the terminals 11, 12 becomes a call-out terminal, and transmits and receives the data to and from the other terminal serving as a call-in terminal. In this case, a signaling information request process is executed in the call-out terminal. FIG. 10 is a flowchart showing this signaling information request process.

As shown in FIG. 10, in step S21, a call-out request to transmit and receive the data is inputted to the acceptance unit 29 (see FIG. 4) of the call control unit 15 from the unillustrated I/O unit of the call-out terminal. Thereupon, the acceptance unit 29 transfers this call-out request to the second protocol processing unit 30.

In step S22, the second protocol processing unit 30 receiving this call-out request issues a signaling information acquisition request purporting that the signaling information of the call-in terminal be acquired from the ATM switch 10. This signaling information acquisition request is transmitted via the acceptance unit 29 to the S/I unit 14.

In step S23, the first protocol processing unit 25 (see FIG. 3) of the S/I unit 14 receives the signaling information acquisition request through the information processing unit 27 and the MIB editing unit 26. Then, the first protocol processing unit 25 notifies the MIB editing unit 26 of the request for issuing an SNMP message (hereinafter termed "Get-Request") requesting the signaling information of the call-in terminal.

In step S24, the MIB editing unit 26 receiving the "Get-request" issuance request edits "Get-request".

This MIB editing unit 26, upon an end of editing "Get-request", notifies the cell editing unit 17 of this message "Get-request".

In step S25, the cell editing unit 17 receiving "Get-request" creates the UDP data containing "Get-request", which data is to be transmitted to the ATM switch 10. Subsequently, the cell editing unit 17 transmits this item of UDP data to the ATM network 20a. When finishing the process in this step S25, the signaling information request process is ended. Then, this item of UDP data is received by the ATM switch 10 via the ATM network 20a. This signaling information request process corresponds to request means of the present invention.

Figure 11:
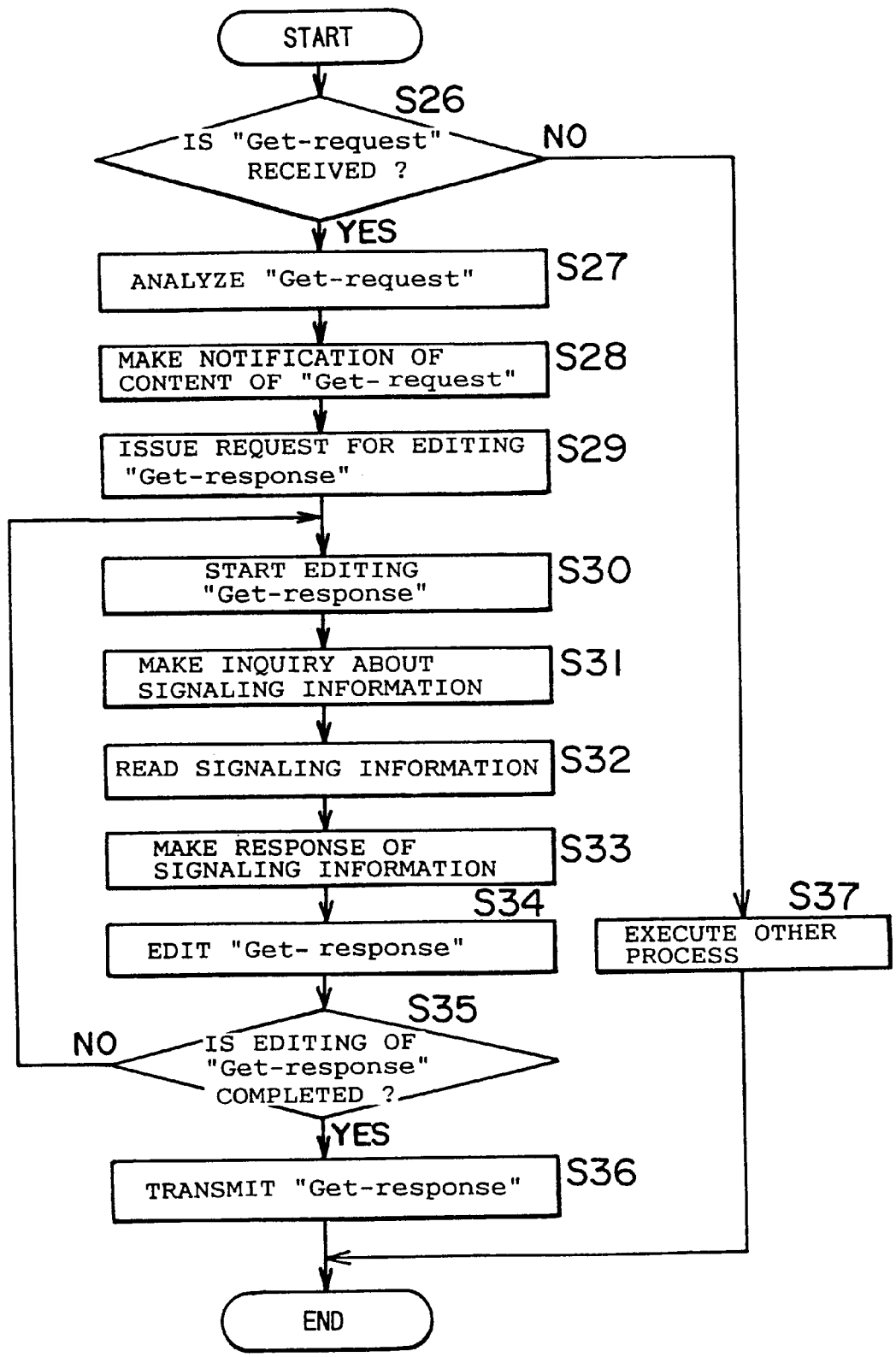
FIG. 11 is a flowchart showing a signaling information supplying process.

When the ATM switch 10 receives the UDP data, a signaling information supply process is executed therein. FIG. 11 is a flowchart showing the signaling information supply process.

As shown in FIG. 11, in step S26, the cell editing unit 36 (see FIG. 5) of the ATM switch 10 judges whether or not the UDP data received by the ATM switch 10 contains "Get-request". At this time, when judging that the UDP data contains "Get-request", the cell editing unit 36 extract "Get-request" out of the UDP data and supplies the S/I unit 33 with this message "Get-request". Then, the processing proceeds to step S27.

Whereas if it is judged that the UDP data does not contain "Get-request", the processing proceeds to step S37, wherein another process of the ATM switch 10 is implemented.

In step S27, the MIB editing unit 39 (see FIG. 6) of the S/I unit 33 receives "Get-request" through the information processing unit 40. Thereupon, the MIB editing unit 39 analyzes "Get-request" and thereby extracts a content (purporting a request for the signaling information of the call-in terminal) of "Get-request".

In step S28, the MIB editing unit 39 notifies the first protocol processing unit 38 of the content of "Get-request", which has bene obtained in step S27.

In step S29, the first protocol processing unit 38 receiving the content of "Get-request" issues a request for editing an SNMP message (hereinafter, referred to as "Get-response") containing the signaling information corresponding to the content of "Get-request", and notifies the MIB editing unit 39 of this edit request.

In step S30, the MIB editing unit 39 receiving the "Get-response" edit request, starts editing "Get-response". Simultaneously, the MIB editing unit 39 notifies the information processing unit 40 of a content of "Get-response" and an inquiry instruction of the signaling information corresponding to this content of "Get-response".

In step S31, the information processing unit 40 receiving the content of "Get-response" and the signaling information inquiry instruction, notifies the call control unit 35 of the content of "Get-reaquest" and the signaling information inquiry request.

In step S32, the second protocol processing unit 43 (see FIG. 7) of the call control unit 35 receives, via the acceptance unit 42, the content of "Get-request" and the signaling information inquiry request. Then, the second protocol processing unit 43 reads the signaling information (of the call-in terminal) corresponding to the content of "Get-request", from the signaling information table 47.

In step S33, the second protocol processing unit 43 notifies the acceptance unit 42 of the signaling information read in step S32. This item of signaling information is supplied to the MIB editing unit 39 via the acceptance unit 42 and the information processing unit 40 of the S/I unit 33.

In step S34, the MIB editing unit 39 receiving the signaling information edits "Get-response".

Judged in step S35 is whether the editing of "Get-response" is finished or not. At this time, when judging that the editing of "Get-response" is not yet finished, the processing returns to step S30, wherein a loop process of steps S30–S35 is repeated till it is judged in step S35 that the editing of "Get-response" is finished. Where as if it is judged that the editing of "Get-response" is finished, the MIB editing unit 39 notifies the information processing unit 40 of "Get-response". The information processing unit 40 transfers this message "Get-response" to the cell editing unit 36. Then, the processing proceeds to step S36.

In step S36, the cell editing unit 36 creates the UDP data containing "Get-response", which data is to be transmitted to the terminal (a call-out terminal) transmitting "Get-request". Subsequently, the cell editing unit 36 transmits this item of UDP data to the ATM network 20a. When the process in step S36 is finished, the signaling information supply process is ended. Then, the UDP data containing this message "Get-response" is received by the call-out terminal via the ATM network 20a. This signaling information supply process corresponds to supplying means of the present invention.

Figure 12:
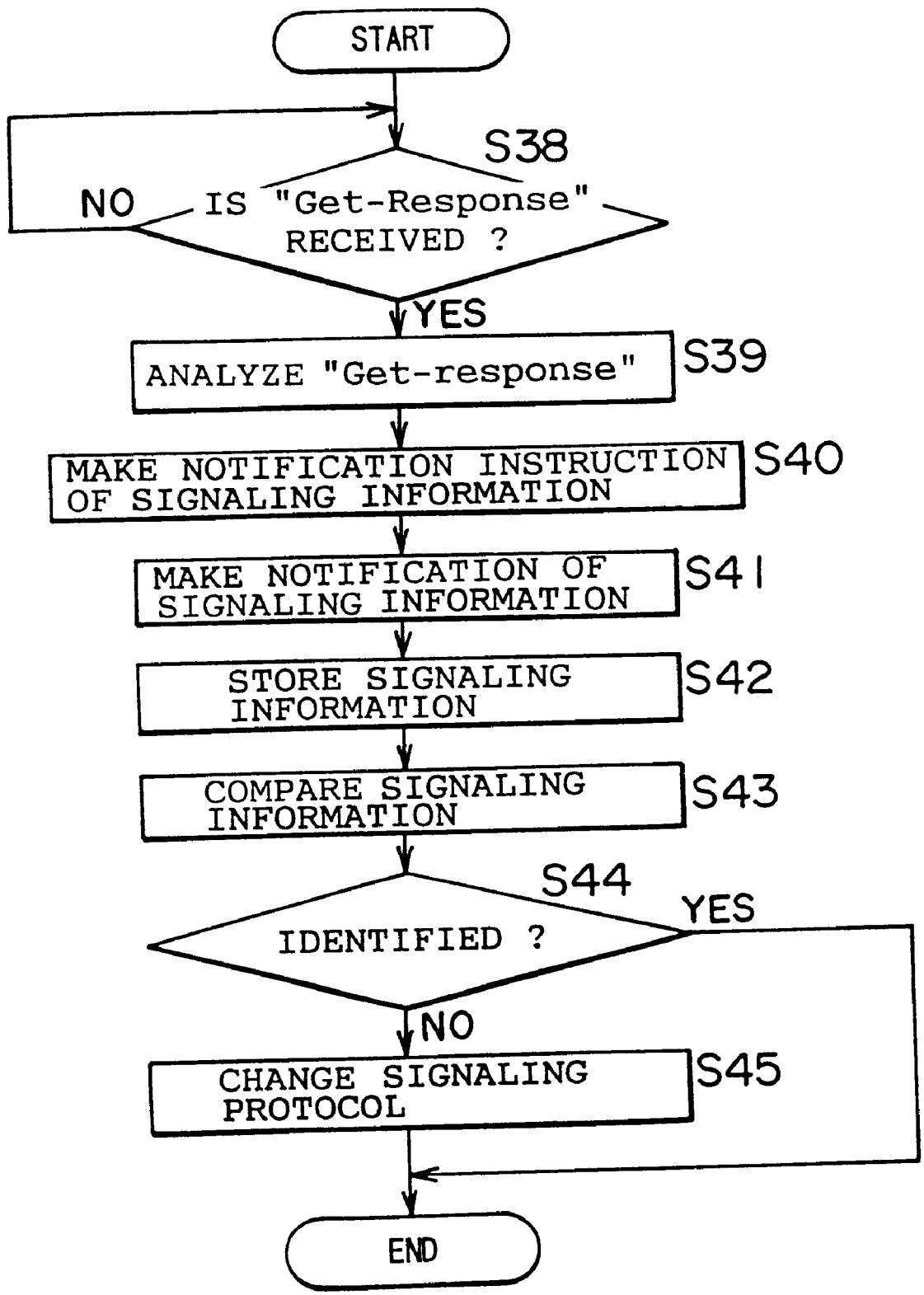
FIG. 12 is a flowchart showing a signaling protocol matching process.

Subsequently, in the call-out terminal receiving "Get-response", the signaling protocol matching process is executed. FIG. 12 is a flowchart showing the signaling protocol matching process. Note that this process starts immediately after the signaling information request process shown in FIG. 10 has been finished.

As shown in FIG. 12, in step S38, the cell editing unit 17 of the call-out terminal transmits the UDP data containing "Get-request" in step S25 (see FIG. 10), the operation comes to a wait-for-receipt status of the UDP data containing "Get-response" defined as a response thereto. Then, when receiving the UDP data containing "Get-response", the cell editing unit 17 extracts "Get-response" out of the UDP data and supplies the S/I unit 14 with "Get-response". Then, the processing proceeds to step S39.

In step S39, the MID editing unit 26 (see FIG. 3) of the S/I unit 14 receives "Get-response" via the information processing unit 27. Thereupon, the MIB editing unit 26 analyzes "Get-response" and thereby extracts the signaling information of the call-in terminal out of "Get-response". Upon finishing this extraction, the MIB editing unit 26 notifies the first protocol processing unit 25 of this purport.

In step S40, the first protocol processing unit 25 gives the information processing unit 27 a notifying instruction to notify the call control unit 15 of the signaling information obtained in step S39. This notifying instruction is given to the information processing unit 27 via the MID editing unit 26. At this time, MIB editing unit 26 supplies the information processing unit 27 with the signaling information obtained in step S38 together with the notifying instruction.

In step S41, the information processing unit 27 receiving the notifying instruction and the signaling information as well, notifies the call control unit 15 of the signaling information.

In step S42, the second protocol processing unit 30 see FIG. 4) of the call control unit 15 receives the ignaling information via the acceptance unit 29. Then, the second protocol processing unit 30 stores the signaling information table 24 with this piece of signaling information in such a form as to correspond to the information of the terminal that has transmitted the same signaling information.

In step S43, the second protocol processing unit 30 reads the signaling information of the relevant call-out terminal from the MIB 23, and compares this piece of signaling information with the signaling information of the call-in terminal which has been received in step S41.

In step S44, whether the signaling information compared in step S43 is identical or not. At this time, if the signaling information is identical, the second protocol processing unit 30 judges that a change in the signaling protocol is unnecessary. Thus, the signaling protocol matching process comes to an end. Whereas if not identical, the processing proceeds to step S45.

In step S45, the second protocol processing unit 30 changes the signaling protocol used by the call-out terminal into a signaling protocol corresponding to the signaling information of the call-in terminal. With this process, there comes to such a status that the signaling protocol used by the call-out terminal is coincident with the signaling protocol used by the call-in terminal. When finishing the process in this step 45, the signaling protocol matching process is ended. his signaling protocol matching process corresponds to first changing means of the present invention.

Then, the message exchange (the signaling procedure) for setting the call between the call-out terminal and the call-in terminal, is carried out through the ATM switch 10, and subsequently the data is transmitted and received.
<Example of Operation of Network System>

Figure 13:
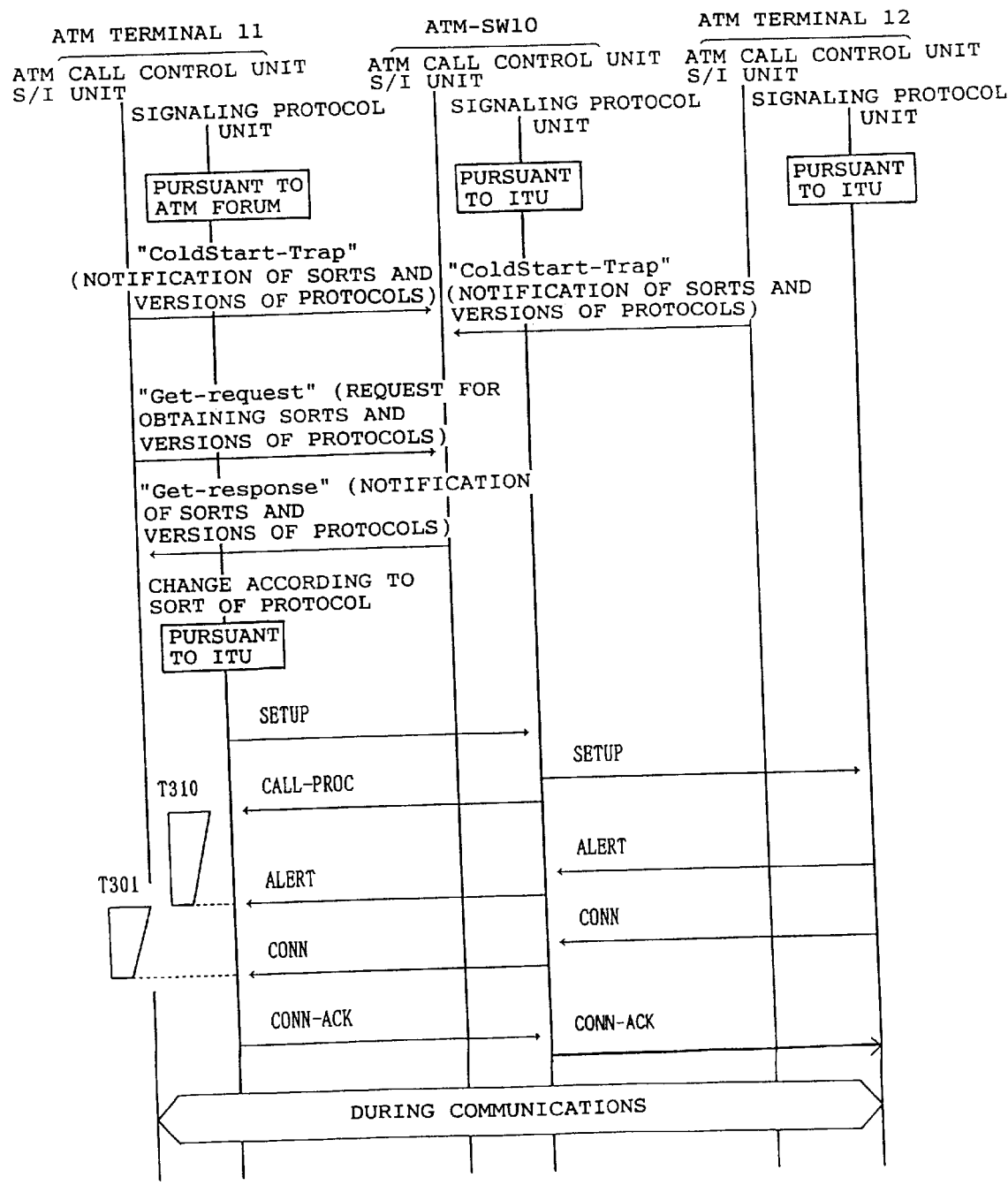
FIG. 13 is a sequence diagram showing an operation example of the network system in the embodiment 1.

Next, an example of operation (which may be a call setting method) of the above-described network system will be explained. FIG. 13 is a sequence diagram showing the example of operation of the network system. In this operation example, the terminal 11 serves as the call-out terminal, and the terminal 12 serves as the call-in terminal, wherein the data is transmitted and received. Note that the ATM networks 20, 20b interposed in between the terminal 11, the terminal 12 and the ATM switch 10 are omitted in FIG. 13.

Referring to FIG. 13, it is assumed that the signaling protocol of the terminal 11 before starting the operation is pursuant to the ATM forum, and that the signaling protocols of the terminal 12 and the ATM switch 10 are pursuant to the ITU (ITU-T recommendation Q.2931).

To begin with, the terminals 11, 12, upon switching ON the power supply 13 (see FIG. 2), execute the signaling information transmitting process (the processes in steps S01–S09 shown in FIG. 8), and respectively transmit "ColdStart-Trap" to the ATM switch 10. At this time, the terminal 11 transmits "ColdStart Trap" containing the signaling information purporting that the signaling protocol is pursuant to the ATM forum, and the terminal 12 transmits "ColdStart-Trap" containing the signaling information purporting that the signaling protocol is pursuant to the ITU.

The ATM switch 10, on receiving "ColdStart-Trap" respectively from the terminal 11 and the terminal 12, executes a signaling information supply process;

(processes in steps S26–S36 shown in FIG. 11), and transmits "Get-response" containing the signaling information of the terminal 12 to the terminal 11.

The terminal 11, when receiving "Get-response" from the ATM switch 10, executes a signaling protocol matching process (processes in steps S38–S45 shown in FIG. 12). At this time, it is judged in step S44 that the signaling protocol of the terminal 11 is not identical with the signaling protocol of the terminal 12, and hence, in step S45, the signaling protocol of the terminal 11 is changed to the one pursuant to the ITU from the one pursuant to the ATM forum. With this process, there comes to a status in which the terminal 11, the terminal 12 and the ATM switch 10 operate under the same signaling protocol.

Thereafter, a message exchange (the signaling procedure) for setting the call, which exchange will be explained hereinbelow, is carried out through the ATM switch 10, and subsequently the data is transmitted and received.

More specifically, first of all, "SETUP" defined as a call setting message is transmitted to the ATM switch 10 from the terminal 11. The ATM switch 10, upon receiving "SETUP" from the terminal 11, transfers "SETUP" to the terminal 12. Subsequently, the ATM switch 10 transmits, to the terminal 11, "CALL-PROC" defined as a message for accepting the call setting with respect to "SETUP".

The terminal 11, on receiving "CALL-PROC" from the switching system 10, makes a T310 timer start counting based on the ITU signaling protocol, and there comes to a wait-for-receipt of a call-out message "ALERT".

On the other hand, the terminal 12, when receiving "SETUP" from the switching system 10, transmits the call-out message "ALERT" based on the ITU signaling protocol, and subsequently transmits "CONN" defined as a connection message. At this time, "ALERT" is transmitted to the terminal 11 via the ATM switch 10. However, the signaling protocols used by the terminals 11, 12 are identical with each other, and therefore the terminal 11 receives "ALERT" before the T310 timer is timed out.

The terminal 11, when receiving "ALERT" from the switching system 10, makes the T310 timer start counting this time, and comes to a wait-for-receipt status of "CONN" given from terminal 12. Then, "CONN" transmitted from the terminal 12 is also received by the terminal 11 via the ATM switch 10 before this T310 timer is timed out.

The terminal 11, upon receiving "CONN" from the ATM switch 10, transmits "CONN-ACK" defined as an acceptance acknowledgement message of "CONN" to the ATM switch 10.

This message "CONN-ACK" is received by the terminal 12 via the ATM switch 10. Thus, the call setting is performed between the terminal 11 and the terminal 12. Then, after finishing the call setting, a data cell is transmitted from the terminal 11 with the terminal 12 serving as a receiving terminal, thus transmitting and receiving the data (data communications) between the terminal 11 and the terminal 12.

Incidentally, in this operation example, the signaling protocol of the terminal 11 before starting the operation is, e.g., V3.0 pursuant to the ATM forum, and the signaling protocols of the terminal 12 and of the ATM switch 10 are V3.1 pursuant to the ATM forum. In this case, the signaling protocol of the terminal 11 eventuates in a change to V3.1 pursuant to the ATM forum, and the call setting and the transmission/receipt of the data are properly implemented between the terminal 11 and the terminal 12.

According to the network system in the embodiment 1, to begin with, pieces of signaling protocol information of the terminals 11, 12, etc. converge at the ATM switch 10. Then, thereafter, the terminal becoming a call-out terminal is supplied with the signaling information of the call-in terminal from the ATM switch 10, and changes the signaling protocol used by the terminal itself based on the supplied signaling information, to a signaling protocol used by the call-in terminal. An impossible case of the call setting between the terminals, which is attributed to a difference between the signaling protocols, can be thereby obviated. Accordingly, the call setting of the SVC connection can be adequately executed, and, with this execution, the SVC service can be properly offered.

Besides, the data can be transmitted and received between the terminals more properly than in the prior arts.

Note that the ATM switch 10, when receiving "Get-request" from the call-out terminal, reads the signaling information of the call-in terminal from the signaling information table 47, and reads the signaling information of the ATM switch itself from the MIB 46.

Then, the ATM switch 10 compares the two items of signaling information, and may, if different from each other, change the signaling protocol of the ATM switch 10 to the signaling protocol of the call-in terminal. If changed in this manner, even in such a case that the signaling protocols of the call-out terminal, the ATM switch 10 and the call-in terminal are different from each other, there must be a state where the call-out terminal, the ATM switch 10 and the call-in terminal operate based on the same signaling protocol.

Further, the call-out terminal in the embodiment 1 retrieves the signaling information table 24 on the occasion of transmitting "Get-request" to the ATM switch 10, and, consequently if the signaling information table has already been stored with the call-in terminal signaling information to be obtained by transmitting "Get-request", the signaling protocol of the call-out terminal itself may be changed based on the signaling information stored in the signaling information table 24 without "Get-request" being transmitted by the call-out terminal. That is, only when the signaling information table 24 is stored with no signaling information of the call-in terminal, the call-out terminal may transmit "Get-request".

Further, in the embodiment 1, the call-in terminal signaling information received by the call-out terminal is so set as to be stored in the signaling information table 24. The signaling information may be, however, stored in the MIB 23. In this case, the signaling information of the call-in terminal may be newly stored in the MIB 23 or alternatively overwritten, as the signaling information of the signaling protocol used by the call-out terminal itself, to a storage area stored already with the signaling information.

[Embodiment 2]

Next, the network system in an embodiment 2 of the present invention will be discussed.

<Construction of Network System>

The network system in the embodiment 2 is constructed substantially the same as being constructed in the embodiment 1, and, since what is different is only the processing and operation, the explanation of the construction thereof is omitted (see FIGS. 1–7).

<Processing in Network System>

Next, the processing in the network system in the embodiment 2 will be described. When the data is transmitted and received between the terminals in the network system in the embodiment 2, the call-out terminal obtains the signaling information of the call-in terminal (which receives the data) via the ATM switch 10. Then, the call-out terminal, after changing the signaling protocol of the terminal itself to the signaling protocol of the call-in terminal on the basis of the thus obtained signaling information of the call-in terminal, transmits and receives the data via the ATM switch 10 as well as setting the call with respect to the call-in terminal. The processes of the call-out terminal, the call-in terminal and the ATM switch 10 on this occasion will be explained.

At the first onset, the call-out terminal executes a signaling information request process to request the ATM switch 10 to supply the signaling information of the call-in terminal. This signaling information request process is substantially the same as the signaling information request process (the processes in steps S21–S25; corresponding to the protocol information request unit) shown in FIG. 10, and hence the explanation thereof is omitted. By this signaling information request process, the UDP data containing "Get-request", which data is to be transmitted to the ATM switch 10, is received by the ATM switch 10 via the ATM network 20a or 20b shown in FIG.

Figure 14:
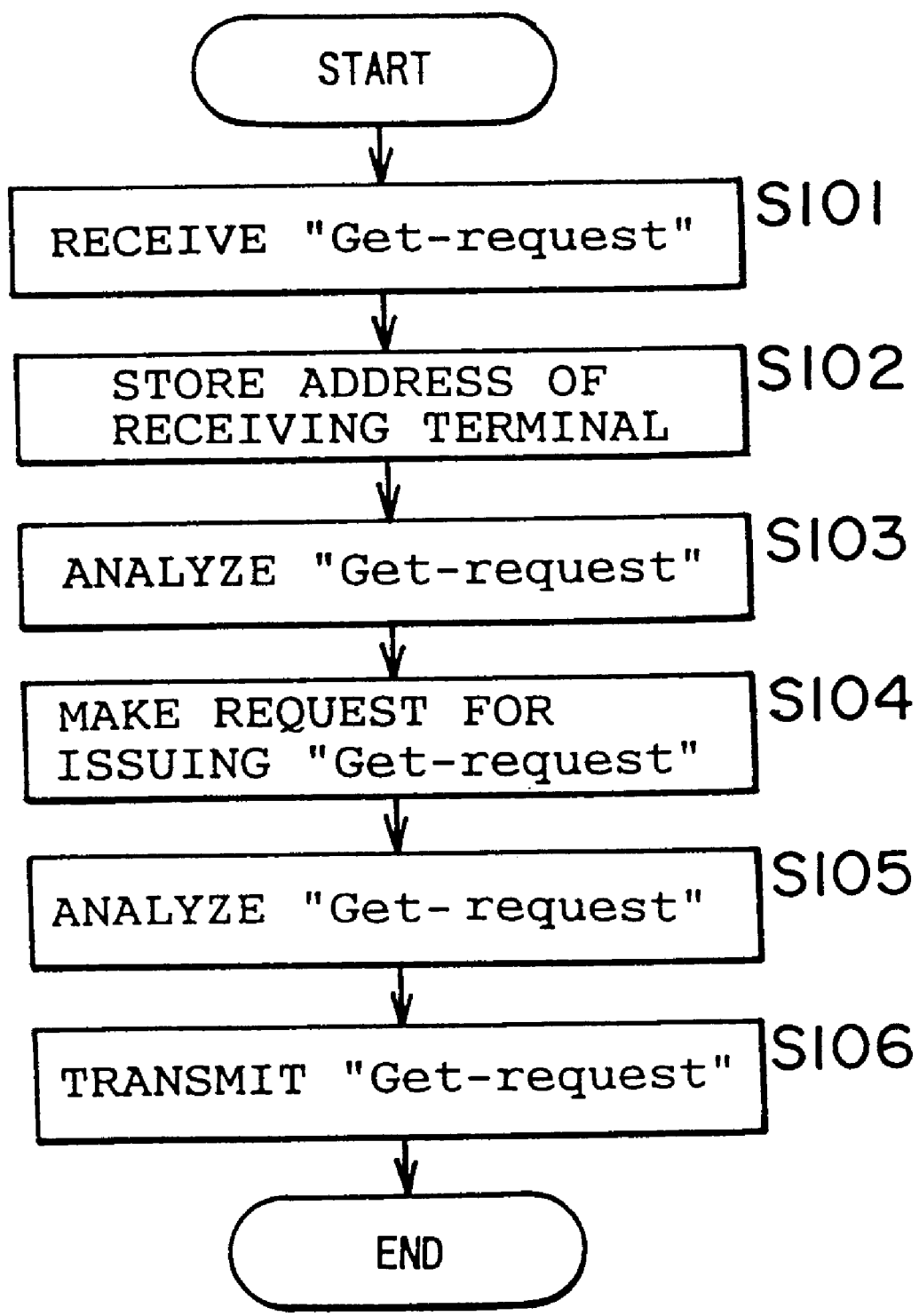
FIG. 14 is a flowchart showing the signaling information requesting process by the ATM switch.

The ATM switch 10 receives "Get-request" and thereby operates to obtain the signaling information from the call-in terminal and supply the call-out terminal with this piece of signaling information. Therefore, in the ATM switch 10, the signaling information request process by the ATM switch 10 is to be executed. FIG. 14 is a flowchart showing the signaling information request process by the ATM switch.

As shown in FIG. 14, in step S101, the cell editing unit 36 shown in FIG. 5 receives the UDP data containing "Get-request" that has been transmitted from the call-out terminal.

In step S102, "Get-request and a transmitting terminal address of the UDP data are extracted from the UDP data received in step S101. Then, "Get-request" extracted is transmitted to the S/I unit 33. On the other hand, the transmitting terminal address of the extracted UDP data is transmitted to the second protocol processing unit 43 (see FIG. 7) of the call control unit 35 and stored in this processing unit 43.

In step S103, the MIB editing unit 39 (see FIG. 6) of the S/I unit 33 receives "Get-request" and analyzes a content of "Get-request". Subsequently, the MIB editing unit 39 notifies the first protocol processing unit 38 of the content of "Get-request".

In step S104, the first protocol processing unit 38 receives the notification from the MIB editing unit 39, and notifies the MIB editing unit 39 of a request for issuing "Get-request" with a purport to obtain the signaling information from the call-in terminal as a response to that notification.

In step S105, the MIB editing unit 39 receiving the request for issuing "Get-request" edits "Get-request".

When the editing of "Get-request" has been finished, the MIB editing unit 39 notifies the cell editing unit 36 of this message "Get-request".

In step S106, the cell editing unit 36 receiving "Get-request" creates the UDP data containing "Get-request", which data is to be transmitted to the call-in terminal. Subsequently, the cell editing unit 36 transmits the same UDP data to the ATM network 20a or 20b. Upon en end of this process in step S106, the signaling information request process by the ATM switch 10 is ended.

Figure 15:
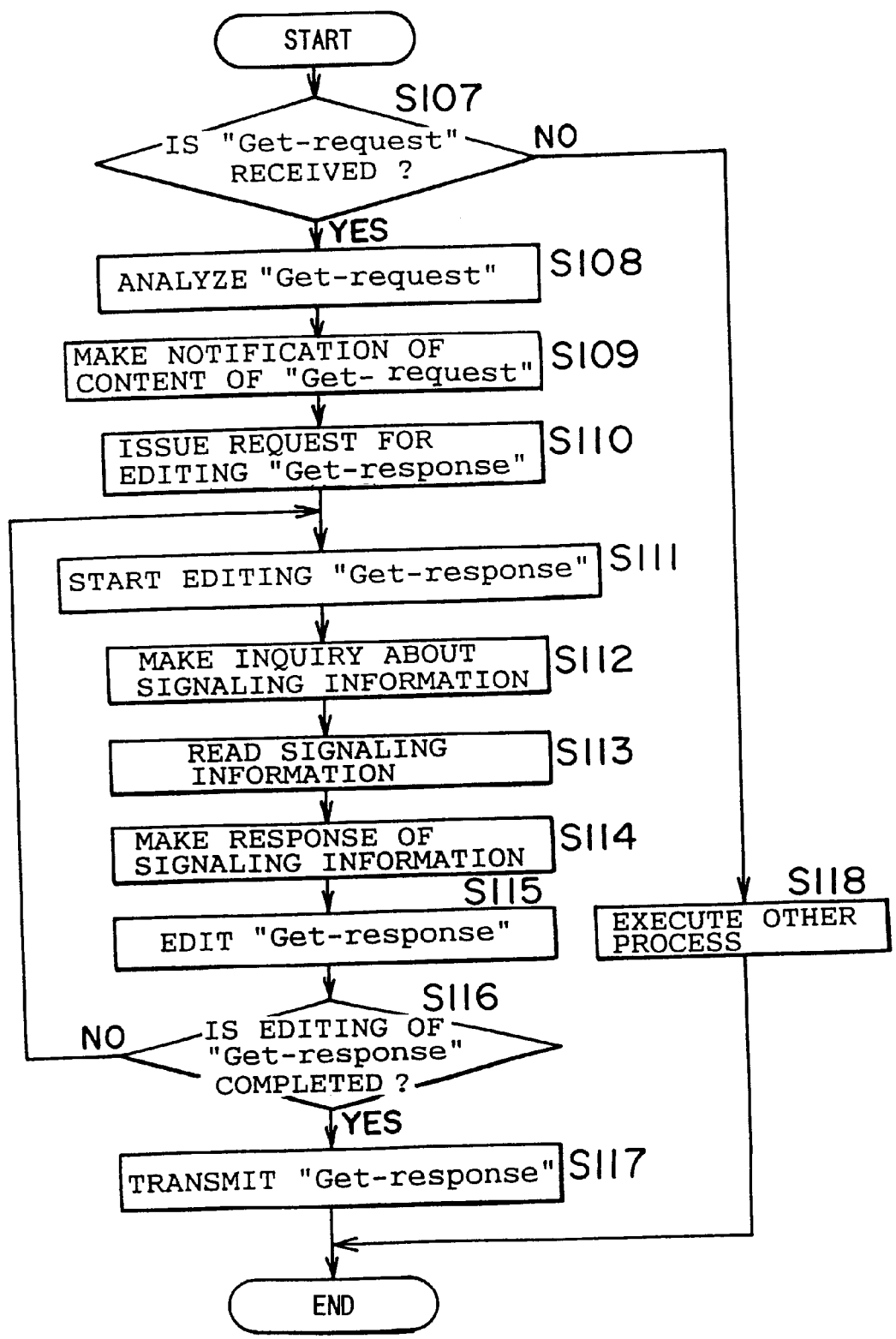
FIG. 15 is a flowchart showing a signaling information responding process.

This item of UDP data is received by the call-in terminal via the ATM network 20a or 20b. Thereupon, a signaling information response process is executed in that call-in terminal. FIG. 15 is a flowchart showing the signaling information response process.

As shown in FIG. 15, in step S107, the cell editing unit 17 (see FIG. 2) of the call-in terminal judges whether or not the UDP data received from the ATM switch 10 contains "Get-request". At this time, if the UDP data is judged as the data containing "Get-request", the cell editing unit 17 extracts "Get-request" from the UDP data and supplies the S/I unit 14 with "Get-request". Then, the processing proceeds to step S102. Whereas if the UDP data is judged as the data containing no "Get-request", the processing proceeds to step S118, and another process of the call-in terminal is carried out.

In step S108, the MIB editing unit 26 (see FIG. 3) of the S/I unit 14 receives "Get-request" via the information processing unit 27. Thereupon, the MIB editing unit 26 analyzes "Get-request" and thereby extracts a content (with a purport to request the signaling information of the call-in terminal) of "Getequest".

In step S109, the MIB editing unit 26 notifies the first protocol processing unit 25 of the content of "Get-request" that has been obtained in step S1.08.

In step S110, the first protocol processing unit 25 receiving the notification from the MIB editing unit 26 issues a request for editing the message ("Get-response") containing the signaling information corresponding to the content of "get-request", and notifies the MIB editing unit 26 of this editing request.

In step Sll1, the MIB editing unit 26 receiving the editing request issued in step S110 starts editing "Get-response". simultaneously, the MIB editing unit 26 notifies the information processing unit 27 of an inquiry instruction of the signaling information corresponding to the content of "Get-response" as well as of the content of "Get-response".

In step S112, the information processing unit 27 receiving the inquiry instruction of the signaling information notifies the call control unit 15 of the content of "Get-request" and the inquiry request of the signaling information as well.

In step S113, the second protocol processing unit 30 (see FIG. 4) of the call control unit 15 receives the content of "Get-request" and the inquiry request of the signaling information via the acceptance unit 29. Then, the second protocol processing unit 30 reads, from the MIB 23, the signaling information (of the terminal to and from which the data is transmitted and received) corresponding to the content of "Get-request".

In step S114, the second protocol processing unit 30 notifies the acceptance unit 29 of the signaling information read in step S107. This piece of signaling information is supplied to the MIB editing unit 26 via the acceptance unit 29 and the information processing unit 27 of the S/I unit 14.

In step S115, the MIB editing unit 26 receiving the signaling information edits "Get-response".

Judged in step S116 is whether the editing of "Get-response" is finished or not. At this time, if it is judged that the editing of "Get-response" is not yet finished, the processing returns to step Sill. In step S116, a loop process of steps S111–S116 is repeated till the editing of "Get-response" is judged to be ended in step S116. Whereas if the editing of "Get-response" is judged as being finished, the MIB editing unit 26 notifies the information processing unit 27 of "Get-response". The information processing unit 27 transfers "Get-response" to the cell editing unit 17. Then, the processing proceeds to step S117.

In step S117, the cell editing unit 17 creates the UDP data containing "Get-response", which data is to be transmitted to the ATM switch 10. Subsequently, the cell editing unit 17 transmits the UDP data to the ATM network 20a or 20b. Upon an end of the process in step S117, the signaling information response process is finished. This signaling information response process corresponds to a protocol information responding unit in the present invention. Then, the UDP data containing "Get-response" is received by the ATM switch 10 via the ATM network 20a or 20b.

Figure 16:
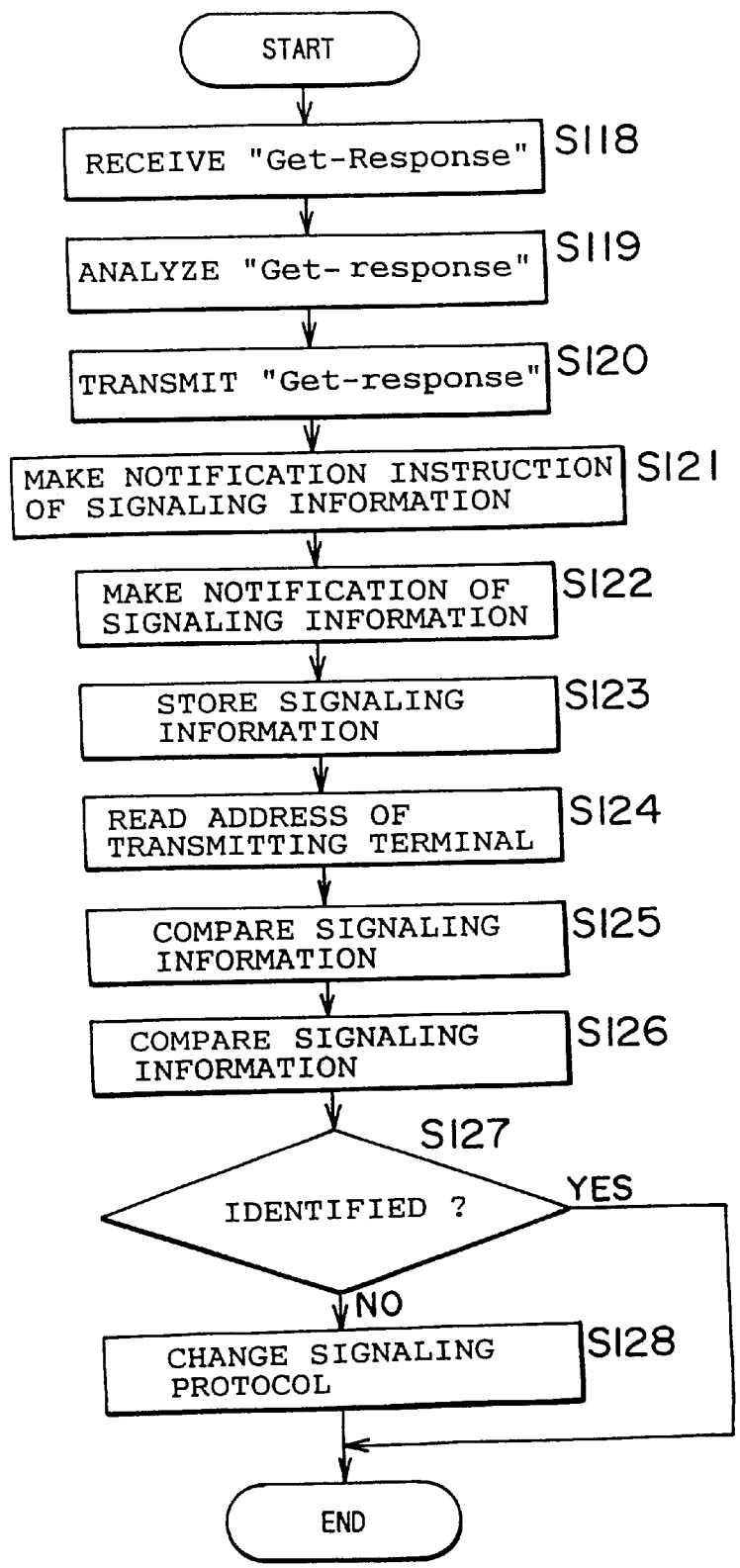
FIG. 16 is a flowchart showing a signaling information transferring process.

Subsequently, a signaling information transfer process is executed in the ATM switch 10 receiving "Get-response". FIG. 16 is a flowchart showing the signaling protocol transfer process by the ATM switch 10.

As shown in FIG. 16, in step S118, the cell editing unit 36 receives the UDP data containing "Get-response". Thereupon, the cell editing unit 36 extracts "Get-response" from the UDP data and supplies the S/I unit 33 with "Get-response".

In step S119, the MIB editing unit 39 (see FIG. 6) of the S/I unit 33 receives "Get-response" via the information processing unit 40. Then, the MIB editing unit 39 analyzes "Get-response" and thereby extracts the signaling information of the call-in terminal from "Get-response". Then, upon finishing the extraction, the MIB editing unit 39 notifies the first protocol processing unit 38 of this purport.

In step S120, the MIB editing unit 39 sends "Getesponse" back to the cell editing unit 36.

In step S121, the first protocol processing unit 38 receiving the notification from the MIB editing unit 39 supplies the information processing unit 40 with a notification instruction with a purport to notify the call control unit 35 of the signaling information obtained in step S119. This notification instruction is supplied via the MIB editing unit 39 to the information processing unit 40. At this time, the MIB editing unit 39 supplies the information processing unit 40 with the signaling information obtained in step S119 together with the notification instruction.

In step S122, the information processing unit 40 receiving the notification instruction and the signaling information, notifies the call control unit 35 of the signaling information.

In step S123, the second protocol processing unit 43 (see FIG. 7) of the call control unit 35 receives the signaling information via the acceptance unit 42.

Thereupon, the second protocol processing unit 43 stores the signaling information table with the signaling information in such a form as to correspond to the cal-in terminal.

In step S124, the second protocol processing unit 43 reads a transmitting terminal address (an address of the call-out terminal) of "Get-response" stored in step S102 (see FIG. 14). Subsequently, the cell editing unit 36 is notified of this address of the call-out terminal.

In step S125, the cell editing unit 36 creates the UDP data containing "Get-response", which data is to be transmitted to the call-out terminal, by use of "Get-response" sent back in step S120 and the call-out terminal address received from the call control unit 35. Then, the cell editing unit 36 transmits the UDP data to the ATM network 20a or 20b. Wit this process, the UDP data containing "Get-request" is received by the call-out terminal via ATM network 20a or 20b.

In step S126, the second protocol processing unit 43 reads the signaling information of the signaling protocol used by the ATM switch 10, from the M4IB 46 (corresponding to a second self-protocol information storage unit), and compares this piece of signaling information with the cal-in terminal signaling information received in step S123.

Judged in step S127 is whether or not the two pieces of signaling information compared in step S126 are identical with each other. At this time, if the two pieces of signaling information are identical with each other, the second protocol processing unit 43 recognizes that a change in the signaling protocol is unnecessary. With this process, the signaling information transfer process is finished. Whereas if not identical, the processing proceeds to step 128.

In step S128, the second protocol processing unit 43 changes the signaling protocol used by the ATM switch 10 to a signaling protocol corresponding to the signaling information received in step S123. With this process, there comes to such a status that the signaling protocol of the ATM switch 10 is coincident with the signaling protocol of the call-in terminal. When the process in this step S128 is finished, the signaling information transfer process is ended.

The call-out terminal, upon receiving the UDP data containing "Get-response" transmitted from the ATM switch 10, executes the signaling protocol matching process. This signaling protocol matching process is the same as the signaling protocol matching process (the processes in steps S38–S45: corresponding to a first protocol changing unit) shown in FIG. 12, and hence its explanation is omitted. Owing to this signaling protocol matching process, there comes to a status in which the protocols of the call-out terminal, the ATM switch 10 and the call-in terminal become coincident with each other. Then, the message exchange (the signaling procedure) for setting the call between the call-out terminal and the call-in terminal, is carried out, and subsequently the data is transmitted and received.

<Example of Operation of Network System>

Figure 17:
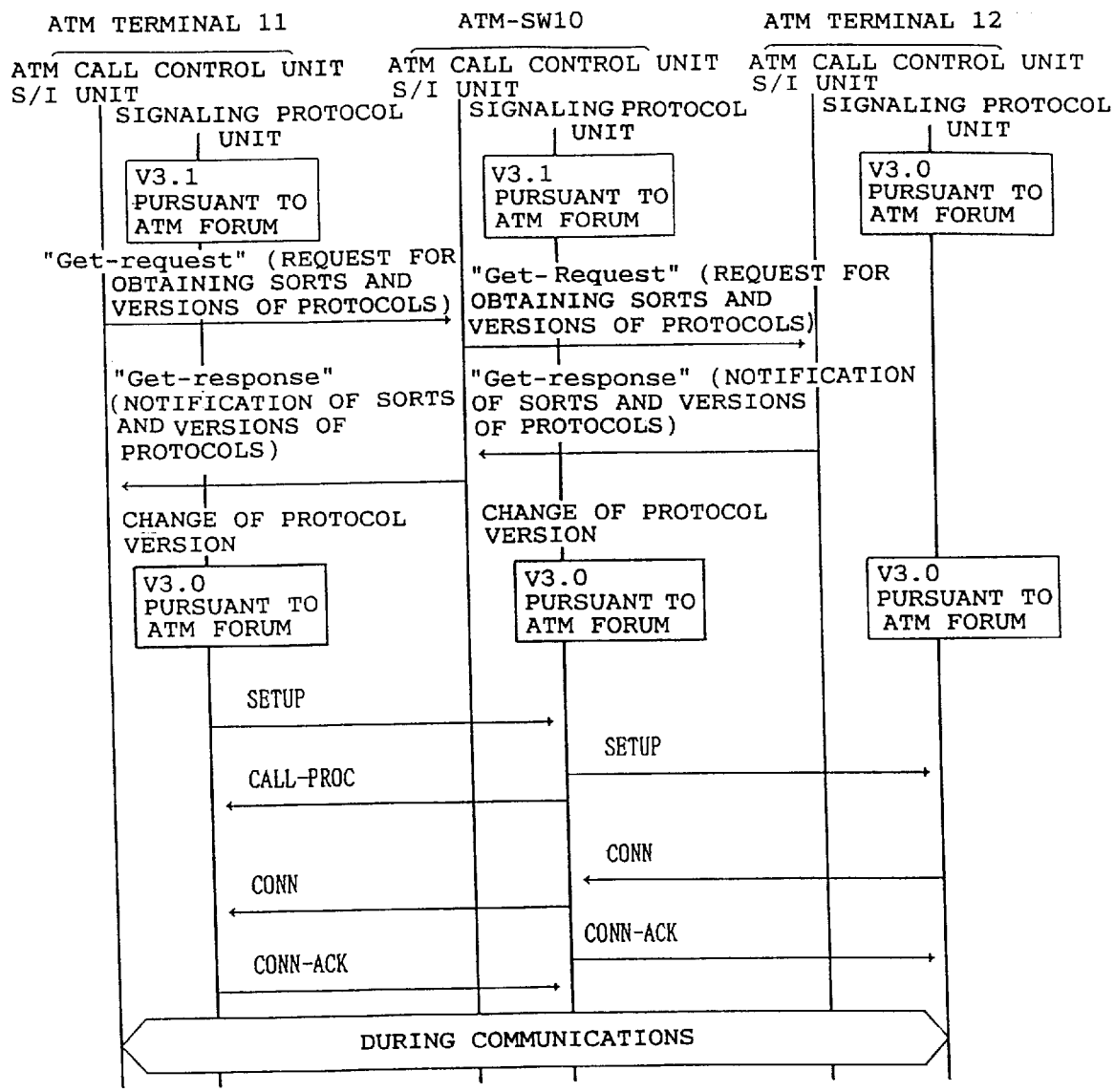
FIG. 17 is a sequence diagram showing an operation example of the network system in an embodiment 2.

Next, an example of operation of the network system in an embodiment 2 will be described. FIG. 17 is a sequence diagram showing the operation example of the network system in the embodiment 2. In this operation example, the terminal 11 illustrated in FIG. 1 is a call-out terminal, while the terminal 12 is a call-in terminal, wherein the data is transmitted and received. Incidentally, in FIG. 17, the ATM networks 20a, 20b interposed between the terminal 11, the terminal 12 and the ATM switch 10, are omitted.

Referring to FIG. 17, it is assumed that the signaling protocols of the terminal 11 and the ATM system 10 before starting the operation are, e.g., V3.1 pursuant to the ATM forum, and the signaling protocol of the terminal 12 is V3.0 pursuant to the ATM forum.

At first, when a call-out request is inputted to the terminal 11 (from the user), a signaling information request process (processes in steps S21–S25 shown in FIG. 10) is executed in the terminal 11. With this process, "Get-request" for obtaining the signaling information (about a sort and a version of the protocol) of the terminal 12, is transmitted to the ATM switch 10.

When the ATM switch 10 receives "Get-request" from the terminal 11, the signaling information request process (processes in steps S101–S106 shown in FIG. 14) by the ATM switch 10 is implemented in the ATM switch 10. "Get-request" defined as a request for obtaining the signaling information is thereby transmitted to the terminal 12.

When the terminal 12 receives "Get-request" from the ATM switch 10, a signaling information response process (processes in steps S107–S117 shown in FIG. 15) is executed in the terminal 12. "Get-response" containing the signaling information of the terminal 12 is thereby transmitted to the ATM switch 10.

When the ATM switch 10 receives "Get-respcinse" from the terminal 12, a signaling information transfer process (processes in steps S118–S128 shown in FIG. 16) is performed in the ATM switch 10. "Get-response" transmitted to the terminal 11 from the terminal 12 is thereby transferred. Further, the signaling protocol of the ATM switch 10 is changed in terms of version from V3.1 to V3.0.

When the terminal 11 receives "Get-response" from the ATM switch 10, the signaling protocol matching process (the processes in steps S38–S45 shown in FIG. 12) is executed in the terminal 11. With this process, the signaling protocol of the terminal 1 is changed in version from V3.1 to V3.0. Thus, the signaling protocols of the terminals 11, 12 and the ATM switch 10 are matched, resulting in such a status that the signaling protocols are coincident with each other.

Thereafter, the message exchange for setting the call is performed between the terminal 11 and the terminal 12, and subsequently the data is transmitted and received. The message exchange for setting the call in this operation example is based on the ATM forum V3.0 and common to the message exchange for setting the call which has been explained as being pursuant to the ITU in the embodiment 1, except for such a point that "ALERT", and the T310- and T301-timers are not provided. Hence, the explanation thereof is omitted.

Incidentally, in this operation example, the signaling protocols of the terminal 11 and the ATM switch 10 before starting the operation are pursuant to, e.g., the ITU, while the signal protocol of the terminal 12 is, e.g., V3.0 pursuant to the ATM forum. In this case, as a matter of course, the signaling protocols of the terminal 11 and the ATM switch 10 are eventually changed to V3.0 pursuant to the ATM forum, and there are properly executed the call setting and the data transmission/receipt between the terminal 11 and the terminal 12.

The effects of the embodiment 2 are substantially the same as those of the embodiment 1. As a matter of course, the signaling information transmitting process (see FIG. 8) and the signaling information receiving process (see FIG. 9) can be omitted, and hence, as compared with the embodiment 1, the processes of the terminals 11, 12 and the ATM switch 10 can be relieved.

Further, in the embodiment 2, even if the signaling protocols of the call-in terminal and the ATM switch 10 are not identical with each other, the signaling protocols of the call-out terminal, the call-in terminal and the ATM switch 10 can be made coincident.

Note that only when the signaling information table 24 is not stored with the signaling information of the call-in terminal, the call-out terminal may transmit "Get-request" also in the embodiment 2.

[Embodiment 3]

Next, the network system in accordance with an embodiment 3 of the present invention will be explained.

<Construction of Network System>

The network system in the embodiment 3 has substantially the same construction as that in the embodiment, and only the processing and operation are different. Hence, the explanation thereof is omitted (see FIGS. 1–7)

<Processing in Network System>

Next, the processing in the network system in the embodiment 3 will be described. When the data is transmitted and received between the terminals in this network system, the call-out terminal requests the ATM switch 10 and the call-in terminal to change the signaling protocols, thereby changing the signaling protocols used by the ATM switch 10 and the call-in terminal to the signaling protocol of the call-out terminal. Thereafter, the call setting and the data transmission/receipt are performed between the call-out terminal and the call-in terminal. The processes in the call-out terminal, the call-in terminal and the ATM switch 10 in this case will be described.

Figure 18:
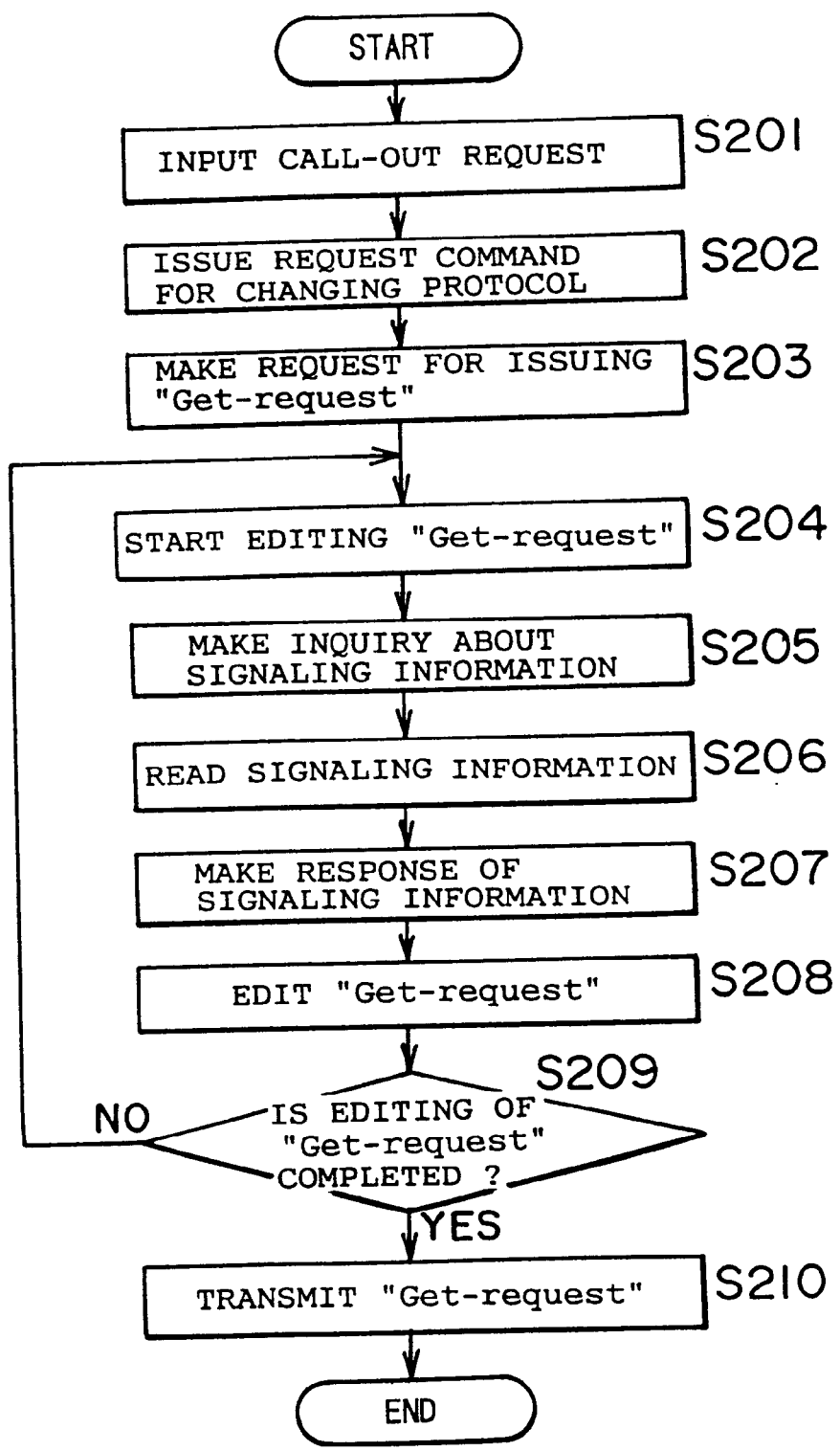
FIG. 18 is a flowchart showing a protocol change requesting process.

The call-out terminal, on the occasion of setting the call with respect to the call-in terminal, executes a protocol change request process for requesting the ATM switch 10 and the call-in terminal to change the signaling protocols. FIG. 18 is a flowchart showing the protocol change request process.

As shown in FIG. 18, in step S201, the call-out request for transmitting and receiving the data is inputted to the acceptance 29 (see FIG. 4) of the call control unit 15 from an unillustrated I/O device of the call-out terminal. Thereupon, the acceptance unit 29 transfers this call-out request to the second protocol processing unit 30.

In step S202, the second protocol processing unit 30 receiving the call-out request issues a protocol change request command with a purport to create a change request of the signaling protocols (protocol change request) with respect to the ATM switch 10 and the call-in terminal. This protocol change request command is sent to the S/I unit 14 via the acceptance unit 29.

In step S203, the first protocol processing unit 25 (see FIG. 3) of the S/I unit 14 receives the protocol change request command through the information processing unit 27 and the MIB editing unit 26. Thereupon, the first protocol processing unit 25 notifies the MIB editing unit 26 of the request for issuing "Get-request" containing the signaling information of the call-out terminal and the protocol change request.

In step S204, the MIB editing unit 26 receiving the request for issuing "Get-request" starts editing "Get-request". At this time, the MIB editing unit 2,6 notifies the information processing unit 27 of a request for reading the signaling information of the call-out terminal.

In step S205, the information processing unit 27 receiving the request for reading the signaling information from the MIB editing unit 26, notifies the call control unit 15 shown in FIG. 2 of a request for inquiry about the signaling information. In the call control unit 15, the second protocol processing unit 20 (see FIG. 4) receives this signaling information inquiry request via the acceptance unit 29.

In step S206, the second protocol processing unit 30 receiving this signaling information inquiry request, reads the signaling information of the call-out terminal from the MIB 23.

In step S207, the second protocol processing unit 30 notifies the acceptance unit 29 of the signaling information read by the second protocol processing unit 30 in step S205. This piece of signaling information of the cal-out terminal is received as a response to the signaling information inquiry request by the MIB editing unit 26 via the acceptance unit 29 and the information processing unit 27 of the S/I unit 14.

In step S208, the MIB editing unit 26 receiving the signaling information of the call-out terminal edits "Get-request" containing the protocol change request and the signaling information of the call-out terminal.

Judged in step S209 is whether the editing of "Get-request" is completed or not. At this time, if the editing of "Get-request" is not yet finished, the processing returns to step S204, wherein a loop process of steps S204–S209 is repeated till the editing of "Get-request" is ended. Whereas if the editing if "Get-request" is ended, "Get-request" edited is sent to the cell editing unit 17 illustrated in FIG. 2. Then, the processing proceeds to step S210.

In step S210, the cell editing unit 17 receiving "Get-request" creates the UDP data holding "Get-request" as a piece of data, and transmits this item of UDP data to the ATM network 20a or 20b. When finishing the process in this step S210, the protocol change request process is finished. This protocol change request process corresponds to a protocol change requesting unit according to the present invention. Note that the UDP data containing "Get-request" is received by the ATM switch 10 via the ATM network 20a or 20b.

Figure 19:
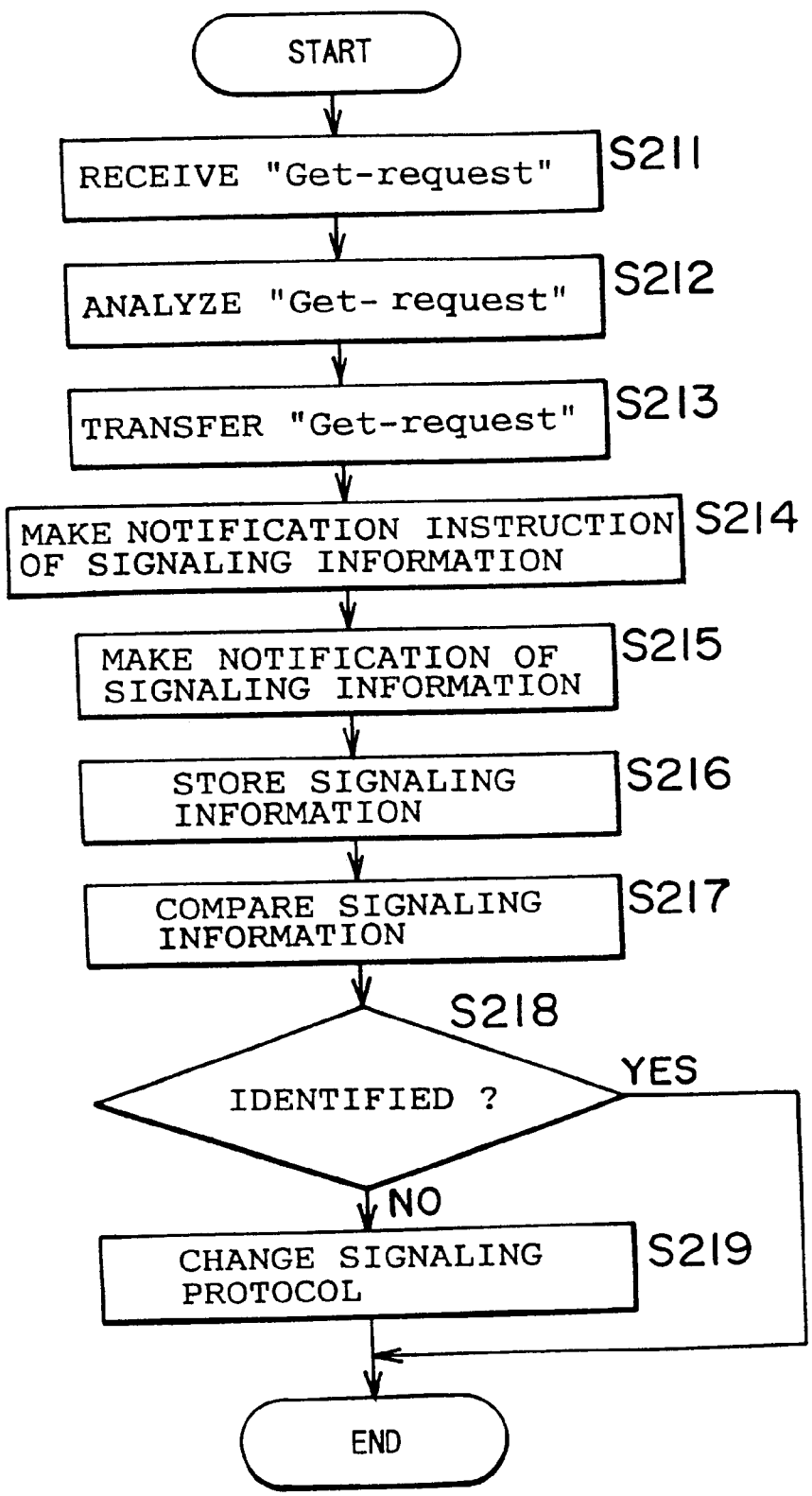
FIG. 19 is a flowchart showing a protocol changing process by the ATM switch.

The ATM switch 10, upon receiving "Get-request" from the call-out terminal, executes a protocol change process by the ATM switch 10. FIG. 19 is a flowchart showing the protocol change process by the ATM switch 10.

As shown in FIG. 19, in step S211, the cell editing unit 36 (see FIG. 5) receives the UDP data containing "Get-request". Thereupon, the cell editing unit 36 extracts "Get-request" from the UDP data and supplies the S/I unit 33 with "Get-request".

In step S212, the MIB editing unit 39 (see FIG. 6) of the S/I unit 33 receives "Get-request" via the information processing unit 40. Thereupon, the MIB editing unit 39 analyzes "Get-request" and thereby extracts the signaling information of the call-out terminal and the protocol change request therefrom. At the same time, the MIB editing unit 39 recognizes that "Get-request" is defined as a request for changing the signaling protocol of the call-out terminal. Then, the MIB editing unit 39 notifies the first protocol processing unit 38 of a content of its own recognition.

In step S213, the MIB editing unit 39 sends "Get-request" back to the cell editing unit 36. Then, the cell editing unit 36 transfers the UDP data containing "Get-request" to the call-in terminal.

In step S214, the first protocol processing unit 38 receiving the notification from the MIB editing unit 39 gives the information processing unit 40 a notification instruction with a purport to notify the call control unit 35 of the protocol change request and the signaling information of the call-out terminal that has been obtained in step S119. This notification instruction is supplied via the MIB editing unit 39 to the information processing unit 40. At this time, the MIB editing unit 39 supplies the information processing unit 40 with the notification instruction, the signaling information of the call-out terminal and the protocol change request.

In step S215, the information processing unit 40 receiving the notification instruction, notifies the call control unit 35 of the signaling information f the call-out terminal and the protocol change request.

In step S216, the second protocol processing unit 43 (see FIG. 7) of the call control unit 35 receives the signaling information and the protocol change request via the acceptance unit 42. Thereupon, the second protocol processing unit 43 stores the signaling information table 47 with the signaling information in such a form as to correspond to the call-out terminal.

In step S217, the second protocol processing unit 43 reads the signaling information of the ATMI switch 10 that is stored in MIB 46 an compares this piece of signaling information with the signaling information of the call-out terminal.

Judged in step S218 is whether or not the signaling information of the ATM switch 10 is indetical with the signaling information of the call-out terminal. At this time, if the two pieces of information are judged as being identical, the protocol change process by the ATM switch 10 is finished. Whereas if the two pieces of information are judged as being unidentical, the processing proceeds to step S219.

In step S219, the second protocol processing unit 43 changes the signaling protocol used by the ATM switch 10 to a signaling protocol corresponding to the signaling information of the call-out terminal. With this process, there comes to such a status that the signaling protocol used by the ATM switch 10 becomes identical with signaling protocol used by the call-out terminal. When finishing the process in this step S219, the protocol change process by the ATM switch 10 is ended. This protocol change process by the ATM switch 10 corresponds to a second protocol changing unit of the present invention.

Figure 20:
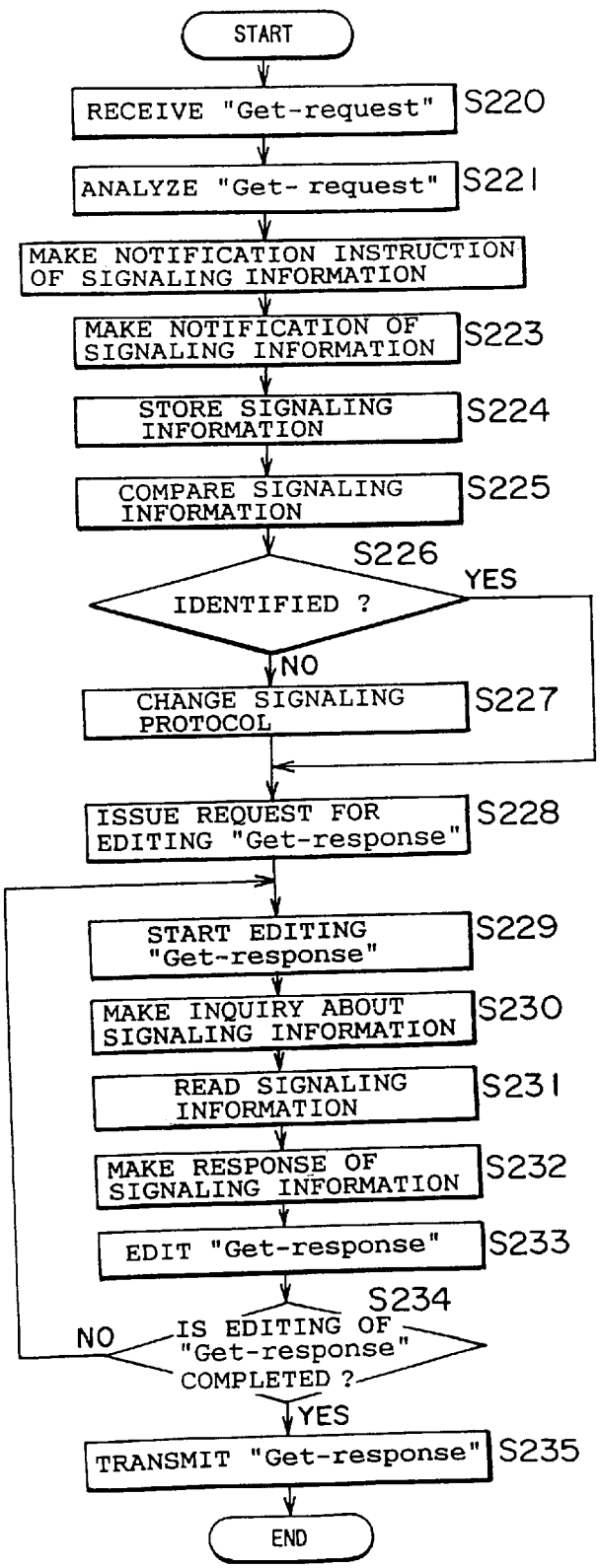
FIG. 20 is a flowchart showing a protocol changing process by a call-in terminal.

The UDP data containing "Get-request" that has been transmitted from the ATM switch 10 in step S213, is received by the call-in terminal via the ATM network 20a or 20b. Thereupon, in the call-in terminal, the protocol change process by the call-in terminal is executed. FIG. 20 is a flowchart showing the protocol change process by the call-in terminal.

As shown in FIG. 20, through processes in steps S220–S227, the signaling protocol of the call-in terminal is changed to a signaling protocol of the call-out terminal. Owing to this processing, the call-out terminal, the ATM switch 10 and the call-in terminal operate based on the same signaling protocol. The processes in steps S220–S227 are substantially the same as the processes in steps S211–S219 shown in FIG. 19, and hence the explanations thereof are omitted. However, the protocol change process by the call-in terminal has not process corresponding to the process in step S213.

Upon an end of the process in step S227, through processes in steps S228–S235, the UDP data of "Get-response" containing the signaling information of the call-in terminal after the protocol change process, is transmitted to the ATM switch 10. These processes in steps S228–S235 are substantially the same as the processes in steps S29–S36 shown in FIG. 11, and therefore their explanations are omitted. Then, when the process in step S235 is finished, the protocol change process by the call-in terminal is implemented.

Note that the UDP data containing "Get-response" which has been transmitted from the call-in terminal is received by the ATM switch 10 via the ATM network 20a or 20b. Then, the signaling information table 47 is stored with the signaling information of the call-in terminal after being changed, which information is contained in "Get-response". Further, UDP data of this message "Get-response" is received by the call-out terminal from the ATM switch 10 via the ATM network 20a or 20b. Then, the signaling information table 24 is stored with the signaling information after being changed, which information is contained in "Get-response". Moreover, from the receipt of this item of UDP data, the call-out terminal judges that the signaling protocols of the ATM switch 10 and the call-in terminal have been changed to the signaling protocol employed by the call-out terminal itself. Then, the message exchange for setting the call with respect to the call-in terminal is performed through the ATM switch 10, and subsequently the data is transmitted and received.

<Example of Operation of Network System>

Figure 21:
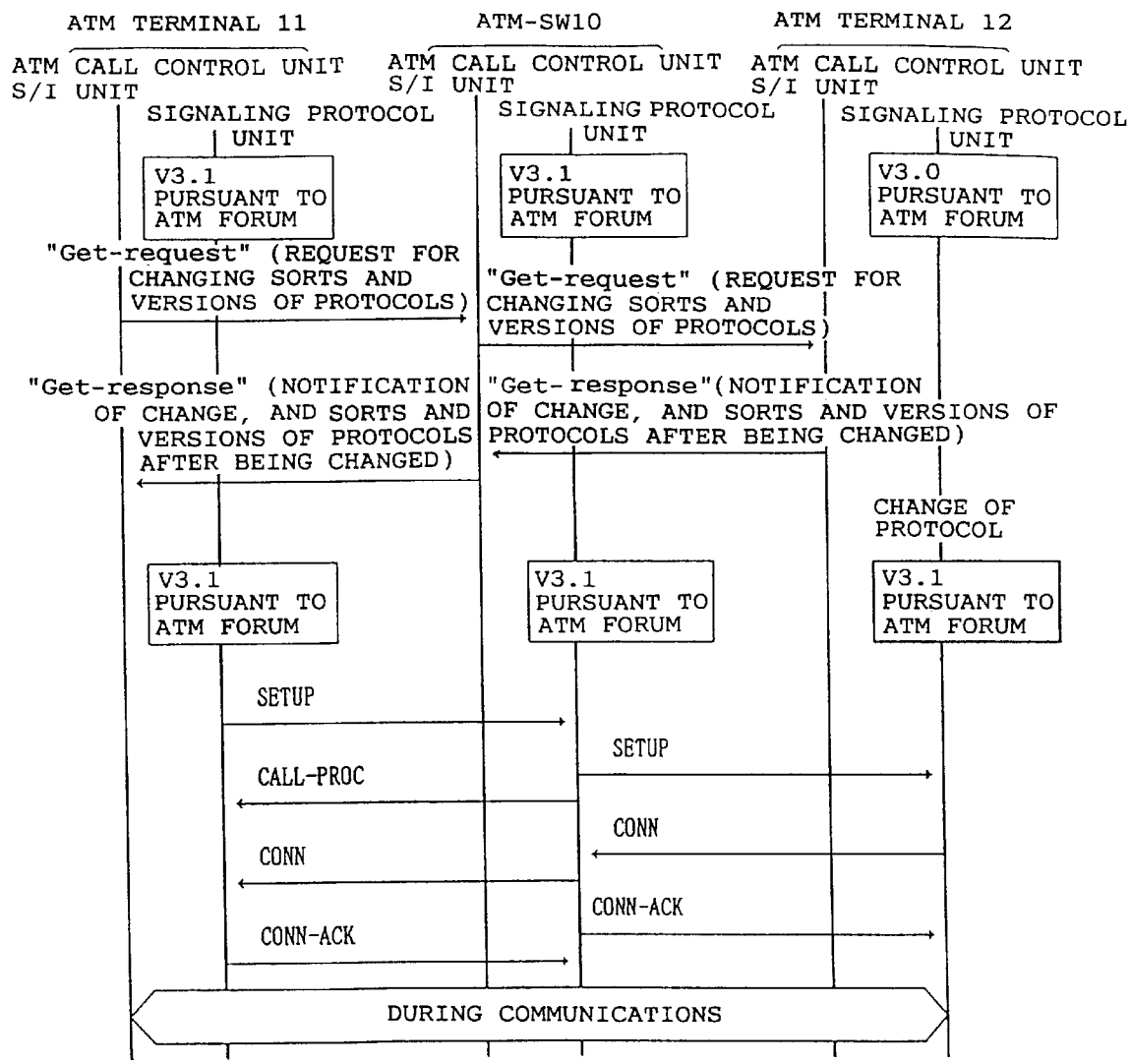
FIG. 21 is a sequence diagram showing an operation example of the network system in an embodiment 3.

Next, an example of operation of the network system in an embodiment 3 will be explained. FIG. 21 is a sequence diagram showing the example of operation of the network system in the third embodiment. In this operation example, the terminal 11 shown in FIG. 1 serves as the call-out terminal, and the terminal 12 serves as the call-in terminal, wherein the data is transmitted and received Note that the ATM networks 20, 20b interposed in between the terminal 11, the terminal 12 and the ATM switch 10 are omitted in FIG. 21.

Referring to FIG. 21, it is assumed that the signaling protocols of the terminal 11 and the ATM switch 10 before starting the operation are V3.1 pursuant to the ATM forum, and that the signaling protocol of the terminal 12 is V3.0 pursuant to the ATM forum.

To begin with, when a call-out request is inputted to the terminal 11 (from the user), the protocol change process (processes in steps S201–S210 shown in FIG. 18) is executed in the terminal 11. With this process, "Get-request" containing the signaling information of the terminal 11 and the protocol change request purporting that the protocol should be changed to the signaling protocol of the terminal 11, is transmitted to the ATM switch 10.

When the ATM switch 10 receives "Get-request" from the terminal 11, the protocol change process (processes in steps S211–S219 shown in FIG. 19) by the ATM switch 10 is executed in the ATM switch 10. "Get-request" from the terminal 11 is thereby transmitted to the terminal 12, and the signaling protocol of the ATM switch 10 is changed. The signaling protocol of the ATM switch 10 before starting the operation is, however, the same as the signaling protocol of the terminal 11, and these protocols are judged as being indetical in step S218 (see FIG. 19). Hence, the signaling protocol is not changed.

When the terminal 12 receives "Get-request" from the ATM switch 10, the protocol change process (processes in steps S220–S235 shown in FIG. 20) by the call-in terminal is implemented in the terminal 12. The signaling protocol of the terminal 12 is there by changed from V3.0 pursuant to the ATM forum to V3.1 pursuant to the ATM forum. Accordingly, there comes to such a status that the signaling protocols of the terminals 11, 12 and the ATM switch 10 become coincident with each other.

Owing to this protocol change process by the call-in terminal, "Get-response" is transmitted from the terminal 12 and received by the ATM switch 10 and the terminal 11. It is confirmed from this process that the signaling protocols of the ATM switch 10 and the terminals 11, 12 have been changed. Then, the message exchange for setting the call between the terminal 11 and the terminal 12 is performed through the ATM switch 10, and subsequently the data is transmitted and received. Note that the message exchange for setting the call is substantially the same as that in the embodiment 2, and hence its explanation is omitted.

Incidentally, in this operation example, the signaling protocol of the terminal 11 before starting the operation is pursuant to, e.g., the ITU, and the signaling protocols of the terminal 12 and of the ATM switch 10 are, e.g., V3.0 pursuant to the ATM forum. In this case, the signaling protocols of the ATM switch 10 and the terminal 11 are eventually changed to the ones pursuant to the ITU, and, as a matter of course, the call setting and the transmission/ receipt of the data are properly implemented between the terminal 11 and the terminal 12.

The effects of the embodiment 3 are substantially the same as those of the embodiment 1.

Figure 22A:
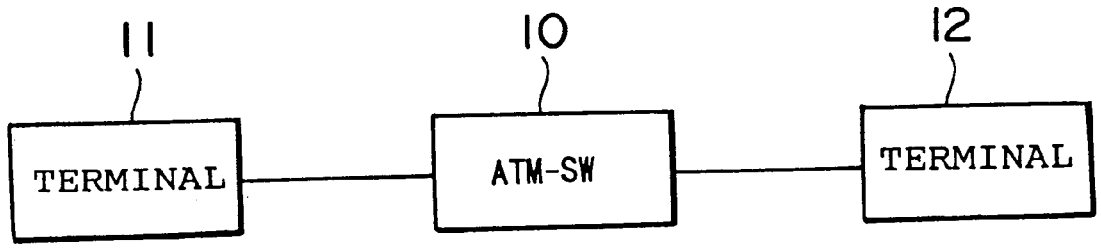
FIG. 22 is a diagram illustrating a construction of the network system in another embodiment.
Figure 22B:
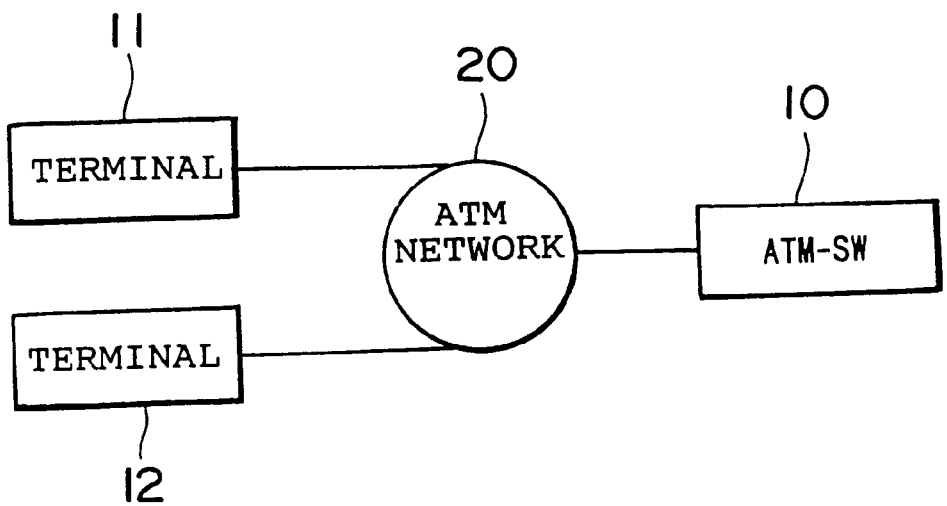

Note that the network system in each of the embodiments 1–3 discussed above may be, as illustrated in FIG. 22a, constructed such that the terminals 11, 12 are connected to the ATM switch 10 via the communication lines and the unillustrated UNI, or alternatively, as illustrated in FIG. 22(b), the terminals 11, 12 and the ATM switch 10 are connected to the ATM network 20 via the communication lines and the unillustrated UNI.

[Embodiment 4]

Next, the network system in an embodiment 4 of the present invention will be described.

<Construction of Network System>

Figure 23:
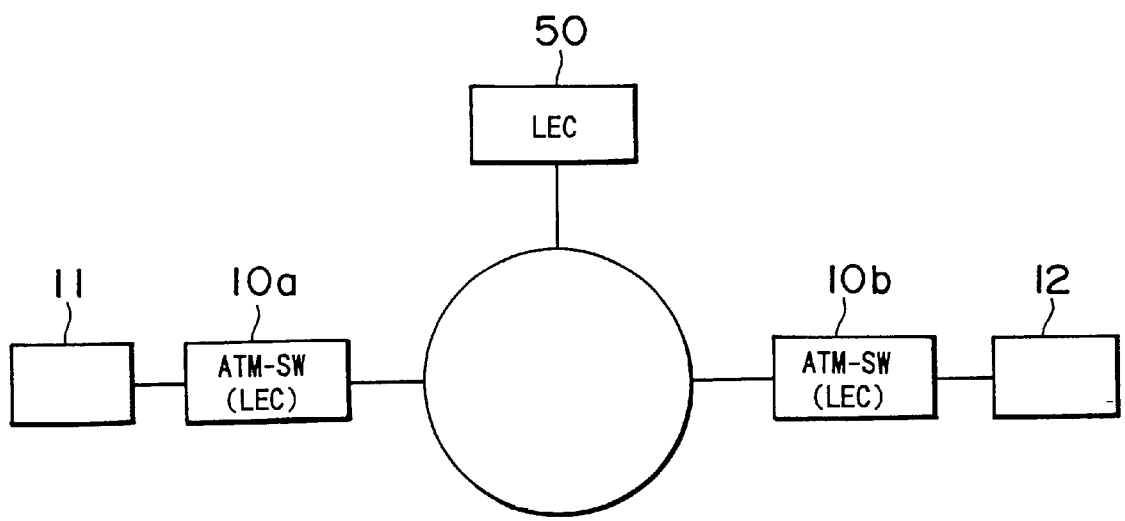
FIG. 23 is a diagram illustrating a construction of the network system in an embodiment 4.

FIG. 23 is a diagram illustrating a construction of the network system in the embodiment 4. Referring to FIG. 23, the network system is constructed as follows.

That is, a plurality of ATM switches (LEC: Lan Emulation Client) (only ATM switches 10a, 10b are illustrated in FIG. 23) are connected via the communication lines to an LES (Lan Emulation Server) 50 for managing an ATM-LAN. Further, a plurality of terminal devices (only terminals 11, 12 are shown in FIG. 23) are connected via the communication lines to each ATM switch.

Among the constructive elements of the above-described network system, the terminal 11 and the terminal 12 have substantially the same constructions as the terminals 11, 12 explained in the embodiment 1, and therefore their explanations are omitted (see FIGS. 2–4). Further, the ATM switches 10a, 10b have substantially the same construction as the ATM switch 10 explained in the embodiment 1, and hence their explanations are omitted (see FIGS. 5–7).

Figure 24:
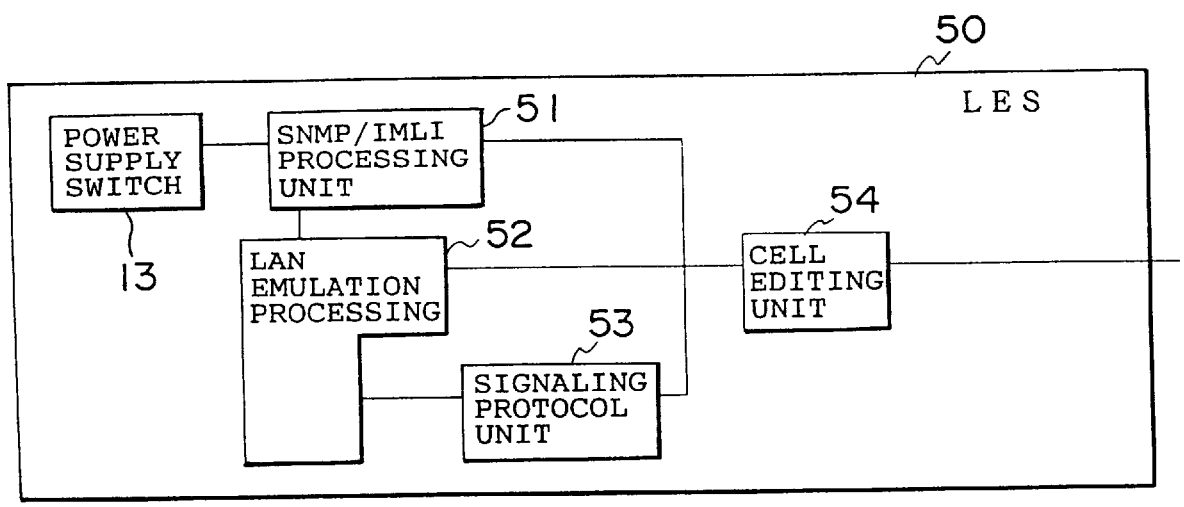
FIG. 24 is a diagram showing a construction of an LES shown in FIG. 23.

FIG. 24 is a functional block diagram of the LES 50 shown in FIG. 23. Referring to FIG. 24, the las 50 comprises an SNMP/ILMI processing unit (hereinafter abbreviated to "S/I unit") 51, a LAN emulation processing unit (hereinafter simply termed "LE unit") 52, a signaling protocol unit (hereinafter abbreviated to "SP unit") 53, and a cell editing unit 54. The SP unit 53 and the cell editing unit 54 among those components have substantially the same constructions as the SP unit 15 and the cell editing unit 17 (see FIG. 2), and therefore their explanations are omitted.

Figure 25:
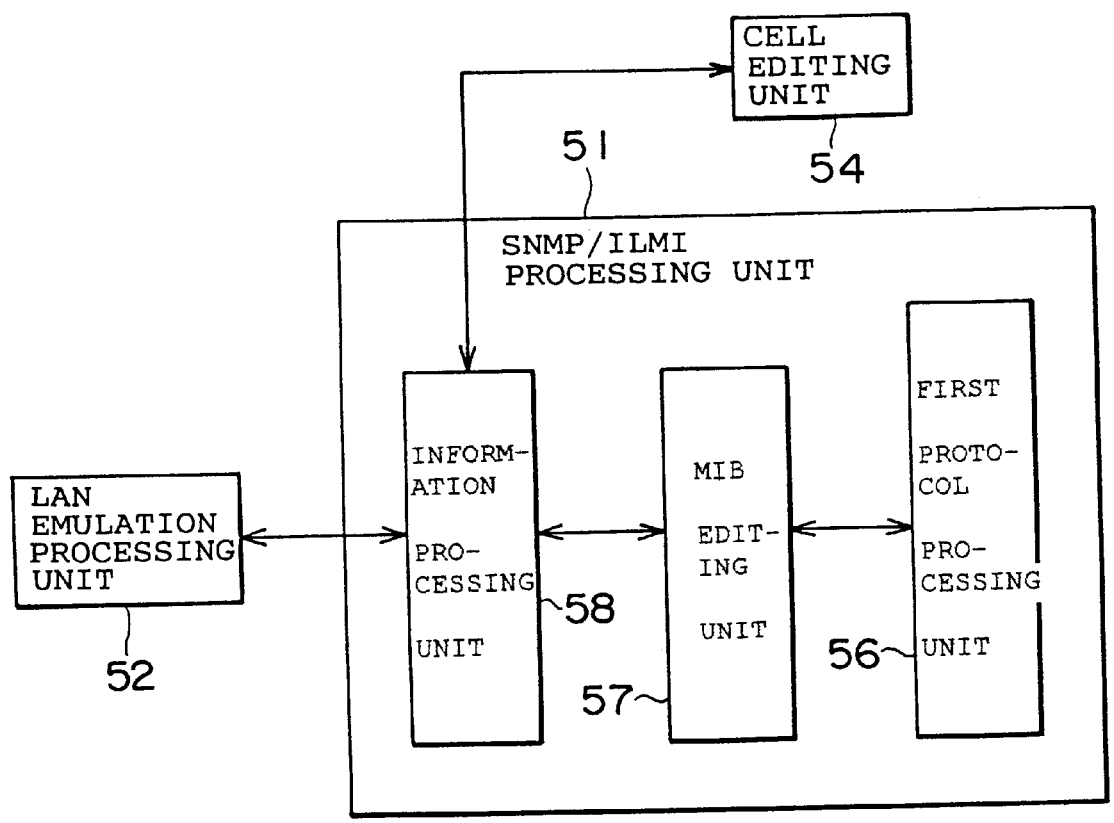
FIG. 25 is a diagram showing a construction of the SNMP/ILMI processing unit shown in FIG. 24.
Figure 26:
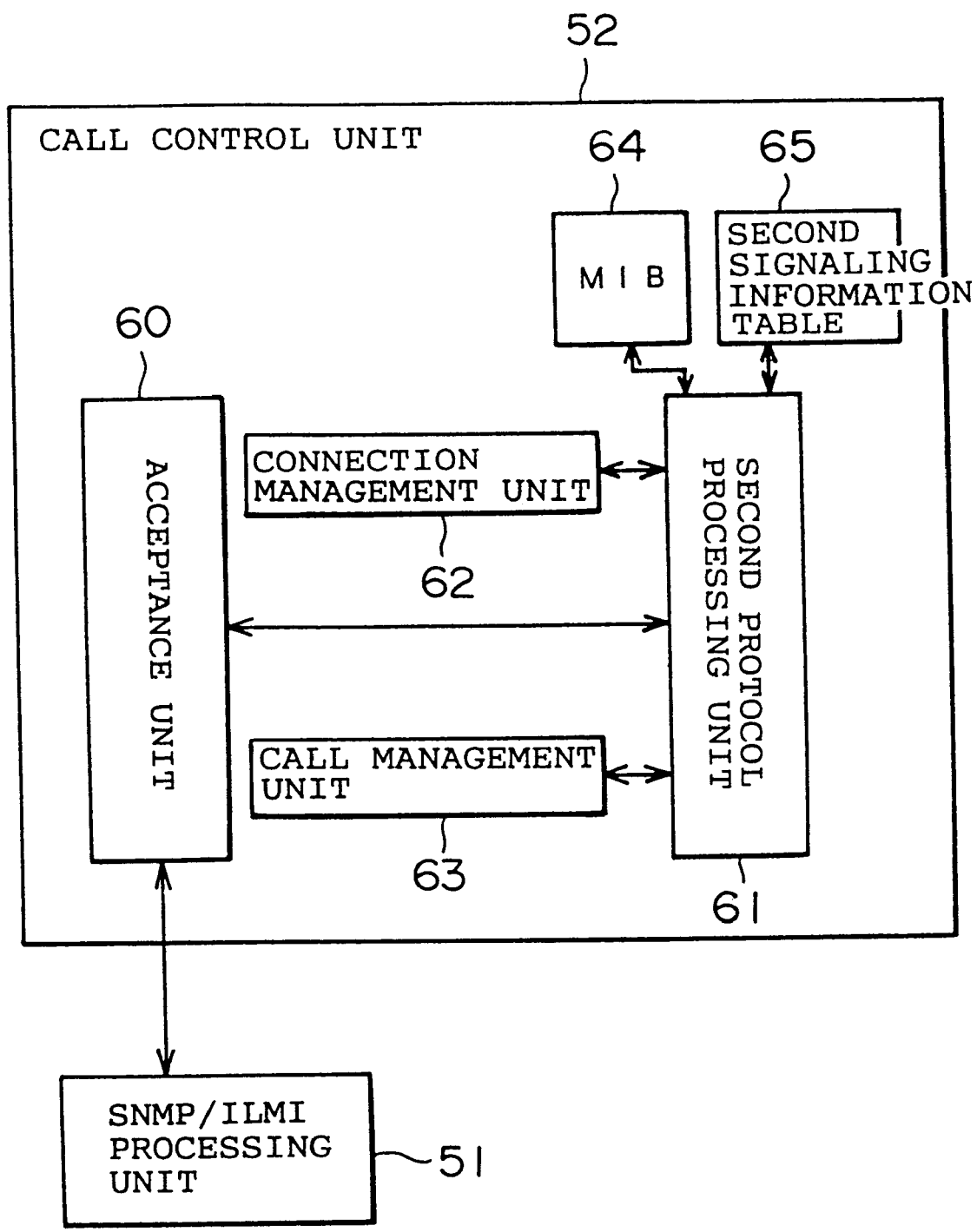
FIG. 26 is a diagram illustrating a construction of a LAN emulation processing unit shown in FIG. 24.

FIG. 25 is a functional block diagram of the S/I unit 51 shown in FIG. 24. FIG. 26 is a functional block diagram of the LE unit 52 shown in FIG. 24. The S/I unit 51 substantially the same construction as the S/I unit (see FIG. 3) explained in the embodiment 1, and hence its explanation is omitted. Further, the LE unit 52 corresponding to the call control unit 35 (see FIG. 7) of the ATM switch that has been explained in the embodiment 1, has substantially the same construction as the call control unit 15, and hence the explanation thereof is omitted.

<Processing in Network System>

Next, the processing in the network system in the embodiment 4 will be described. In the network system in the embodiment 4, when the power supply 13 (see FIG. 2) of each terminal is switched ON, each terminal executes the signaling information transmitting process., and transmits "ColdStart-Trap" containing the signaling information of the terminal itself to the ATM switch 10a or 10b. This signaling information transmitting process is the same as the signaling information transmitting process (the processes in steps S01–S09 shown in FIG. 8) explained in the embodiment 1, and therefore its explanation is omitted.

Figure 27:
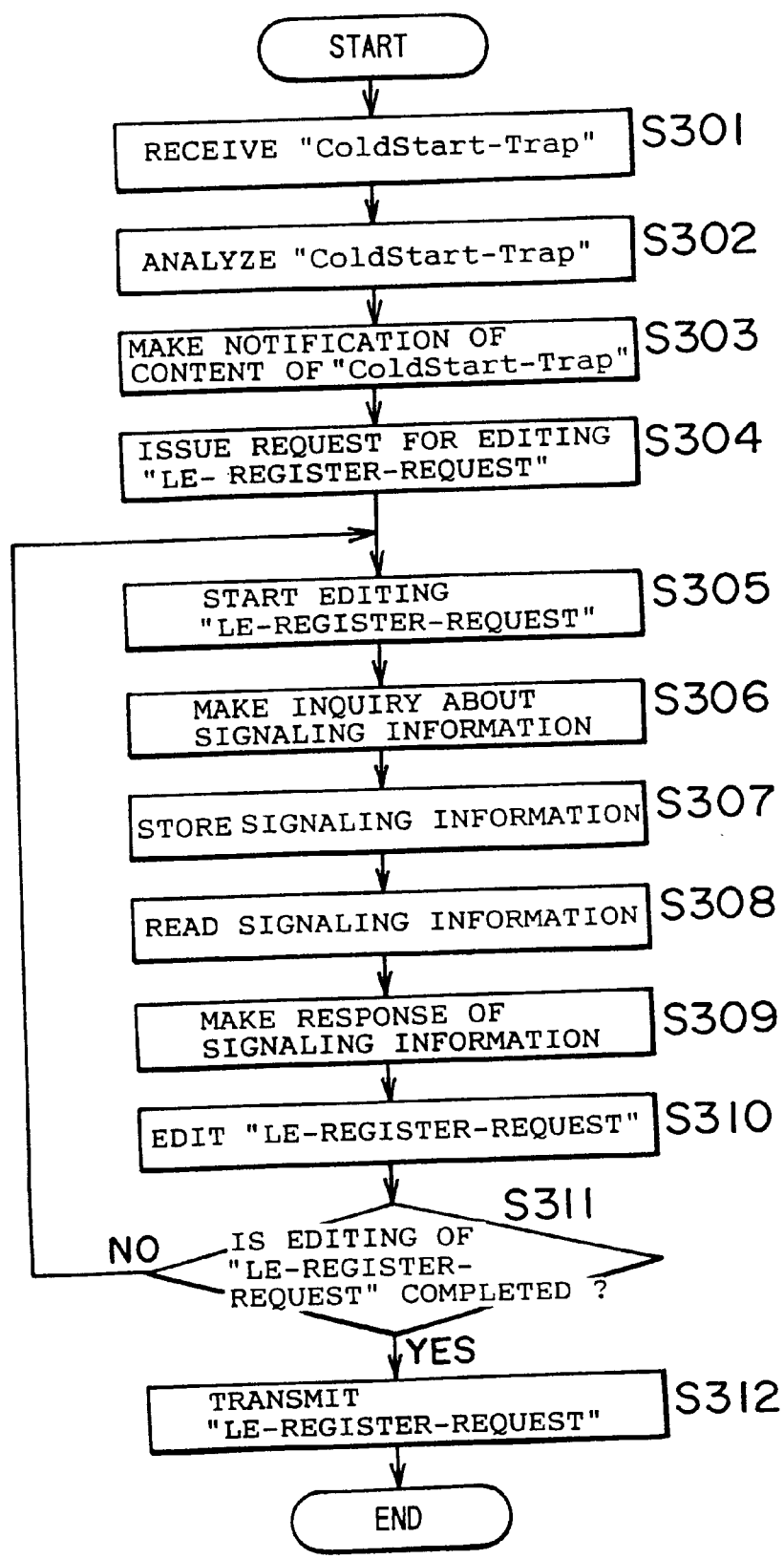
FIG. 27 is a flowchart showing a signaling information storage requesting process.

Each of the ATM switches 10a, 10b, upon receiving "ColdStart-Trap" transmitted from the terminal, executes a signaling information storage request process. FIG. 27 is a flowchart showing the signaling information storage request process.

As shown in FIG. 27, in step S301, when the cell editing unit 36 (see FIG. 5) of the ATM switch 10a or 10b receives the UDP data containing "ColdStart-Trap" received from the terminal, the cell editing unit 36 extracts "ColdStart-Trap" from the UDP data and supplied the S/I unit 33 with "ColdStart-Trap".

In step S302, the MIB editing unit 39 (see FIG. 6) of the S/I unit 33 receives "Cold Stat-Trap" via the information processing unit 40. Then, the MIB editing unit 39 analyzes "ColdStart-Trap" and thereby extracts a content (signaling information of the terminals, 11, 12) of "ColdStart-Trap".

In step S303, the MIB editing unit 39 notifies the first protocol processing unit 38 of the content of "ColdStart-Trap" that is obtained in step S302.

In step S304, the first protocol processing unit 38 receiving the notification from the MIB editing unit 39 issues a request for editing a message (hereinafter referred to as "RE-REGISTER-REQUEST") containing the signaling information of the terminal, the signaling information of the ATM switch 10a or 10b and a purport to request the LES 50 to store the above information. At the same time, the first protocol processing unit 38 notifies the MIB editing unit 39 of this editing request.

In step S305, the MIB editing unit 39 receiving the editing request issued in step S304, starts editing "RE-REGISTER-REQUEST". Simultaneously, MIB editing unit 39 notifies the information processing unit 40 of the signaling information of the terminal and an inquiry instruction about the signaling information of the ATM switch 10a or 10b.

In step 306, the information processing unit 40 notifies the call control unit 35 f the signaling information of the terminal and the inquiry request about the signaling information of the ATM switch 10a or 10b.

In step S307, the second protocol processing unit 43 (see FIG. 7) of the call control unit 35 receives the signaling information of the terminal and the inquiry request via the acceptance unit 42. Then, the second protocol processing unit 43 stores the signaling information table 47 with the signaling information of the terminal.

In step S308, the second protocol processing unit 43 reads the signaling information of the ATM switch 10a or 10b from the MIB 46.

In step S309, the second protocol processing unit 43 notifies the acceptance unit 42 of the signaling information read in step S308. This piece of signaling information is supplied as a response to the inquiry request, to the MIB editing unit 39 via the acceptance unit 42 and the information processing unit 40 of the S/I unit 33.

In step S310, the MIB editing unit 39 receiving the signaling information of the ATM switch 10a or 10b, edits "RE-REGISTER-REQUEST".

Judged in step S311 is whether the editing of "RE-REGISTER-REQUEST" is finished or not. At this time, it is judged that the editing of "RE-REGISTER-REQUEST" is not yet finished, the processing returns to step S305, wherein a loop process of steps S305–S311 is repeated till the editing of "RE-REGISTER-REQUEST" is, it is judged in step S311, ended. Whereas if it is judged that the editing of "RE-REGISTER-REQUEST" is finished, the MIB editing unit 39 notifies the information processing unit 40 of "RE-REGISTER-REQUEST". This message "RE-REGISTER-REQUEST" is transferred to the cell editing unit 36 by the information processing unit 40.

In step S312, the cell editing unit 36 transmits "RE-REGISTER-REQUEST" to the LES 50. When the process in this step S312 is ended, the signaling information storage request process comes to an end.

Figure 28:
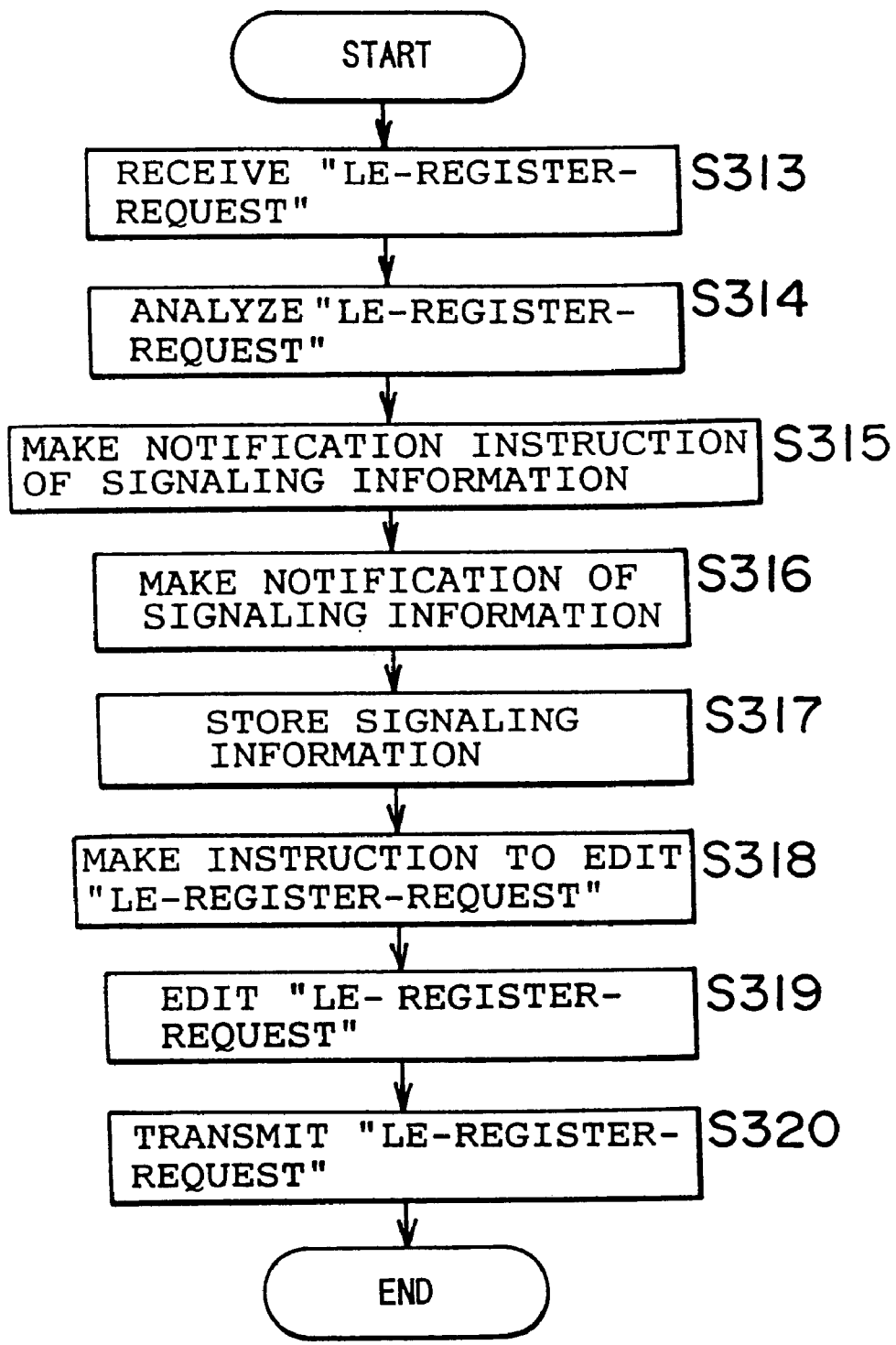
FIG. 28 is a flowchart showing a signaling information storing process.

The LES 50, upon receiving "RE-REGISTER-REQUEST" from the ATM switch 10a or 10b, executes a signaling information storage process. FIG. 28 is a flowchart showing the signaling information storage process.

As shown in FIG. 28, in step S313, the cell editing unit 54 of the LES 50 shown in FIG. 24 receives "RE-REGISTER-REQUEST" and supplies the S/I unit 51 with "RE-REGISTER-REQUEST".

In step S314, the MIB editing unit 57 (see FIG. 25) of the S/I unit 51 receives "RE-REGISTER-REQUEST" via the information processing unit 58. Thereupon, MIB editing unit 57 analyzes "RE-REGISTER-REQUEST" and thereby extracts each piece of signaling information from "RE-REGISTER-REQUEST. Then, when this extraction has been finished, the MIB editing unit 57 notifies the first protocol processing unit 56 of this purport.

In step S315, the first protocol processing unit 56 receiving the notification from the MIB editing unit 57 gives the information processing unit 58 the notification instruction with a purport to notify an LE unit 52, of the LES 50 shown in FIG. 26, of the signaling information obtained in step S314. This notification instruction is supplied to the information processing unit 58 via the MIB editing unit 57. At this time, the MIB editing unit 57 supplies the information processing unit 58 with each piece of signaling information obtained in step S314 together with the notification instruction.

In step S316, the information processing unit 40 receiving the notification instruction and piece of signaling information, notifies the LE unit 52 of each piece of signaling information.

In step S317, the second protocol processing unit 61 of the LE unit that is illustrated in FIG. 26 receives respective pieces of signaling information via the acceptance unit 60. Thereupon, the second protocol processing unit 61 stores the signaling information table 65 with each piece of signaling information in such a form as to correspond to the terminal or the ATM switch. This leads to status in which the LES 50 is retentive of the signaling information of the terminal and the signaling information of the ATM switch 20a or 20b. Upon an end of this step S317, the second protocol processing unit 61 gives the acceptance unit 60 a notification (a storage end notification) purporting that the storage process is finished. This storage end notification is received by the first protocol processing unit 56 via the acceptance unit 60, the information processing unit 58 of the S/I unit 51 and the MIB editing unit 57.

In step S318, the first protocol processing unit 56 receiving the storage end notification issues an instruction to edit a message (hereinafter termed "RE-REGISTER-RESPONSE") purporting that the LES 50 stores each piece of signaling information, and then supplies this message to the MIB editing unit 57.

In step S319, the MIB editing unit 57 receiving the editing instruction of "RE-REGISTER-RESPONSE" edits "RE-REGISTER-RESPONSE". Then, the MIB editing unit 57, upon finishing the editing of "RE-REGISTER-RESPONSE", supplies the cell editing unit 54 with "RE-REGISTER-RESPONSE" through the information processing unit 58.

In step S320, the cell editing unit 54 transmits "RE-REGISTER-RESPONSE" to the ATM switch that has transmitted "RE-REGISTER-REQUEST". When the process in this step S320 has been finished, the signaling information storage process is ended.

Thereafter, a certain terminal among the plurality of terminals including the terminals 11, 12 becomes a call-out terminal, and the other terminal serves as a call-in terminal, wherein the data is transmitted and received. In this case, there is executed a process (a signaling information request process) in which the call-out terminal request the LES 50 for the signaling information of the call-in terminal. This signaling information request process is the same as the signaling information request process (the processes in steps S21–S25) shown in FIG. 10, and therefore its explanation is omitted.

Figure 29:
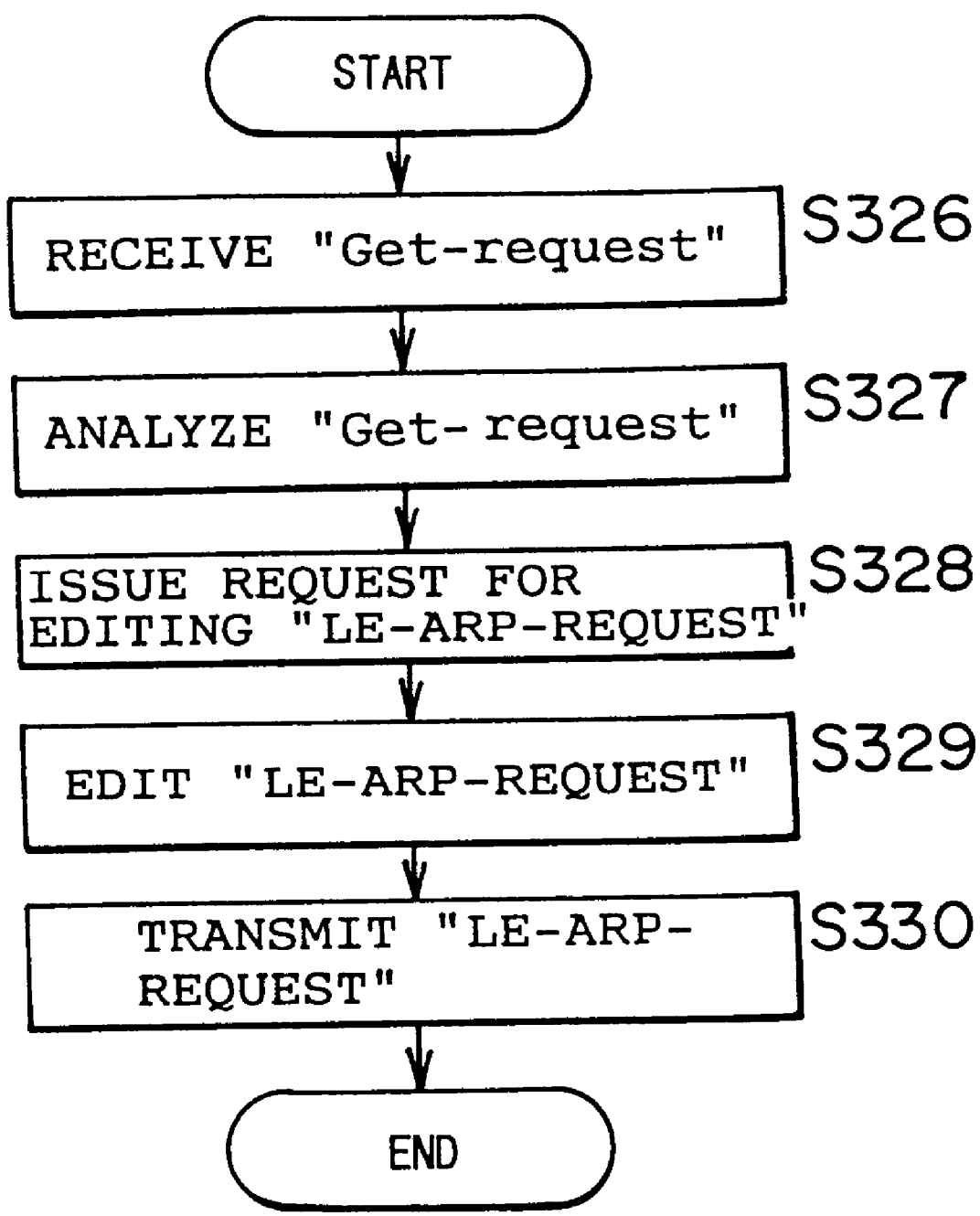
FIG. 29 is a flowchart showing a signaling information request transferring process.

With the signaling information request process described above, "Get-request" transmitted from the call-out terminal is received by the ATM switch 10a or 10b. Thereupon, a signaling information supply request transfer process is implemented in the ATM switch 10a or 10b. FIG. 29 is a flowchart showing the signaling information supply request transfer process.

As shown in FIG. 29, in step S326, the cell editing unit 36 (see FIG. 5) of the ATM switch 10a or 10b receives "Get-request" and supplies the S/I unit 33 with "Get-request".

In step S327, the MIB editing unit 39 of the S/I unit 33 receives "Get-request" via the information processing unit 40. Subsequently, the MIB editing unit 39 analyzes a content of "Get-request". The content (to request the LES 50 for the signaling information of the call-in terminal) is thereby recognized. The MIB editing unit 39 notifies the first protocol processing unit 38 of the content of this message "Get-request".

In step S328, the first protocol processing unit 38 issues a request for editing a message (hereinafter termed "LE-ARP-REQUEST") with a purport to request the LES 50 to supply the signaling information of the call-in terminal, and supplies the MIB editing unit 39 with this editing request.

In step S329, the MIB editing unit 39 edits "LA-ARP-REQUEST" in accordance with the editing request given from the first protocol processing unit 38. Then, the MIB editing unit 39, upon finishing the editing of "LE-ARP-REQUEST", supplies the information processing unit 40 with this message "LE-ARP-REQUEST". Thereupon, an information referring/setting unit 40 transfers "LE-ARP-REQUEST" to the cell editing unit 36.

In step S330, the cell editing unit 36 transmits "LE-ARP-REQUEST" to the LES 50. When the process in this step S330 has been ended, the signaling information request transfer process comes to an end.

Figure 30:
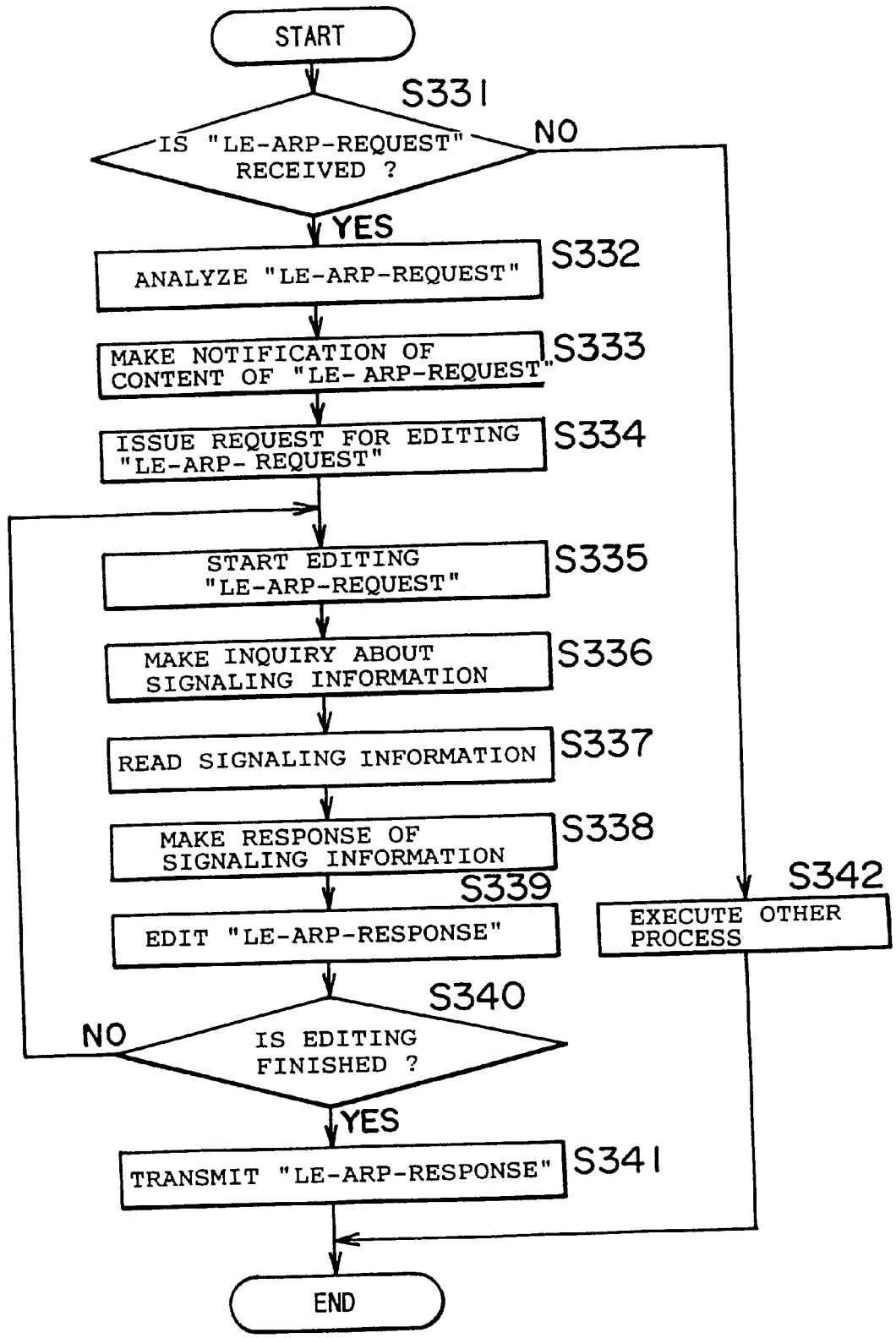
FIG. 30 is a flowchart showing a signaling information supplying process by the LES.

"LE-ARP-REQUEST" transmitted from the ATM switch 10a or 10b is transmitted to the LES 50. Then, the LES 50, upon receiving "LE-ARP-REQUEST", executes the signaling information supply process. FIG. 30 is a flowchart showing the signaling information supply process by the LES 50. As shown in FIG. 30, through processes in steps S331–S340, a response message (hereinafter, termed "LE-ARP-RESPONSE" to "LE-PARPREQUEST" that contains the signaling information of the call-in terminal, is transmitted from the LES 50 to the ATM switch which has transmitted "LE-ARP-REQUEST". The processes in steps S331–S342 are substantially the same as the processes in steps S107–S117 shown in FIG. 15, and hence the explanations thereof are omitted.

Figure 31:
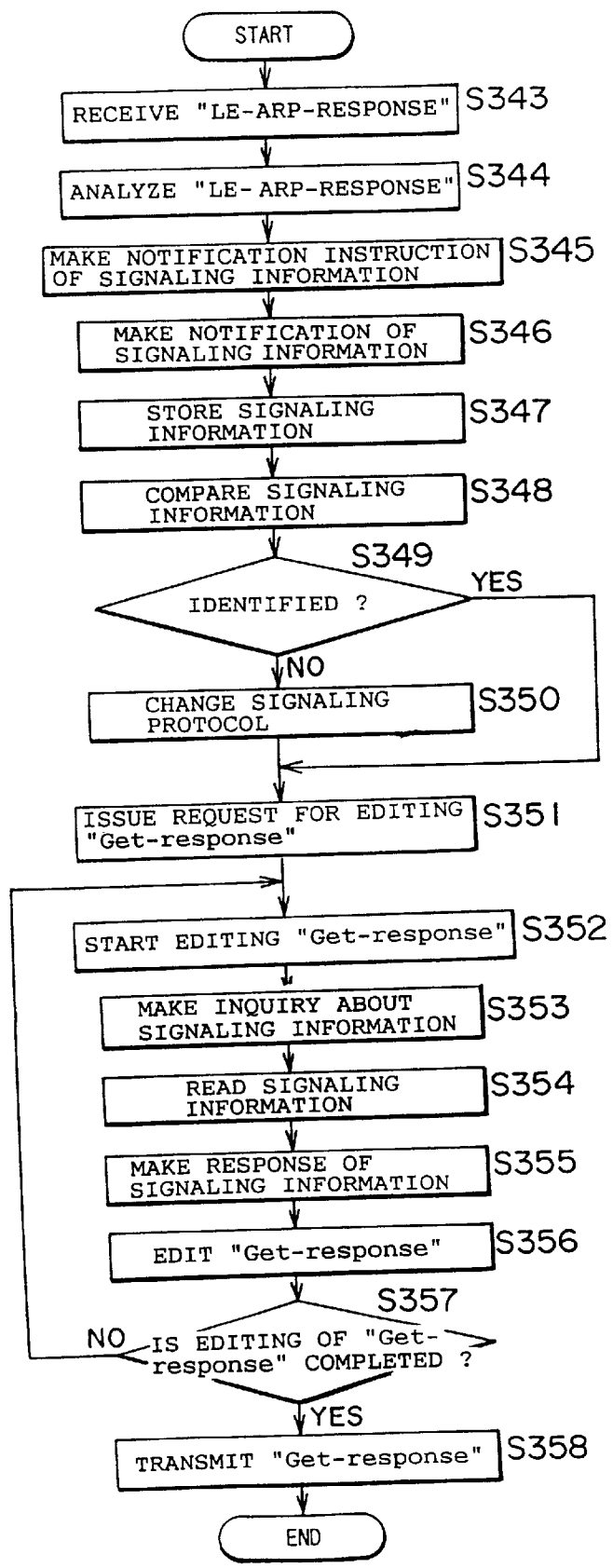
FIG. 31 is a flowchart showing a protocol changing process by an LEC.

The ATM switch 10a or 10b, when receiving "LE-ARP-RESPONSE", executes the protocol change process by the LEC. FIG. 31 is a flowchart sowing the protocol change process by the LEC. As shown in FIG. 31, through processes in steps S343–S358, if the signaling information of the call-in terminal is not identical with the signaling information of the ATM switch 10a or 10b, the signaling protocol of the ATM switch 10a or 10b is changed to a signaling protocol of the call-in-terminal (step S350). The processes in steps S343–S350 are substantially the same as the processes in steps S211–S219 shown in FIG. 19, and therefore their explanations are omitted. On finishing the process in step S350, through processes in steps S351–S358, "Get-response" containing the signaling information of the call-in terminal is transmitted to the call-out terminal from the ATM switch 10a or 10b. The processes in steps S351–S358 are substantially the same as the processes in steps S228–S235, and hence their explanations are omitted.

The call-out terminal, upon receiving "Get-response" from the ATM switch 10a or 10b, executes the protocol change process by the call-out terminal. This protocol change process is substantially the same as the signaling protocol matching process (the processes in steps S38–S45) shown in FIG. 12, and hence its explanation is omitted. When this protocol change process by the call-out terminal is ended, there comes to a status wherein the signaling protocols of the call-out terminal, the ATM switch 10a or 10b and the call-in terminal become coincident.

Then, the message exchange for setting the call is performed between the call-out terminal and the call-in terminal, and subsequently the data is transmitted and received.

<Example of Operation of Network System>

Figure 32:
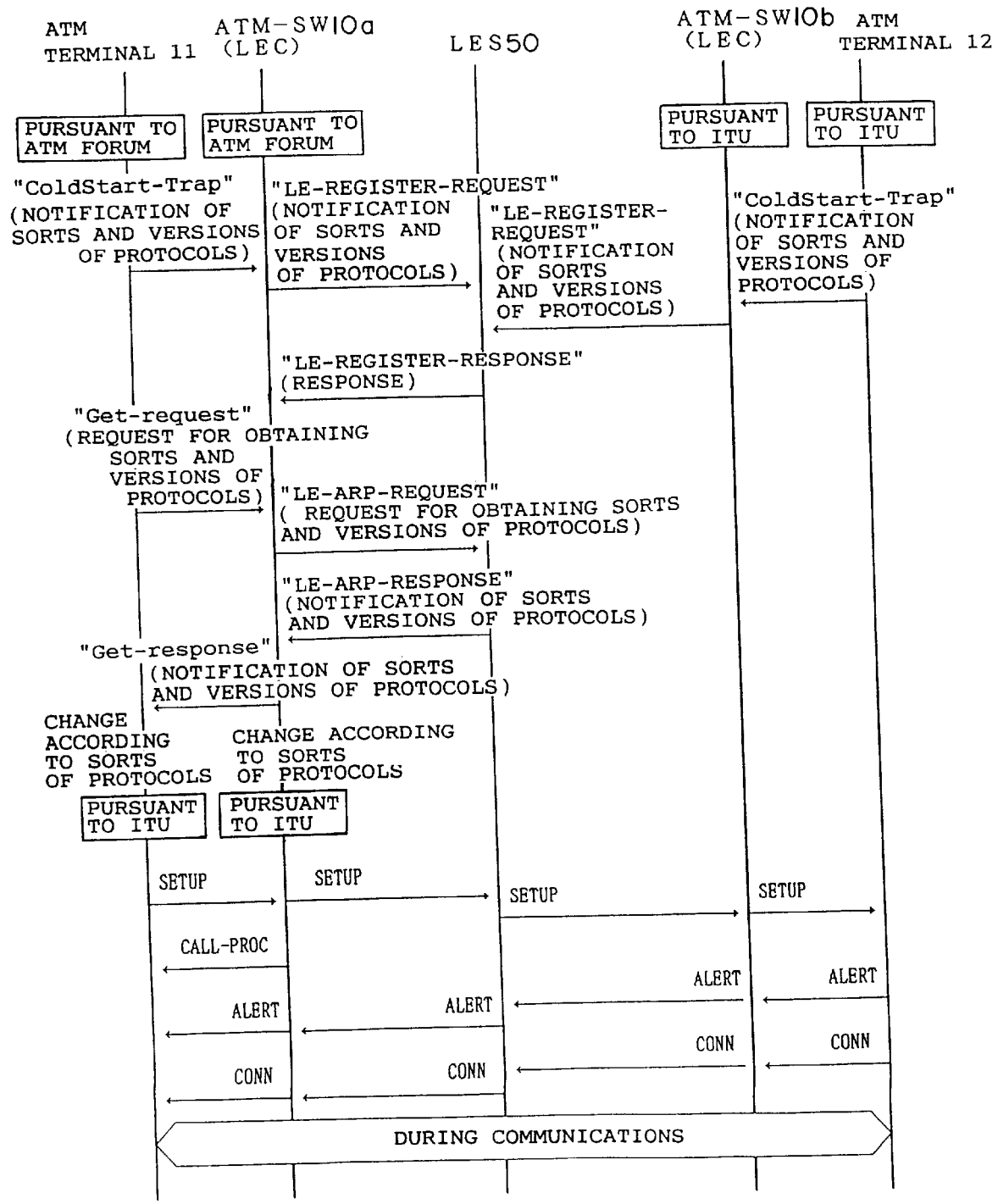
FIG. 32 is a sequence diagram showing an operation example of the network system in the embodiment 4.
Figure 33:
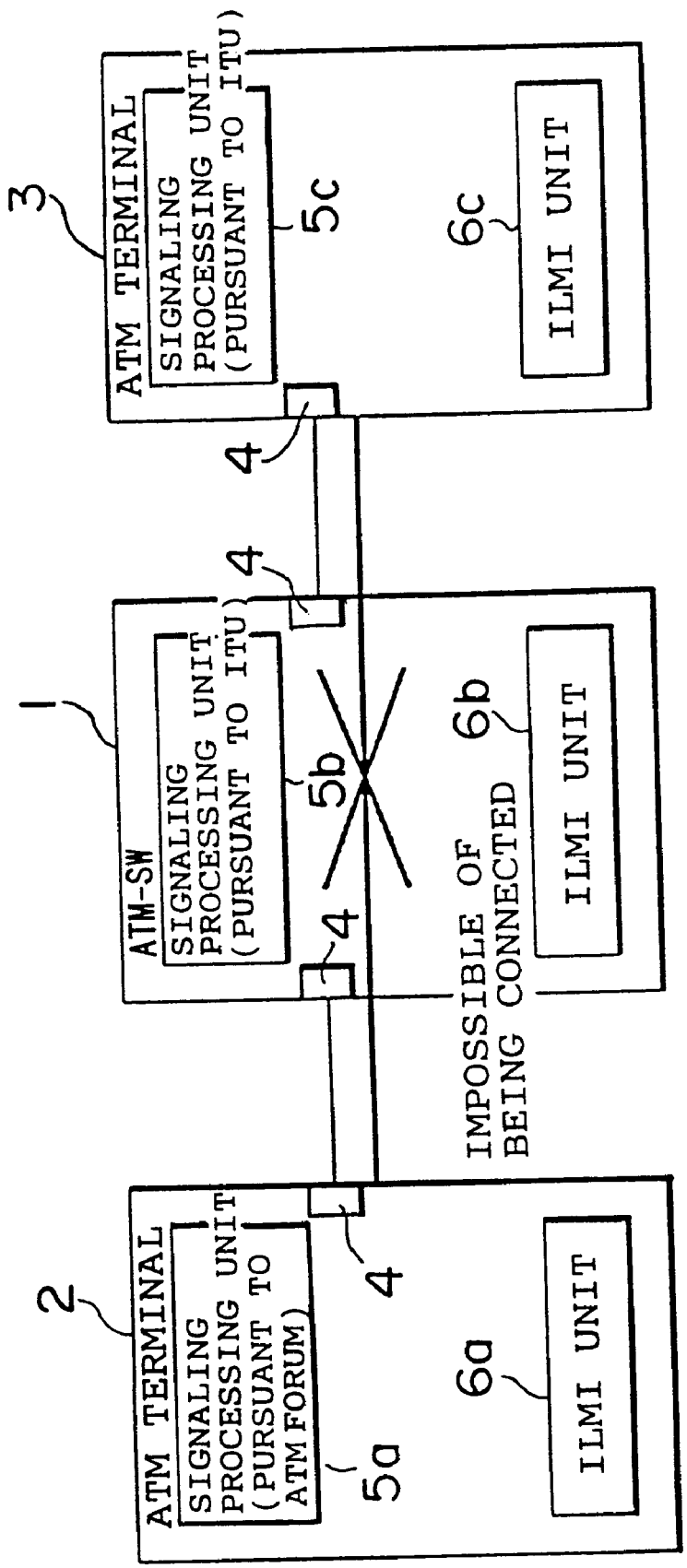
FIG. 33 is a diagram showing an example of construction of the network system.
Figure 34:
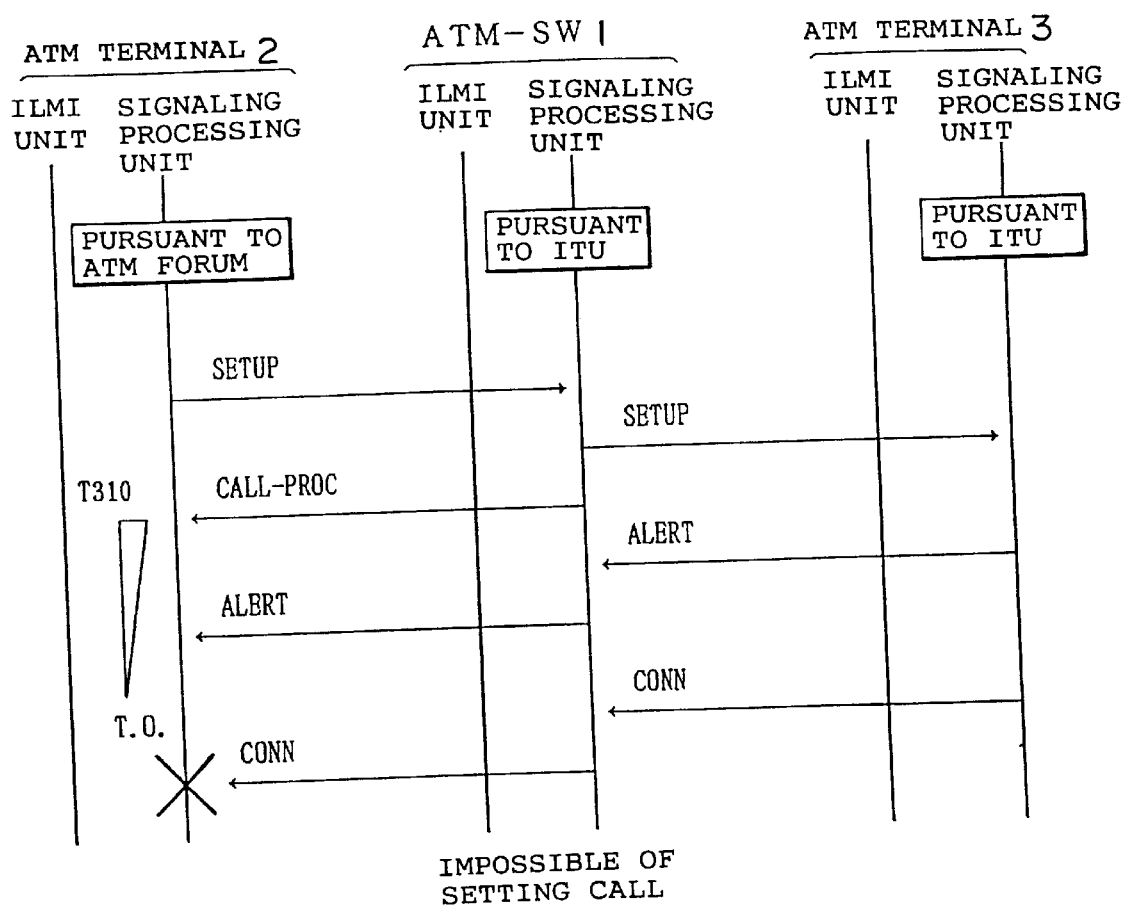
FIG. 34 is a sequence diagram showing a problem inherent in the prior art.

Next, an example of operation of the network system in an embodiment 4 will be explained. FIG. 32 is a sequence diagram showing the example of operation of the network system in the embodiment 4. In this operation example, the terminal 11 in FIG. 23 serves as the call-out terminal, and the terminal 12 serves as the call-in terminal, wherein the data is transmitted and received.

Referring to FIG. 32, it is assumed that the signaling protocols of the terminal 11 and the ATM switch 10a before starting the operation are pursuant to the ATM forum, and that the signaling protocols of the terminal 12 and the ATM switch 10b are pursuant: to the ITU.

To begin with, the terminals 11, 12, upon switching ON the power supply 13 (see FIG. 2), execute the signaling information transmitting process (the processes in steps S01–S09 shown in FIG. 8), and respectively transmit "ColdStart-Trap" to the ATM switch 10a or 10b. At this time, the terminal 11 transmits "ColdStart Trap" containing the signaling information purporting that the signaling protocol is pursuant to the ATM forum, and the terminal 12 transmits "ColdStart-Trap" containing the signaling information purporting that the signaling protocol is pursuant to the ITU.

The ATM switches 10a and 10b, on receiving "ColdStart-Trap" respectively from the terminal 11 and the terminal 12, execute a signaling information storage request process (processes in steps S301–S312 shown in FIG. 27), and respectively transmit "RE-REGISTER-REQUEST" to the LES 50.

The LES 50, when receiving "RE-REGISTER-REQUEST" from the ATM switches 10a and 10b, executes a signaling information storage process (processes in steps S313–S320 shown in FIG. 28), and respectively store a signaling information table 65 with pieces of signaling information of the terminals 11, 12.

Thereafter, if the terminal 11 demands the data transmission and receipt with respect to the terminal 12, the terminal 11 executes the signaling information request process (the processes in steps S21–S25 shown in FIG. 10), and transmits "Get-request" requiring the signaling information of the terminal 12, to the ATM switch 10a.

The ATM switch 10a, upon receiving "Get-request" from the terminal 11, executes a signaling information request transfer process (processes in steps S326–S330 shown in FIG. 29), and transmits "LE-ARP-REQUEST" requiring the signaling information of the terminal 12, to the LES 50.

The LES 50, on receiving "LE-ARP-REQUEST" from the ATM switch 10a, implements a signaling information supply process (processes in steps S331–S341 shown in FIG. 30) by the LES, and transmits "LE-ARP-RESPONSE" containing the signaling information of the terminal 12, to the ATM switch 10a.

The ATM switch 10a, upon receiving "LE-ARP-RESPONSE" from the LES 50, executes a protocol change process (processes in steps S343–S358 shown in FIG. 31) by the LEC, and changes the signaling protocol of the switching system 10a itself to a signaling protocol of the terminal 12. Subsequently, the ATM switch 10a transmits "Get-response" containing the signaling information of the terminal 12 to the terminal 11.

The terminal 11, when receiving "Get-response" from the ATM switch 10a, executes the signaling protocol matching process (the processes in steps S38–S45 shown in FIG. 12), and changes its own signaling protocol to a signaling protocol of the terminal 12. With this process, there comes to such a state that the signaling protocols of the ATM switches 10a, 10b and the terminals 11, 12 are coincident with each other.

Thereafter, the message exchange for setting the call is effected between the terminal 11 and the terminal 12. This message exchange is the same as that explained in the embodiment 1, so that its explanation is omitted. Then, after finishing the call setting, the data is transmitted and received between the terminal 11 and the terminal 12.

The effects of the embodiment 4 are substantially the same as those in the embodiment 1. As a matter of course, according to the network system in the embodiment 4, the call setting and the data transmission/receipt can be properly performed even in an ATM-LAN network system.

This invention being thus described, it will be obvious that the same may be varied in same ways. Such variations are not to be regarded as a deuniture from the spirit and scope of the invention, and all such medications as would be obvious to one skilled in the art are intended to be included within the scope of the following claims.

What is claimed is:

1. A network system comprising:

an ATM switch; and a plurality of terminal devices including a first terminal device, the first terminal device comprising:

a requesting unit transmitting, when a communication channel for transmitting a data is established between the first terminal device and other terminal device through the ATM switch, a request for receiving signaling protocol information about a signaling protocol for establishing the communication channel used by the other terminal device, to said ATM switch; and a first changing unit changing, when receiving the signaling protocol information from the ATM switch, a signaling protocol for establishing the communication channel used by the first terminal device into a signaling protocol corresponding to the signaling protocol information of the other terminal device, the ATM switch comprising:

a first storing unit storing signaling protocol information corresponding to each of the terminal devices; and a supplying unit reading out, when the ATM switch receives the request transmitted from the first terminal device, a signaling protocol information corresponding to request and transmitting the read signaling protocol information to the first terminal device.

2. A network system according to claim 1, wherein the ATM switch further comprises:
- a second storing unit storing signaling protocol information about a signaling protocol used by the ATM switch; and
- a second changing unit comparing, when the supplying unit reads out a signaling protocol information from the first storing unit, the read signaling protocol information with the signaling protocol information stored in the second storing unit and changing, if two pieces of signaling protocol information are different, the signaling protocol used by the ATM switch into a signaling protocol corresponding to the read signaling protocol information.

3. A network system according to claim 1, wherein the signaling protocol information includes information about sorts of the protocols.

4. A network system according to claim 1, wherein the signaling protocol information includes information about versions of the protocols.

5. A network system according to claim 1, wherein each of the terminal devices further comprises:
- a third storing unit storing a signaling protocol information about a signaling protocol used by each of the terminal devices itself; and
- a transmitting unit transmitting the signaling protocol information stored in the third storing unit to said ATM switch, and wherein the ATM switch further comprises:
- a writing unit writing the signaling protocol information transmitted by the transmitting unit, into the first storing unit.

6. A network system according to claim 5, wherein the transmitting unit of each of the terminal devices is actuated when a power supply of said each of the terminal devices is switched ON.

7. A network system comprising:
an ATM switch; and
a plurality of terminal devices, each of the terminal devices comprising:
- a requesting unit transmitting, when a communication channel for transmitting a data is established between any of the terminal devices as a call-out terminal and other terminal as a call-in terminal through the ATM switch, a request for receiving a signaling protocol information about a signaling protocol for establishing the communication channel used by the other terminal device, to said ATM switch;
- a first changing unit for changing, when the terminal-device receives the signaling protocol information from the ATM switch as a call-out terminal, a signaling protocol for establishing the communication channel used by the terminal device into a signaling protocol corresponding to the signaling protocol information of the other terminal device;
- a first storing unit storing a signaling protocol information about a signaling protocol used by the terminal device itself; and
- a responding unit transmitting, when the terminal device receives the request from said ATM switch as the call-in terminal, the signaling protocol information stored in the first storing unit to said ATM switch, the ATM switch comprising:
- a transferring unit transferring, when the ATM switch receives the request from a terminal device as a call-out terminal, this request to a terminal device as a call-in terminal and transferring, when the ATM switch receives a signaling protocol information from a terminal device as a call-in terminal, this signaling protocol information to as a call-out terminal which has transmitted the request.

8. A network system according to claim 7, wherein the ATM switch further comprises:
- a second storing unit storing a signaling protocol information used by the ATM switch, and a second changing unit comparing, when the ATM switch receives the signaling protocol information from a terminal device as a call-in terminal, this received signaling protocol information with the signaling protocol information stored in the second storing unit, and changing, if two pieces of signaling protocol information are different, a signaling protocol used by the ATM switch into a signaling protocol corresponding to the received signaling, protocol information.

9. A network system according to claim 7, wherein the signaling protocol information includes information about sorts of the protocols.

10. A network system according to claim 7, wherein the signaling protocol information includes information about versions of the protocols.

11. A network system comprising:
an ATM switching system; and
a plurality of terminal devices,
each of the terminal devices comprising:
- a requesting unit transmitting, when a communication channel for transmitting a data is established between any of the terminal devices as a call-out terminal and other terminal device as a call-in terminal through the ATM switch, a signaling protocol information for establishing the communication channel used by a signaling protocol the call-out terminal itself and a change request for changing a signaling protocol used by the call-in terminal device into the signaling protocol used by the call-out terminal device, to the ATM switch; and
- a first changing unit changing, when the terminal device, as a call-in terminal receives the signaling protocol information and the change request from the ATM switch, a signaling protocol used by the terminal device itself into a signaling protocol corresponding to the received signaling protocol information of the other terminal device, and the ATM switch comprising:
- a transferring unit transferring, when the ATM switch receives the signaling protocol information and the change request transmitted by the requesting unit, this signaling protocol information and the change request to a call-in terminal.

12. A network system according to claim 11, wherein the ATM switch further comprises: a second changing unit changing, when the ATM switch receives the signaling protocol information and the change request transmitted by the requesting unit, a signaling protocol used by the ATM switch itself into a signaling protocol based on the received signaling protocol information.

13. A network system according to claim 11, wherein each of the terminal devices further comprises:
- a responding unit transmitting, when the first changing unit changes the signaling protocol used by said call-in terminal, a result of this change to the ATM switch, and
- the transferring unit of said ATM switch transfers, when receiving the result of the change, the result to the terminal device which has transmitted the change request.

14. A network system according to claim 11, wherein the signaling protocol information includes information about sorts of the protocols.

15. A network system according to claim 11, wherein the signaling protocol information includes information about versions of the protocols.

16. A network system comprising:

a LAN emulation server;

a plurality of ATM switches; and a plurality of terminal devices, each of the terminal devices comprising:

a requesting unit transmitting, when a communication channel for transmitting a data is established between any of the terminal devices as a call-out terminal and an other terminal device as a call-in terminal through the ATM switch, a supply request for receiving a signaling protocol information for establishing the communication channel used by the call-in terminal, to one of the plurality of ATM switches; and a first changing unit changing, when the terminal device receives a signaling protocol information from one of the ATM switches as a call-in terminal, a signaling protocol used by the terminal device on the basis of this piece of the received signaling protocol information of the other terminal device, each of the ATM switches comprising:

a transferring unit transferring, when the ATM switch receives the supply request from a terminal device as a call-out this supply request to the LAN emulation server and transferring, when the ATM switch receives a signaling protocol information about a signaling protocol used by a terminal device as a call-in terminal from said LAN emulation server, this signaling protocol information to the terminal device that has transmitted the supply request, the LAN emulation server comprising:

a first storing unit storing a signaling protocol information about the signaling protocol used by each of the terminal devices respectively; and a supplying unit reading out, when the LAN emulation server receives the supply request from one of the ATM switches, a signaling protocol information corresponding to the supply request from the first storing unit used by said other terminal device that is stored in said first storing unit and transmitting the read signaling protocol information to the ATM switch which that has transmitted the supply request.

17. A network system according to claim 16, wherein each of the ATM-switches further comprises:

a second storing unit storing a signaling protocol information about a signaling protocol used by the ATM switch; and a second changing unit comparing, when the ATM switch receives signaling protocol information used by a call-in terminal from the LAN emulation server, this received signaling protocol information with the signaling protocol information stored in the second storing unit, and changing, if two pieces of signaling protocol information are different, the signaling protocol used by the ATM switch into a signaling protocol based on the received signaling protocol information.

18. A network system according to claim 16, wherein each of the terminal devices further comprises:

a third storing unit storing signaling protocol information about a signaling protocol used by the terminal device itself; and the first changing unit, of each of the terminal devices compares the signaling protocol information of the call-in terminal with the signaling protocol information stored in the third storing unit and, if two pieces of information are different, changes the signaling protocol used by the terminal device itself into a signaling protocol used by the call-in-terminal.

19. A network system according to claim 16, wherein each of the terminal devices further comprises:

a transmitting unit transmitting the signaling protocol information stored in the third storage unit to one of the ATM switches, and each of the ATM switches further comprises a writing unit writing, when the ATM switch receives the signaling protocol information from one of the terminal devices, the received signaling protocol information to the second storing unit.

20. A network system according to claim 19, wherein the transferring unit of each of the ATM switches transmits the signaling protocol information received by one of the terminal devices to the LAN emulation server, and the LAN emulation server further comprises:

a writing unit writing a signaling protocol information received from each of the ATM switches when receiving the signaling protocol information from the ATM switch to said first storing unit.

21. A network system according to claim 19, wherein the transmitting unit of each of the terminal devices is actuated when a power supply of the terminal device is switched ON.

22. A network system according to claim 16, wherein the signaling protocol information includes information about sorts of the protocols.

23. A network system according to claim 16, wherein the signaling protocol information includes information about versions of the protocols.

24. A method of establishing a communication channel for transmitting data between a terminal devices as a call-out terminal and other terminal device as a call-in terminal through an ATM switch, the method comprising:

a step of causing the call-out terminal, when the communication channel is established between the call-out terminal and the call-in terminal, to transmit a supply request for receiving a signaling protocol information used by the call-in terminal to the ATM switch;

a step of causing the ATM switch receiving the supply request to transmit a signaling protocol information corresponding to the supply request to the call-out terminal;

a step of causing the call-out terminal received the signaling protocol information from the ATM switch to change a signaling protocol used by the call-out terminal itself to a signaling protocol used by the call-in terminal on the basis of the signaling protocol information of the call-in terminal; and a step of causing the call-out terminal that has changed the signaling protocol to execute a massage exchange for establishing the communication channel with respect to said call-in terminal.

25. A method of establishing a communication channel for transmitting data between a terminal device as a call-out terminal and other terminal device as a call-in terminal through an ATM switch, the method comprising:

a step of causing one of the call-out terminal, when the communication channel is established between the call-out terminal and the call-in terminal, to transfer a supply request for receiving a signaling protocol information for Establishing the communication channel used by the call-in terminal, to the ATM switch;

a step of causing the ATM switch received the supply request from the call-out terminal to transfer the supply request to the call-in terminal;

step of causing the call-in terminal received the supply request from the ATM switch to transmit the signaling protocol information corresponding to the supply request to said ATM switch;

a step of causing the ATM switch received the signaling protocol information from the call-in terminal to transfer this signaling protocol information to the call-out terminal;

a step of causing the call-out terminal received the signaling protocol information from the ATM switch to change a signaling protocol used by the call-out terminal itself to the signaling protocol used by the call-in terminal on the basis of the signaling protocol information of the call-in terminal; and a step of causing the call-out terminal that has changed the signaling protocol to execute a message exchange for establishing the communication channel with respect to the call-in terminal.

26. A method of establishing a communication channel for transmitting a data between a terminal device as a call-out terminal and other terminal device as a call-in terminal through an ATM switch, the method comprising:

a step of causing the call-out terminal, when the communication channel established between the call-out terminal and the call-in terminal, to transmit a signaling protocol information for establishing the communication channel used by the call-out terminal, and a change request for changing a signaling protocol used by the call-in terminal to a signaling protocol used by the call-out terminal, to the ATM switch;

a step of causing the ATM switch received the signaling protocol information and the change request to transfer to the call-in terminal;

a step of causing the call-in terminal received the signaling protocol information and the change request to change a signaling protocol used by the call-in terminal itself to a signaling protocol used by the call-out terminal on the basis of the signaling protocol information of the call-in terminal and the change request; and a step of causing the call-out terminal to execute a message exchange for establishing the communication channel with respect to the call-in terminal that has changed the signaling protocol.

27. A method of establishing a communication channel for transmitting a data between a terminal device as a call-out terminal and an other terminal device as a call-in terminal through a LAN emulation server and a plurality of ATM switches, the method comprising:

a step of causing the call-out terminal, when the communication channel is established between the call-out terminal and the call-in terminal, to transmit a supply request for supplying a signaling protocol information for establishing the communication channel used by the call-in terminal, to one of the plurality of ATM switches;

a step of causing the ATM switch received the supply request to transfer the supply request to the LAN emulation server;

a step of causing the LAN emulation server received the supply request to read out a signaling protocol information corresponding to the supply request and to transmit this signaling protocol information to the ATM switch that has transferred the supply request;

a step of causing the ATM switch received the signaling protocol information from the LAN emulation server to transfer the sign protocol information to the call-out terminal;

a step of causing the call-out terminal received the signaling protocol information to change a signaling protocol used by the call-out terminal itself to a signaling protocol used by the call-in terminal device on the basis of the signaling protocol information of the call-in terminal; and a step of causing the call-out terminal changed a signaling protocol to execute a message exchange for setting the call with respect to the call-in terminal.

* * * * *